United States Patent
Bauer et al.

(10) Patent No.: US 10,737,403 B2
(45) Date of Patent: Aug. 11, 2020

(54) AUTONOMOUSLY ELECTROMAGNETIC TRANSPORT CARRIER OF FOOD PORTIONS

(71) Applicant: Weber Maschinenbau GmbH Breidenbach, Breidenbach (DE)

(72) Inventors: Sigfrid Bauer, Grob Teetzleben (DE); Alexander Burk, Dautphetal (DE); Christoph Eckhardt, Breidenbach (DE); Theodor Horst, Amoneburg-Rossdorf (DE); Christoph Kuhmichel, Bad Laasphe (DE); Stefan Lehmann, Neubrandenburg (DE); Gerd Lischinski, Schonbeck (DE); Thomas Nispel, Dautphetal (DE); Ingo Rother, Breidenbach (DE); Jens Schroder, Neubrandenburg (DE); Leopold Von Keudell, Salem (DE); Steffen Zecher, Staufenberg (DE)

(73) Assignee: Weber Maschinenbau GmbH Breidenbach (DE)

( * ) Notice: Subject to any disclaimer, the term of this patent is extended or adjusted under 35 U.S.C. 154(b) by 536 days.

(21) Appl. No.: 15/306,260

(22) PCT Filed: Apr. 22, 2015

(86) PCT No.: PCT/EP2015/058727
§ 371 (c)(1),
(2) Date: Oct. 24, 2016

(87) PCT Pub. No.: WO2015/162182
PCT Pub. Date: Oct. 29, 2015

(65) Prior Publication Data
US 2017/0050332 A1 Feb. 23, 2017

(30) Foreign Application Priority Data
Apr. 25, 2014 (DE) .......... 10 2014 105 848
May 7, 2014 (DE) .......... 10 2014 106 400

(51) Int. Cl.
*B26D 7/30* (2006.01)
*B65G 47/71* (2006.01)
(Continued)

(52) U.S. Cl.
CPC ............ *B26D 7/30* (2013.01); *A01J 27/00* (2013.01); *A22C 17/0033* (2013.01);
(Continued)

(58) Field of Classification Search
CPC ........ B26D 7/32; B26D 7/30; B26D 2210/02; B65G 54/02; B65G 47/71;
(Continued)

(56) References Cited

U.S. PATENT DOCUMENTS 4,742,778 A * 5/1988 Morishita ............... B61B 13/08
104/284
4,800,999 A 1/1989 Matsuo
(Continued)

FOREIGN PATENT DOCUMENTS

DE 3711688 A1 10/1988
DE 19515199 A1 10/1996
(Continued)

OTHER PUBLICATIONS

English Translation of International Preliminary Report on Patentability for International Application No. PCT/EP2015/058727 dated Oct. 25, 2016, 15 pages.
(Continued)

Primary Examiner — Ghassem Alie
(74) Attorney, Agent, or Firm — Dickinson Wright PLLC

(57) ABSTRACT

The invention relates to a device for moving portions, which each comprise at least one slice cut from a food product, in particular by means of a slicing device, in particular a high-speed slicer, comprising a plurality of individually movable transport movers each for at least one portion, a track system for the transport movers, in which track system the transport movers can be moved along at least one
(Continued)

Figure 1:
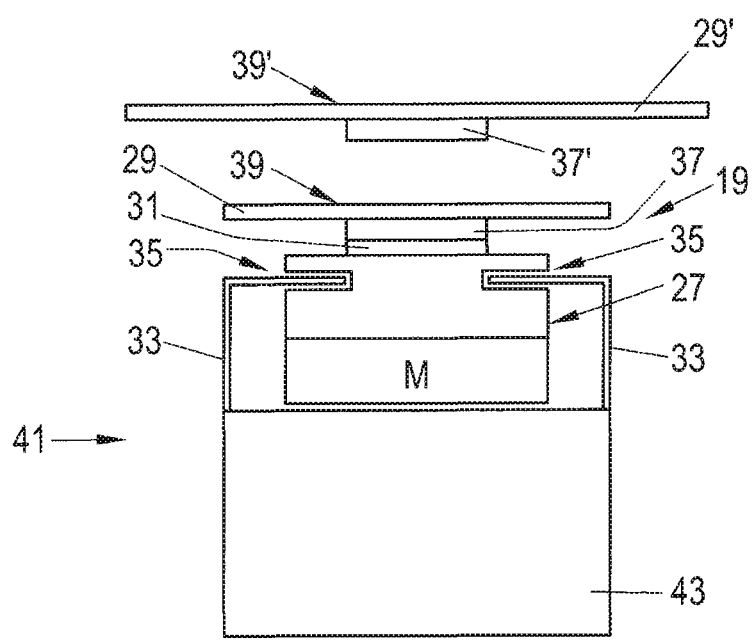

specified track in a transport direction, and a control apparatus for controlling the movements of the transport movers in the track system, wherein the transport movers each comprise at least one runner that interacts with the track system and at least one carrier for at least one portion, the at least one carrier being attached to the runner by means of a retainer, and wherein the drive for each transport mover is formed by the runner and the track system, which together form an electromagnetic drive for the transport mover.

26 Claims, 24 Drawing Sheets

(51) Int. Cl.
| | |
|---|---|
| B65G 47/68 | (2006.01) |
| A22C 17/00 | (2006.01) |
| B26D 7/32 | (2006.01) |
| B65G 54/02 | (2006.01) |
| B60L 13/03 | (2006.01) |
| B60L 13/00 | (2006.01) |
| A01J 27/00 | (2006.01) |
| A23C 19/14 | (2006.01) |
| B65G 47/64 | (2006.01) |

(52) U.S. Cl.
CPC .......... *A22C 17/0093* (2013.01); *A23C 19/14* (2013.01); *B26D 7/32* (2013.01); *B60L 13/003* (2013.01); *B60L 13/03* (2013.01); *B65G 47/647* (2013.01); *B65G 47/682* (2013.01); *B65G 47/71* (2013.01); *B65G 54/02* (2013.01); *B26D 2210/02* (2013.01); *B60L 2200/26* (2013.01); *B65G 2201/0202* (2013.01)

(58) Field of Classification Search
CPC ....................... B65G 2201/0202; B65G 4/647; B65G 17/48; B65G 17/34; B65G 35/06; A22C 17/0033; A22C 17/0093; B60L 13/003; B60L 13/03; B60L 2200/26; B60L 13/08; A23C 19/14; A01J 27/00; E01B 25/30; B65B 7/20; B65B 43/52; B65B 51/067; B61B 13/00; B61B 13/08
USPC ..... 83/13, 23, 78; 104/284, 282, 130.1, 281, 104/283, 88.01, 88.02, 88.03; 700/228, 700/225; 198/346.2, 346.1, 346, 418, 198/358, 472.1
See application file for complete search history.

(56) References Cited

U.S. PATENT DOCUMENTS

| | | | |
|---|---|---|---|
| 5,156,093 | A | 10/1992 | Azukizawa et al. |
| 5,551,348 | A * | 9/1996 | Matsumoto .............. B23Q 7/14 104/88.02 |
| 5,947,361 | A | 9/1999 | Berger et al. |
| 6,019,213 | A | 2/2000 | Schubert |
| 6,390,276 | B1 | 5/2002 | Haug et al. |
| 6,505,730 | B1 | 1/2003 | Linder |
| 6,591,961 | B2 * | 7/2003 | Fukushima ............. B61B 13/00 198/346.1 |
| 6,745,102 | B1 * | 6/2004 | Liu .......................... B61B 3/00 104/88.01 |
| 7,926,644 | B2 | 4/2011 | Mendenhall |
| 7,986,244 | B2 | 7/2011 | Jokele et al. |
| 8,051,777 | B2 | 11/2011 | Weissbrodt |
| 8,894,473 | B2 | 11/2014 | Bächtle |
| 9,346,576 | B2 | 5/2016 | Allgaier et al. |
| 9,856,096 | B2 * | 1/2018 | Hanisch ................. H02K 41/02 |
| 2003/0230941 | A1 | 12/2003 | Jacobs |
| 2005/0189271 | A1 | 9/2005 | Cerutti et al. |
| 2008/0184552 | A1 | 8/2008 | Lang |
| 2008/0236996 | A1 * | 10/2008 | Bausenwein ........... B41F 13/00 198/472.1 |
| 2010/0000440 | A1 | 1/2010 | Meinzinger |
| 2012/0042758 | A1 * | 2/2012 | Weber ...................... B26D 7/32 83/23 |
| 2013/0192175 | A1 * | 8/2013 | Matysiak ................. B26D 7/32 53/514 |
| 2013/0313072 | A1 | 11/2013 | Van De Loecht et al. |
| 2015/0144462 | A1 * | 5/2015 | Weiss ..................... B65G 35/06 198/619 |

FOREIGN PATENT DOCUMENTS

| | | |
|---|---|---|
| DE | 19522189 A1 | 1/1997 |
| DE | 19955042 A1 | 6/2001 |
| DE | 10009903 A1 | 9/2001 |
| DE | 10043304 A1 | 9/2001 |
| DE | 202004008678 U1 | 9/2004 |
| DE | 102006025545 A1 | 12/2007 |
| DE | 102007005994 A1 | 8/2008 |
| DE | 102007020392 A1 | 11/2008 |
| DE | 102007028857 A1 | 1/2009 |
| DE | 202008010439 U1 | 2/2009 |
| DE | 202008016678 U1 | 4/2009 |
| DE | 202010010157 U1 | 11/2010 |
| DE | 102009046893 A1 | 5/2011 |
| DE | 102011015894 A1 | 1/2012 |
| DE | 102010055722 A1 | 6/2012 |
| DE | 102011106265 A1 | 11/2012 |
| DE | 102012004372 A1 | 9/2013 |
| EP | 0246098 A2 | 11/1987 |
| EP | 0482424 A1 | 4/1992 |
| EP | 0496046 A1 | 7/1992 |
| EP | 0647552 A1 | 4/1995 |
| EP | 1216938 A1 | 6/2002 |
| EP | 2407037 A1 | 1/2012 |
| EP | 2460446 A1 | 6/2012 |
| EP | 2599721 A2 | 6/2013 |
| EP | 2653036 A1 | 10/2013 |
| EP | 2673224 B1 | 1/2015 |
| GB | 2185720 A | 7/1987 |
| WO | 03029651 A2 | 4/2003 |
| WO | 2010085670 A1 | 7/2010 |
| WO | 2012107431 A1 | 8/2012 |
| WO | 2013131893 A1 | 9/2013 |

OTHER PUBLICATIONS

English Translation of International Search Report for international Application No. PCT/EP2015/058727 dated Aug. 4, 2015, 4 pages.
English Translation of Written Opinion for International Application No. PCT/EP2015/058727 dated Sep. 2, 2016, 14 pages.
International Preliminary Report on Patentability for International Application No. PCT/EP2015/058727 dated Oct. 25, 2016, 11 pages.
International Search Report for International Application No. PCT/EP2015/058727 dated Aug. 4, 2015, 5 pages.
Research Report from German Patent Office for German Patent Application No. 10 2014 106 400.3 dated Dec. 17, 2014, 8 pages.
Written Opinion for International Application No. PCT/EP2015/058727 dated Aug. 4, 2015, 10 pages.

* cited by examiner

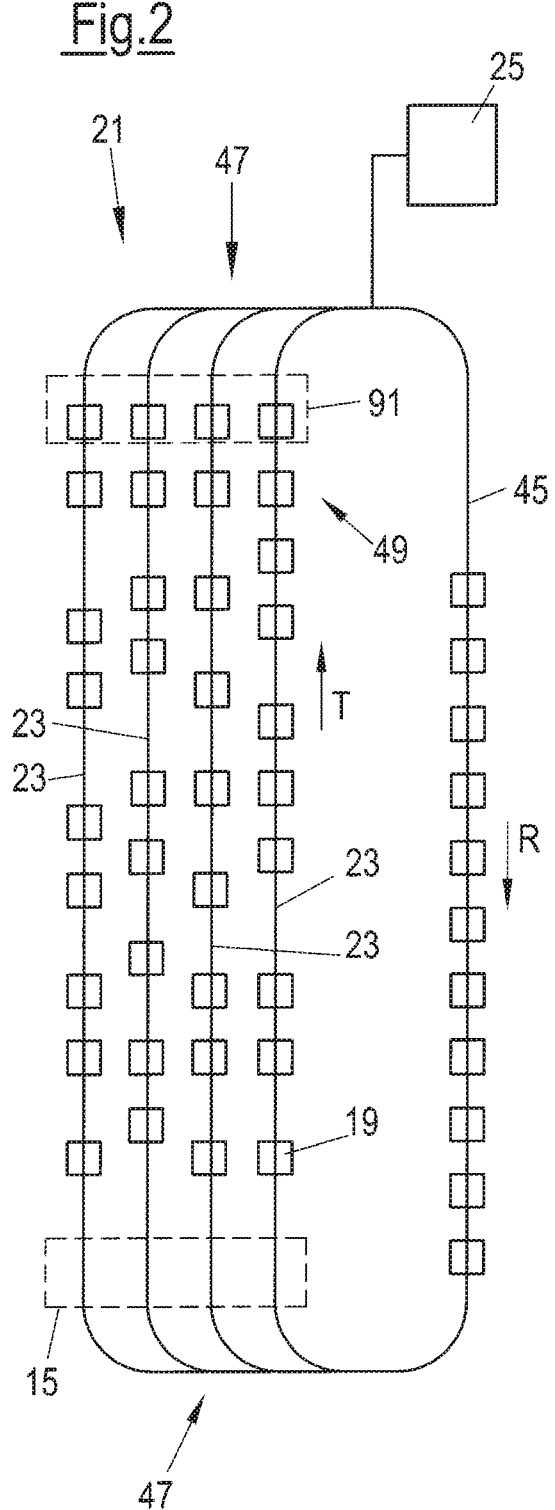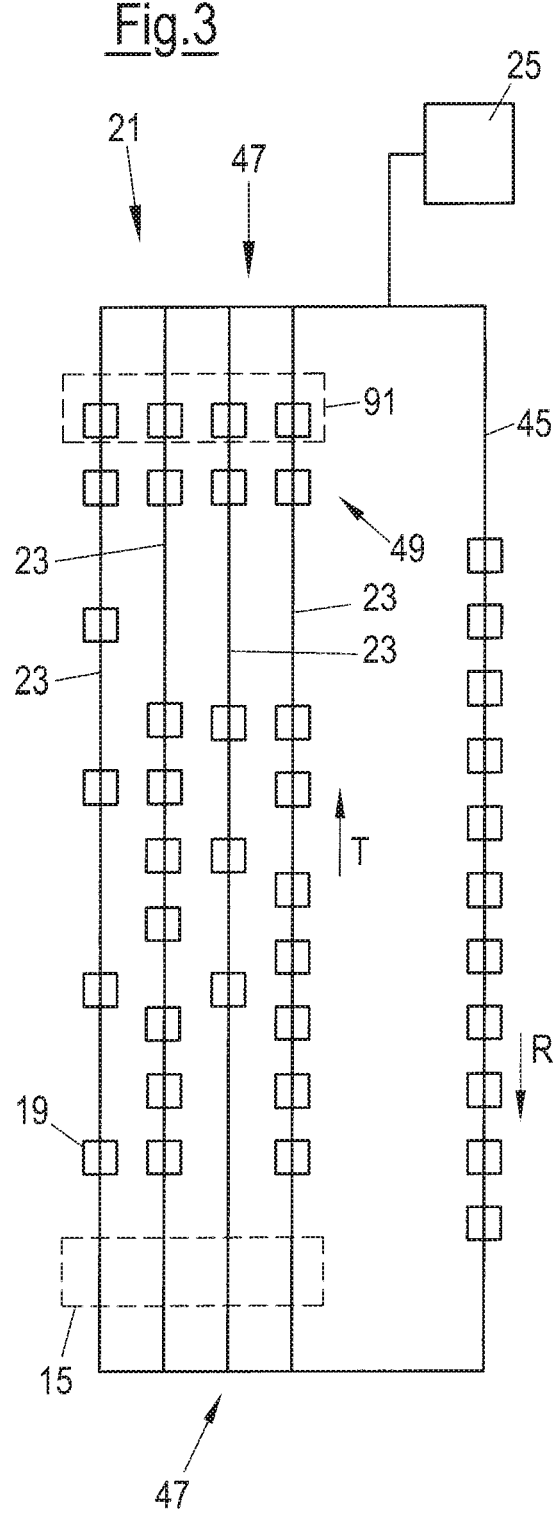

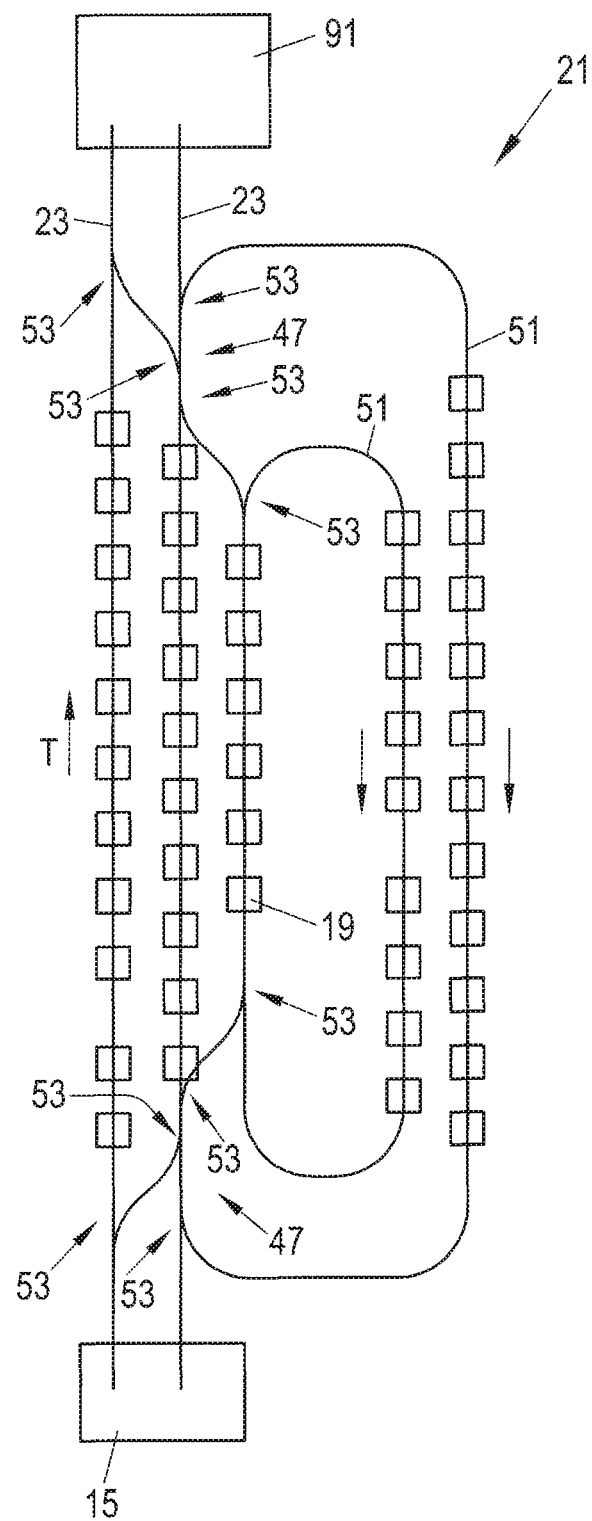

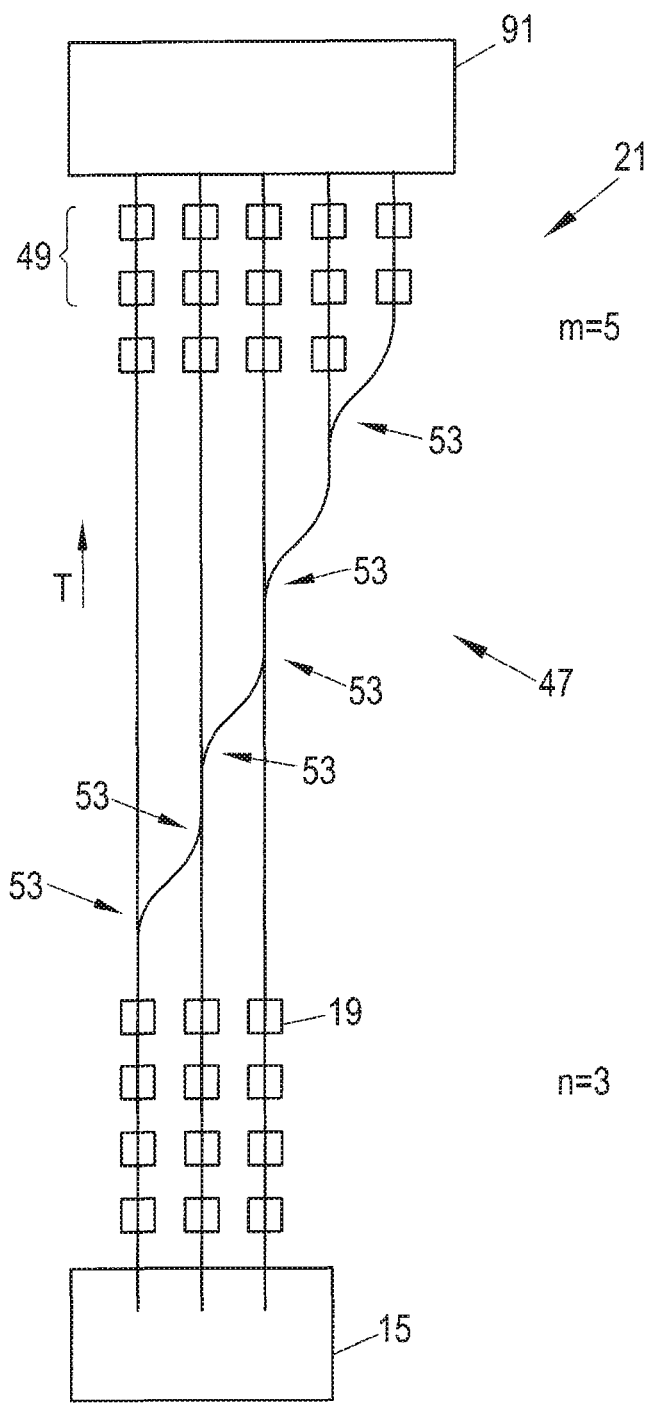

Fig.16
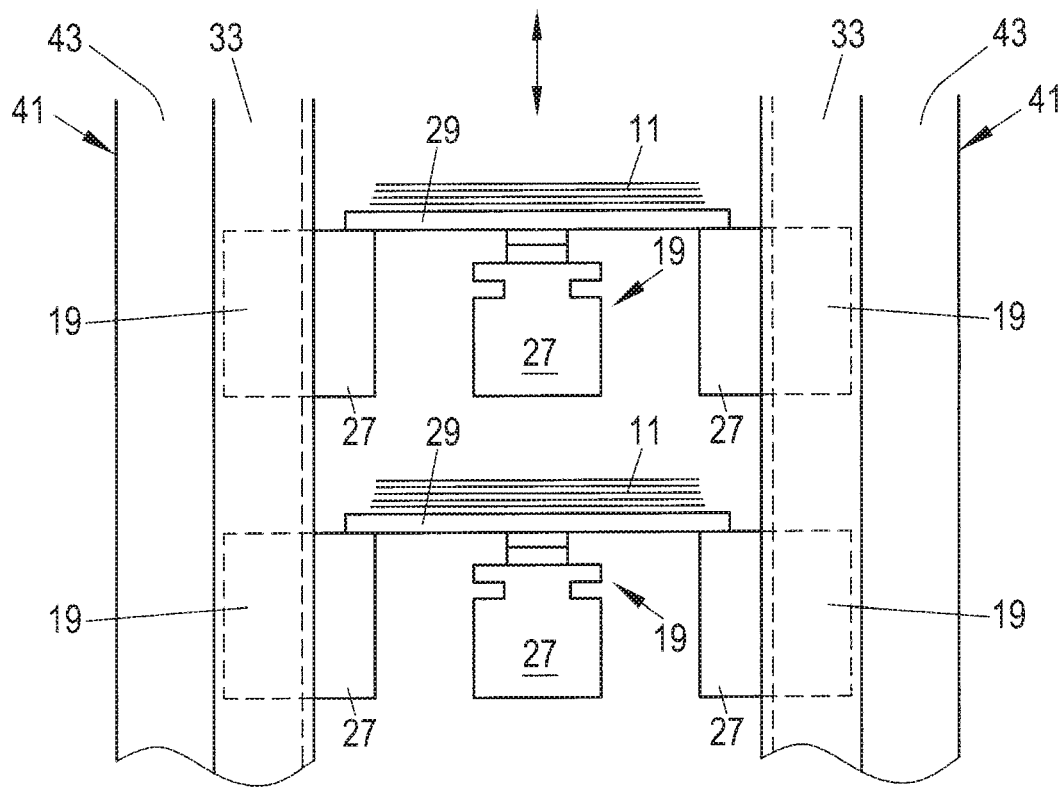
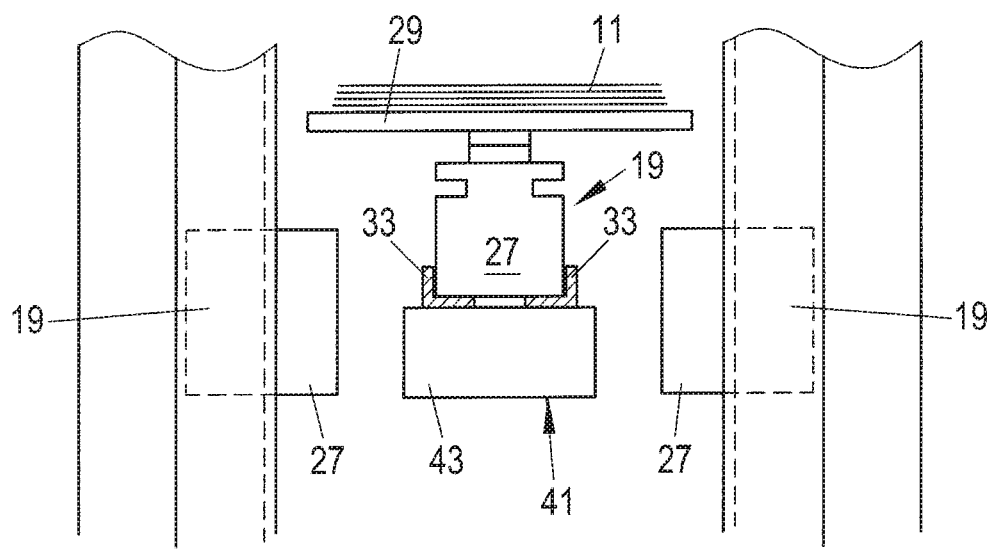

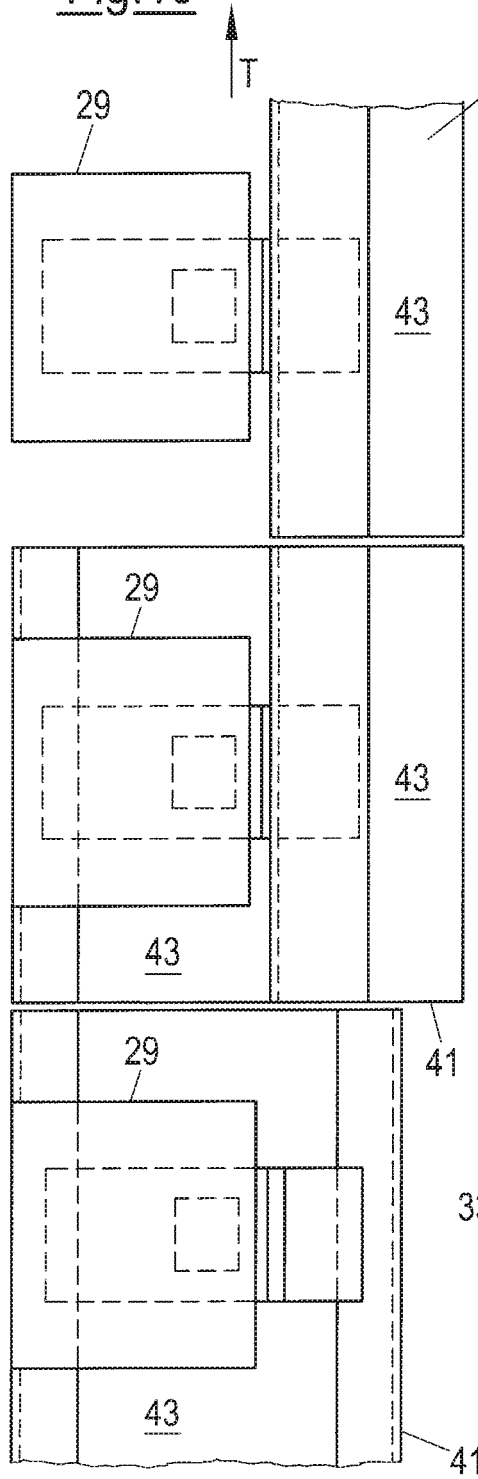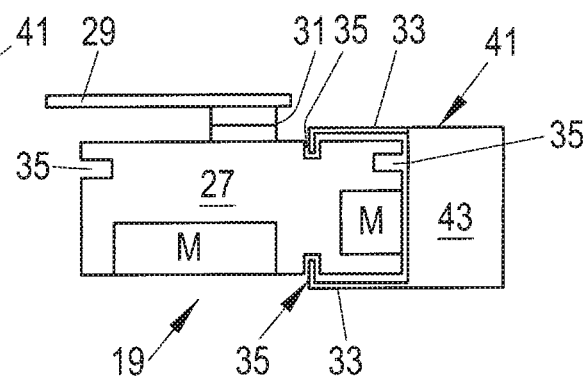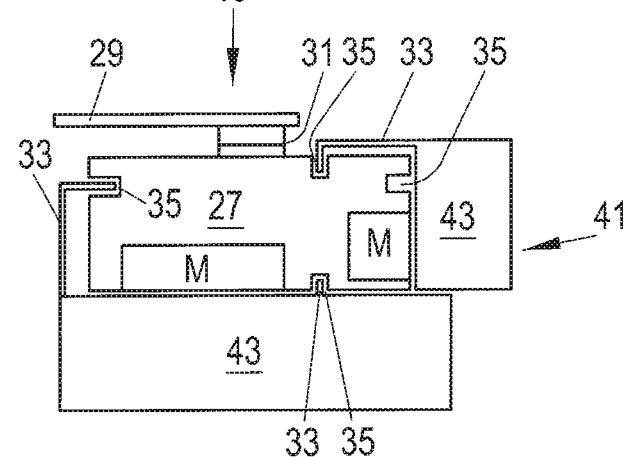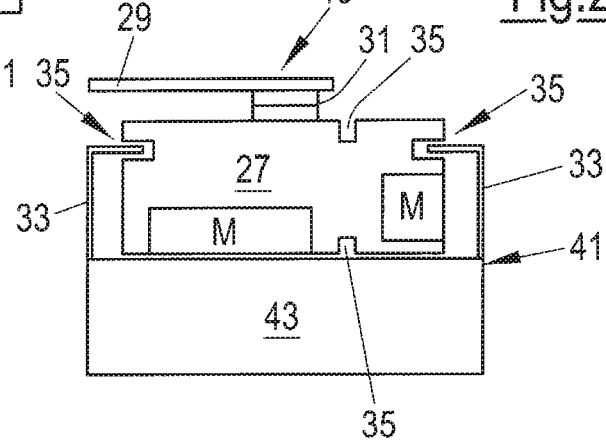

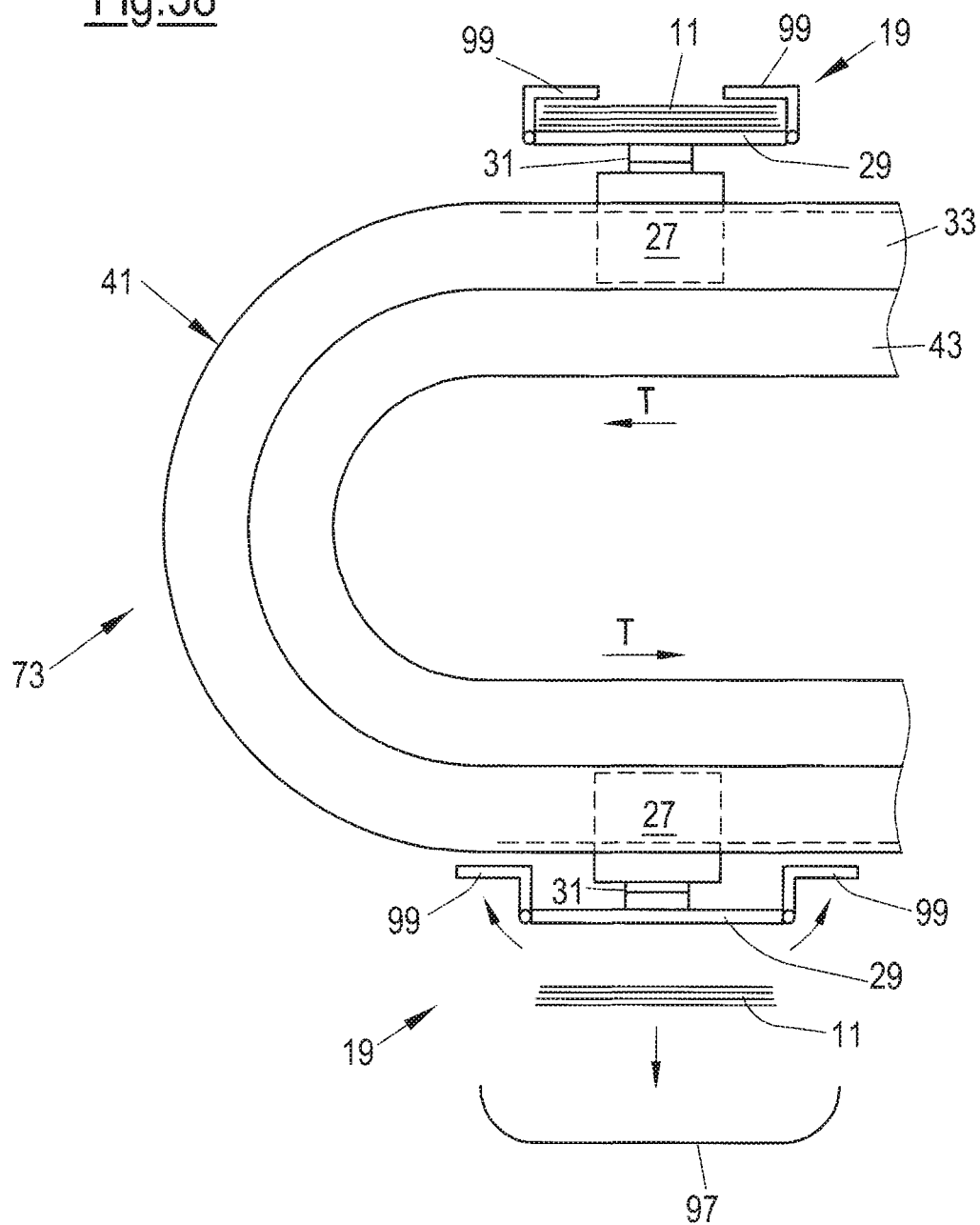

AUTONOMOUSLY ELECTROMAGNETIC TRANSPORT CARRIER OF FOOD PORTIONS

CROSS-REFERENCES TO RELATED APPLICATIONS

This patent application is a 371 of International Application No. PCT/EP2015/058727, filed Apr. 22, 2015 which claims the priority of German Application No. 102014105848.8, filed Apr. 25, 2014 and of German Application No. 102014106400.3, filed May 7, 2014, each of which are incorporated herein by reference in their entirety.

The invention relates to the moving of portions which each comprise at least one slice cut off from a food production, in particular by means of a slicing apparatus, in particular by means of a high-speed slicer.

Conveyor systems are in particular required in the production of single-sort or multi-sort packs which include one or more portions of, for example, slices of sausage and/or cheese to supply the slices of food produced by means of one or more slicing apparatus, in particular so-called slicers, and forming portions or at least part portions to a packaging machine.

The conveyor line serves in practice not only for the transport of the portions from the slicer to the packaging machine, but rather has to satisfy additional functions which are dependent on the respective application, which are generally familiar to the skilled person and of which only buffering and format formation will be named by way of example at this point. In addition, portioning work and completing work have to be satisfied directly subsequent to the slicer. The portions must furthermore be weighed.

A so-called multi-lane operation in which a plurality of food products are sliced simultaneously by means of a slicer is additionally becoming more and more important. The downstream conveyor system has to be capable of such a multi-lane operation and must above all be able to form those formats, also called format sets, from the portions produced in the respective number of lanes which can be conveyed or processed by the downstream packaging machine.

This object and further objects of a conveyor system in the field of handling portions of slices cut off from food products, in particular food products of loaf or bar shape, by means of slicers are currently satisfactorily achieved using conveyor belt systems. Conveyor belt systems are, however, associated with a high mechanical effort. In addition, in particular the transitions between consecutive conveyor belt sections are in particular problematic with respect to the required, gentle transport of the portions. Furthermore, only straight conveyor lines or conveyor lines comprising straight-line sections can naturally be implemented with conveyor belts, i.e. the flexibility in the design of a conveyor line is limited in conveyor belt systems. The possibilities of the total system are equally limited, e.g. with respect to the products to be processed and the formation possibilities of the portions and formats. In addition, a comparatively high effort is required in the cleaning in association with the conveyor belt systems used in the food sector to be able to observe the high hygiene standards.

Against this background, it is an object of the invention to provide a possibility for the transport of food portions in which the above-mentioned disadvantages do not exist and which can nevertheless satisfy the demands currently made with a flexibility which is as high as possible.

This object is satisfied by the features of claim 1 which relates to an apparatus for moving portions which respectively comprise at least one slice cut off from a food product, in particular by means of a slicing apparatus, in particular by means of a high-speed slicer. In accordance with the invention, this apparatus comprises a plurality of individually movable transport movers each for at least one portion, a track system for the transport movers in which the transport movers are movable in a direction of transport along at least one predefined track, and a control device for controlling the movements of the transport movers in the track system, wherein the transport movers respectively comprise at least one rotor cooperating with the track system and at least one carrier for at least one portion attached to the rotor by means of a holder.

The term "portion" is to be understood as broad within the framework of the invention. A portion can accordingly consist of only one single slice. Alternatively, a portion can comprise a plurality of slices which can be present in a relative arrangement of generally any form, for example in a so-called stacked or overlapping arrangement such as is familiar to the skilled person in the technical field in question here. The portion can be a total portion such as is subsequently packaged and offered for sale on the market. Alternatively, the portion can be a part portion which only forms a total portion together with one or more further part portions which can in turn each comprise one or more slices. The part portions of a total portion can be formed from different product sorts so that a multi-sort portion can be produced by assembling a plurality of part portions and so that a multi-sort pack is thus present after its packaging. The slices can, for example, be comparatively thin slices such as are generally known in the form of assorted slices of sausage or of cheese. Alternatively, the slices can in each case be pieces which are relatively thick in comparison with assorted slices such as escalopes or steaks and in particular pieces of fresh meat.

In other words, a portion within the framework of the invention is the unit which is the smallest with respect to the transport task, which has to be transported over a specific distance, on the one hand, and which optionally—depending on the application—additionally has to be put into relation with further portions, on the other hand, to satisfy the respective demands of the total system which comprises one or more slicing apparatus, in particular slicers, the transport system, and one or more packaging machines, for example with respect to the formation of formats such as have to be provided for the respective provided packaging machine.

It has been recognized in accordance with the invention that with an individual system having individually movable transporters for the portions, all the demands on a transport system for food portions currently demanded and also conceivable in the future can be mapped in an ideal manner. Whereas the prior art is attached to the idea of having to manage the transport of food portions by means of conveyor belt systems, the invention signifies a turning away from such a joint transport toward "individual transportation" in which the portions can be moved independently of one another—within the limits predefined by the track system— and can in particular also be individually registered in the overall system.

In accordance with the invention, the transport system comprises a plurality of transport movers whose total number depends on the respective application. It is an aspect of the invention not to move just some few portions and not to provide only a relatively small number of e.g. fewer than 10 transport movers for this purpose. Provision is rather in particular made in accordance with the invention that the track system comprises several dozen up to some hundred transport movers, i.e. a positive "cluster" of transport movers can so-to-say be present in the track system to transport a plurality of portions and optionally to carry out additional functions such as a buffering of portions.

A substantial advantage of the transport system in accordance with the invention with respect to conventional conveyor belt systems comprises the track system for the movers not requiring any movable parts and therefore being comparatively insensitive with respect to contamination and/or being easy to clean. The track system can in particular be manufactured in a protected or encapsulated manner such that high hygienic standards can be satisfied and strict standards observed even under conditions which are extremely demanding under hygienic aspects such as in the processing of food products and the cleaning demands associated therewith. It is in particular possible in accordance with the invention to implement an IP69K capable transport system at an acceptable cost.

The transport principle in accordance with the invention can be implemented in a specific technical manner in different manners and can be designed with respect to the respective specific demands, which will be looked at in more detail in the following.

The invention additionally relates to a method of moving portions which each comprise at least one slice cut off from a food product, in particular by means of a slicing apparatus, in particular by means of a high-speed slicer. In the method, the portions are moved by means of a plurality of individually movable transport movers which are moved along at least one predefined track in a track system by means of a control device.

The invention additionally relates to a system for processing food products having at least one apparatus for slicing food products, in particular a high-speed slicer, and having a transport system comprising an apparatus of the kind described here.

The invention further relates to a use of a transport system comprising an apparatus of the kind described here for the moving of portions which each comprise at least one slice cut off from a food product, in particular cut off by means of a slicing apparatus, in particular by means of a high-speed slicer.

A method of the kind described here is in particular carried out in this use. The apparatus in accordance with the invention is in particular configured for carrying out a method of the kind described here. The method in accordance with the invention is in particular carried out using an apparatus of the kind described here.

Possible further developments of the invention are also set forth in the following part of the description, in the description of the Figures, in the drawing and in the claims.

At least one carrier, and in particular every carrier, is preferably configured for directly receiving at least one portion and in particular comprises a support surface for the portion which is at least substantially planar. It is hereby not necessary to provide the transport movers with parts of the final packaging, for example a lower packaging part also called a tray, since the portion can be received directly by the transport mover or its carrier itself. This has the advantage, for example, that the transfer of a portion to the packaging can be transferred at a region directly optimized for this purpose and in a manner directly optimized for this purpose. It is in particular not necessary to move parts of a packaging in the track system. It is, for example, not necessary to collect the individual part portions after one another on the production of multi-sort packs by moving around a packaging component such as a so-called tray.

Provision can furthermore be made in accordance with the invention that at least one carrier, and in particular every carrier, is configured to remain at the transport mover during operation or for an only temporary separation from the transport mover and a subsequent reuse or recycling at the transport mover or at another transport mover. The carriers by which the portions are received are therefore in this respect also a component of the transport system on a possibly temporary separation from the respective transport mover and are consequently not external components such as parts of a packaging.

The use of a track system in accordance with the invention having one or more tracks for the transport movers does not necessarily mean that the transport movers are only movable in one dimension such as individual cars of a roller coaster. A line is also to be understood as a track in the sense of the invention on which the transport movers are also movable transversely to the direction of travel, for example like automobiles on a road having a sufficient width.

Irrespective of this possible design of the invention, provision is made in accordance with a preferred further development that the transport movers are movable at least sectionally only in one dimension in the track system.

Provision is in particular made in this respect that the transport movers are compulsorily guided by the track system.

A guide for the transport movers can, for example, comprise a rail system, in particular a pair of rails, which comprises rails which run in parallel with one another and by which or between which the transport mover is guided.

The transport mover can slide or roll on a guide, for example.

A guidance of the transport mover can also take place over its rotors. For this purpose, the rotor can have slits or grooves which can be in engagement with one or more rails of a guide rail system. It is, however, not compulsory that such guide means of the transport movers are provided at their rotors. A guidance of the transport movers can take place fully independently of the rotor. The rotor can in particular only serve for a drive of the transport conveyor.

Provision is preferably made that the transport movers are arranged in the track system secure against falling out. This can in particular take place by engaging behind, engaging beneath and/or engaging around a guide, in particular by means of the rotor.

Such an arrangement secure against falling out is in particular of advantage when the track system comprises such track sections in which the transport movers or their rotors are arranged at the side or at the bottom.

Provision is made in an embodiment that the track system for the transport movers comprises a drive section and a guide connected to the drive section. The functions "drive", on the one hand, and "guide", on the other hand, in the track system can hereby at least be separated from one another for some track sections and in particular for all track sections.

The drive section can in particular be configured as a stator of a linear motor which cooperates with the rotors of the transport movers. Such a drive principle, which represents one of a plurality of drive principles possible within the framework of the invention, will be looked at in more detail in the following.

As regards the drive of the transport movers in the track system, the transport movers can each be designed as self-propelling or as self-running in accordance with a possible aspect of the invention. For this purpose, for example, each transport mover can take along its own drive unit which, for example, comprises one or more electric motors. The drive unit can, for example, drive one or more balls, rolls, rollers or wheels by means of which the transport movers can each travel autonomously in the track system.

An energy supply of the drive units can take place via the track system, for example. Electrical energy can hereby be supplied to the transport movers permanently, for example. Alternatively or additionally, each transport mover can comprise a rechargeable battery. The charging can take place, e.g. inductively, at one or more specific track sections, for example with a stationary transport mover. Alternatively or additionally, the charging can take place, inductively for example, during the transport principle with a moving transport mover.

Provision can be made alternatively to a self-propelling drive or a self-running drive of the transport movers that the drive for the transport movers is respectively formed by the rotor and by the track system, with the respective rotor and track system in particular together forming an electromagnetic drive for the transport mover.

The drive for the transport movers can respectively be formed as a linear motor, in particular as a linear synchronous motor or as a linear induction motor.

Such linear motors are generally known in connection with a plurality of applications. Such a drive principle is inter alia advantageous when comparatively small loads are to be transported such as is the case in the sector of the transport of food products in question here.

A transport system which can generally be used for the invention and to which reference will explicitly made with respect to the requirement of performability of the invention is offered by the company MagneMotion, Inc., domiciled in Devens, Mass., USA. This system is based on a so-called LSM drive, that is on a drive by linear synchronous motors which is to be distinguished from a so-called linear induction motor (LIM drive). Unlike an LIM drive, in an LSM drive, a magnetic field is not induced by means of the so-called electromagnetic traveling field, but the magnetic field is rather provided by permanent magnets. When the rotor of the linear motor carries the permanent magnets and the stator of the linear motor produces the electromagnetic traveling field, the drive principle of an LSM drive can be figuratively imagined such that the transporter provided with the permanent magnet is pulled over the transport line by the magnetic field moving along the stator. Such a transport system or drive principle is described, for example, in WO 2003/029651 A2 and WO 2010/085670 A1. Reference is herewith explicitly made to these documents with reference to the disclosure of a possible drive principle or function principle for the invention.

The track system or the individual tracks of such a transport system can be divided into a plurality of consecutive track elements which so-to-say each form a single linear motor and can be individually controlled by a control device. If the transport movers located in the track system can be identified simultaneously by means of the control device, generally any desired number of transport movers can then be operated simultaneously in this manner in a track system of generally any desired complexity and can be individual moved in this respect.

The above-mentioned company MagneMotion, Inc, uses a technique for the identification and localization of the individual transporters in the track system in which each transporter is provided with a transducer which induces a signal in the stator formed by the track system, whereby it makes it possible for the control device to determine the exact position of the transporter with an accuracy dependent on the size of the total system of fractions of a millimeter or fractions of a centimeter. An advantage of this system comprises no external sensors being required. In the control system of the company MagneMotion, Inc., it is additionally ensured by a division of the tracks into a plurality of track elements—which so-to-say each represent a single linear motor—that no collisions occur between the transporters following one another. A transporter can thus only travel into the next track element when it is allowed by the control device, which is in particular not the case when another transporter is in the track element.

Against the background of this generally known transport system, provision is made in a possible embodiment in the invention that the track system is configured as a stator of the linear motor.

The rotor is in particular a respective component of a linear synchronous motor, with the rotor in particular comprising at least one permanent magnet and the track system being configured as a motor stator.

The track system is in particular divided into a plurality of track elements which in particular each represent a single linear motor and which are individually controllable by the control device.

The transport movers are preferably identifiable by the control device.

The transport movers can furthermore preferably be localized in the track system by the control device.

As already initially mentioned, a simultaneous slicing of a plurality of food products by means of a signal slicer and thus a multi-lane operation in particular has an ever greater importance in practice due to the increased product throughput associated therewith in the slicing of food products and in the subsequent transport of the slices produced in this respect or of portions formed from the slices.

Against this background, provision is made in accordance with an embodiment of the invention that the track system is configured for a multi-lane operation and in particular comprises a plurality of tracks or track sections which run in parallel with one another at least section-wise.

The track system can comprise at least one loading region in which portions are received by the transport movers and at least one unloading region in which the portions are discharged by the transport movers. A separate loading region as well as a separate unloading region can be provided for every lane of the track system, that is in particular for each of the plurality of track sections running in parallel with one another. Alternatively, a plurality of lanes or track sections can comprise a common loading region and a common unloading region.

In accordance with a preferred embodiment, the track system between the loading region and the unloading region is multi-lane at least sectionally.

Provision can be made with a multi-lane operation that the transport movers can carry out at least one lane change between the loading region and the unloading region of the track system.

Provision can furthermore be made in accordance with the invention that at least one transition region at which the number of lanes changes is provided between the loading region and the unloading region of the track system.

The apparatus in accordance with the invention and thus a transport system based on the invention can completely replace the conveyor belt systems known from the prior art. Provision can in particular be made in such a case that a loading region of the track system is configured to receive slices falling under the influence of gravity and/or slices coming directly from an apparatus for slicing food products, in particular from a high-speed slicer, by means of the transport movers. In other words, slicing takes place directly onto the transport movers or directly onto their carriers in such a system.

Alternatively, so-called hybrid systems are also possible in which the transport system comprises, on the one hand, an apparatus in accordance with the invention and, on the other hand, another transport system or conveyor system for the portions, in particular a conventional conveyor belt system. The conveyor belt system can, for example, directly adjoin the slicing apparatus in accordance with the previously known systems and can, for example, satisfy a portioning function as well as a subsequent weighing function, whereupon a transfer to a transport system formed In accordance with the invention takes place.

In accordance with an embodiment of the invention, a loading region of the track system can accordingly be configured to receive portions coming from a conveyor system, in particular a conveyor system comprising at least one conveyor belt, by means of the transport movers. Robots can be provided for such a taking over of portions from a conveyor system which, for example, comprises conveyor belts, in accordance with a variant. Alternatively or additionally, it is possible to adapt the carriers of the transport movers such that a respective portion coming from a continuous conveyor belt can be received securely and reliably on the carrier.

In practice, a function of the apparatus in accordance with the invention in particular comprises transporting the portions over a specific line without additional functions necessarily having to be satisfied in so doing. Such lines on which such a transport function is at least primarily satisfied will also be called a normal line in the following. The designation of a line as a normal line does not, however, preclude additional functions from being able to be satisfied on this line, i.e. it is not precluded that track sections of the track system forming a normal line are configured to carry out additional functions such as the weighing of transport movers or of portions transported by them.

The track system in accordance with the invention can accordingly comprise such lines which are not primarily conceived only for a conveying of the portions from one location to another location, even if the portions on such lines are actually moved from one location to the other. Lines in which the transport function of a normal line is not in the foreground, but rather another function of whatever form, will also be called functional lines in the following.

Provision is accordingly made in accordance with and embodiment of the invention that the track system comprises at least one functional line for the transport movers in addition to at least one normal line which in particular leads from a loading region to an unloading region.

The normal line and the functional line can be connected to one another via at least one branch at which transport movers incoming over one or more track sections arriving at the input side can each continue to run in one or more track sections departing at the outlet side. Such branches, which are also called branch connections and which will be looked at in more detail below, can generally be of any desired complexity. A branch can, for example, form a comparatively simple switch at which transport movers incoming via a single track section can only continue to run in two possible departing track sections. However, substantially more complex branches are also conceivable which are configured, for example, to change the lane spacing between track section extending in parallel with one another in a functional region of the track system with multi-lane operation or to effect a change of the number of lanes, that is to change from an n-lane operation to an m-lane operation, within the framework of a multi-lane operation. This will also be looked at in more detail below.

In accordance with an embodiment of the invention, the normal line and the functional line can together form a continuous line. This to also, but not exclusively, to be understood as such a line guidance in which the functional line branches off from the normal line at one point and opens back into the normal line at another point, but the normal line does not end or start at the position of the branch connection or of the opening. The functional line can therefore form a loop or a part of a loop which can be run through, but does not have to be run through, by the transport movers.

The normal line and the functional line can be disposed in a common plane extending at least substantially horizontally.

It is also possible that the normal line or the functional line are disposed in different planes each extending at least substantially horizontally. Provision can be made for such a multi-plane or multi-level operation that specific functional lines or additional devices not configured as track sections of the track system are in turn present to allow the transport movers to change between the individual planes.

Provision can be made in a further embodiment of the invention that the normal line and the functional line are disposed in a common plane extending at least substantially vertically. Specific track sections can be provided for this purpose which extend in the vertical direction or inclined with respect to the horizontal. Specific transition sections, for example track sections having special guides to which specifically configured transport movers or their rotors are adapted or track sections configured as a ramp, can be provided for the transition between a horizontal movement, on the one hand, and a vertical movement or a movement inclined obliquely with respect to the horizontal, on the other hand.

In an embodiment of the invention, the functional line is configured as a rejection line or as an expulsion line via which transport movers whose portions satisfy or do not satisfy at least one predefined or predefinable criterion can be led out of a normal line. Such criteria are, for example, a portion weight differing from a desired weight, a number of slices within a portion differing from a desired number, or visual defects at a portion, e.g. at the topmost slice of a portion.

Provision can be made in accordance with a further embodiment of the invention that the functional line is configured as a rejection line or as an expulsion line for transport movers which satisfy or do not satisfy a predefined or predefinable condition independently of their portions can be led out of a normal line.

Such a leading out of a transport mover can be initiated, for example, when the transport mover has a state of wear and/or contamination which can no longer be tolerated. Such states can be recognized automatically, for example by means of a suitable sensor system.

A leading out of transport movers can in particular take place automatically.

In accordance with an embodiment, of the invention, at least one functional line is configured as a return line for the transport movers which in particular leads from an unloading region to a loading region. Whereas with a continuous conveyor belt the lower run so-to-say automatically provides a return of the support surface serving for the transport of portions, a different return, which is configured as a return line, is provided for the individually movable transport movers. It is thus not necessary to deploy the transport movers in the track system again, e.g. manually at a different point, after satisfying their transport function. The advantage of such a return line is that it can be used for additional functions which may anyway be required, but with such a use not being compulsory.

In an embodiment, the return line can be formed at least sectionally by a track in which the transport movers are oriented differently, in particular upside down, with respect to their orientation on a normal line. In this respect, the transport movers are e.g. moved directly with downwardly facing support surfaces of the carriers. Such a return can be particularly space-saving in dependence on the construction circumstances. In addition, such a return is advantageous when the transport movers, in particular their carriers, can be cleaned on their way back in that, for example, the return line is guided such that the transport movers run through a cleaning bath with the carriers.

The transport system in accordance with the invention allows the speed of the transport movers and their spacing from one another to be changed as desired in principle. This can be utilized on a return of the transport movers for a simplification such that a higher speed and smaller spacings between consecutive transport movers are permitted for the return of the transport movers, for example.

Provision is accordingly made in an embodiment of the invention that a plurality of normal lines are provided and the number of the normal lines is smaller than the number of return lines. Only exactly one return line is preferably provided for a plurality of normal lines. Such a return line can extend, for example, in a plane beneath the transport plane defined by a plurality of normal lines. The width of the system predefined by the normal lines hereby does not need to be exceeded for the return of the transport movers and only a comparatively little space is required for the return beneath the normal lines.

Provision is made in accordance with a further embodiment of the invention that at least one return line is configured as a buffer line or at least comprises a buffer line.

A buffering of portions is in particular required in the field of slicing food products in question here when—as is frequently the case in practice—more portions are produced per time unit by means of one or more slicing apparatus than are led off at the end of the system, in particular by means of a packaging machine. If one or more return lines for the transport movers which are anyway present are used for a buffering, an advantageous synergy effect is hereby achieved.

Provision can generally be made in accordance with the invention that an additional function is integrated into at least one return line, in particular a buffer function, cleaning function and/or restoring function. A restoring function can, for example, comprise the carriers being temporarily separated from their respective transport movers, at one point of the track system, in particular for the purpose of cleaning, and being attached to the respective transport mover again or to another transport mover at another point of the track system or at the same point, for example subsequent to a cleaning procedure, and thus being reused or recycled. Such a restoration function can be integrated into a return line of the track system in accordance with the invention.

In a further embodiment of the invention, the track system can comprise at least one track section describing a helical line about a central axis extending at least substantially vertically. The transport movers can—like automobiles in a multi-story car park—change between different levels by means of such a helical or spiral track.

Such line routes are not possible with belt conveyor systems since only straight-line line sections can naturally be produced with belt systems.

Another type of line route, which cannot be produced with conveyor belt systems, comprises, in accordance with a further embodiment of the invention, providing at least one track section in the track system which is twisted at least once or several times consecutively, with each twist in particular comprising at least approximately 90°. Such a twist can be utilized as a continuous transition track section between a track section of a C type and a track section of a U type. Such track sections of different types will be looked at in more detail in the following.

As already mentioned above, it can be advantageous in specific applications to move the transport movers in different planes or to change between different planes. The track system can in particular, but not exclusively, comprise at least one at least regionally curved track section for such a transition between different planes, with the curvature extending in an at least substantially vertical plane. Such a track section can—in a side view—approximately have an S shape or a Z shape with gently rounded transitions between the straight-line sections.

In accordance with a further embodiment of the invention, the track system can comprise at least one track section which is configured as a ramp or bridge or as part of a ramp or bridge. Such a track section also defines a track for the transport movers which in particular extends in an at least substantially vertical plane.

A basic advantage of the invention is that generally any desired tracks can be predefined in three-dimensional space for the transport movers, i.e. so-to-say as in a roller coaster two given points in space can be overcome by a line which can extend as desired, which is defined by the track and along which the transport movers are moved during operation. Such trajectories of any desired form can obviously not be produced with conveyor belt systems.

Provision is accordingly made in accordance with an embodiment of the invention that the track system comprises at least one track section which comprises at least one one-dimensional track having a first point and a second point, with the track between the first point and the second point describing a trajectory or a line in space which does not extend only in a straight line and which does not lie in a single plane.

It has already been mentioned above that the provision of branches in the track system can in particular play an important role within the framework of a multi-lane operation.

Provision can accordingly be made in accordance with an embodiment of the invention that the track system has at least one branch at which transport movers incoming via one or more track sections arriving at the inlet side can each run on in one or more track sections departing at the outlet side.

The branch can be configured as a switch having a moving adjustment mechanism.

Provision can alternatively be made that the branch does not have any moving parts and that the control device is configured to predefine the respective route between the track sections by controlling a drive for the respective transport mover.

In an embodiment, the track sections of the branch can lie in a common plane which extends at least substantially vertically. Provision can in particular be made in this respect that the track sections are formed in C shape and are open to the side.

In an embodiment, the track sections can at least substantially directly merge into one another at the branch.

At least one possible route for the transport movers can be at least sectionally curved at the branch.

Provision can be made that at least one intermediary track section, which is in particular straight, is located between the track sections at the branch.

In a possible embodiment, each possible route for the transport movers comprises only straight-line sections at the branch.

Provision is made in an embodiment of the invention that every possible route at the branch includes at least two changes of direction of 90° in each case for the transport movers.

Provision can be made in accordance with an embodiment that the track sections are fixed relative to one another at the branch.

Provision is made in a further embodiment of the invention that at least one track section, in particular at least one intermediate track section, at the branch is movable relative to the other track sections, is in particular rotatable about an axis which extends perpendicular to a plane in which the track sections of the branch lie, to select a respective route for the transport movers. Such a branch can therefore be configured in the manner of a turntable of engine sheds in particular previously known in railroads.

In accordance with an embodiment of the invention, the track system can comprise at least one track section which is adjustable as a whole. Such an adjustment can in particular take place such that the respective track is interrupted at least temporarily.

A plurality of track sections which in particular extend in parallel with one another can be adjustable independently of one another or together.

The adjustment movement of the track sections can comprise a linear translation movement or can be exclusively a linear translation movement.

The track section can be adjustable in an at least approximately horizontally extending plane transversely to the transport direction.

Alternatively or additionally, the track section can be adjustable in an at least approximately vertical direction.

In an embodiment of the invention, the track section can be adjustable while maintaining its orientation in space.

The adjustment movement of the track section can comprise a pivot movement or can exclusively be a pivot movement. The pivoting can in particular take place about a pivot axis extending at least substantially horizontally transversely to the direction of transport.

In an embodiment of the invention, at least one movable track section can be coupled to an adjustable track section and can be able to be taken along by the adjustable track section.

In a further embodiment of the invention, the adjustable track section is connected in an articulated manner to an upstream or downstream track section.

A particular aspect of the invention comprises not using the track system exclusively for moving transport movers carrying portions, but simultaneously using it to carry out specific additional functions to optimize the transport of the portions in multiple regards.

Provision is accordingly made in accordance with an embodiment of the invention that at least one functional mover is provided which is movable in the track system and which comprises a rotor, which cooperates with the track system, and at least one functional means which provides a function different from the transport function of the transport movers.

As regards the general movement principle of the function mover or movers and in particular as regards the drive principle, provision is in particular made that the functional movers correspond to the transport movers. The rotors of the transport movers and of the functional movers can in particular be at least substantially identical. If—as explained above—a linear motor formed by the movers and the track system together is used as a drive, in particular as a linear synchronous motor (LSM drive), provision is then also made with the functional movers that their rotor comprises one or more permanent magnets.

All the statements above and in the following with respect to the principle of movement or drive and thus with respect to the cooperation of the movers with the track system, which were made with respect to the transport movers, thus also apply to the functional movers and vice versa. This also applies to all other statements on transport movers or functional movers if this does not produce contradictions. "Movers" are therefore also simply addressed within the framework of this disclosure, and indeed in particular when the distinction between transport movers, on the one hand, and functional movers of any type whatsoever, on the other hand, is of no importance. A transport mover can also act at least at times as a functional mover and can carry out one or more functions which do not exclusively serve for the transport of one or more portions and a functional mover can serve at least at times for the transport of one or more portions and thus be a transport mover.

The individualization of the individual movers in the track system generally given in accordance with the invention can advantageously be used to provide not only transport movers, but also additionally functional movers, and indeed generally at any desired points in the lane system and in particular in the same tracks in which the transport movers are also moved.

An embodiment of the invention is accordingly characterized in that the or each functional mover is movable in the same tracks as the transport movers.

The or each functional mover is in particular movable simultaneously with the transport movers during operation.

The common operation of differently configured movers in the track system possible in accordance with the invention allows a plurality of movers arranged in the track system and in particular following one another directly in a track to cooperate.

Provision is accordingly made in accordance with an embodiment of the invention that at least one functional mover is associated with at least one transport mover, with the functional mover in particular directly following the transport mover or the transport mover directly following the functional mover.

In accordance with an embodiment, the transport mover and the functional over are movable in a coordinated manner by means of the control device.

Provision is in particular made that the functional mover is configured to cooperate with the transport mover, in particular with its carrier. This cooperation can take place, for example, via a preferably mechanical coupling device, e.g. a coupling rod.

A possible kind of such a cooperation between movers which is particularly advantageous for practice can comprise using a functional mover to directly rotate the carrier of a transport mover in order in this manner to align a portion lying on the carrier in a desired manner so that the portion receives a specific orientation on the transport mover, and thus with respect to the track, said specific orientation being advantageous, for example, for a further processing or handling. An effort which is extremely high in part is made in the prior art to align portions by rotation in conventional transport systems which work with conveyor belts. A rotational alignment of portions can take place in a comparatively simple and nevertheless precise and reliable manner in the track system in accordance with the invention by a coordinated operation of mutually associated movers.

Provision is accordingly made in accordance with an embodiment of the invention that at least one functional mover is configured to rotate the carrier of a transport mover relative to the rotor, in particular about an axis extending perpendicular to a support surface of the carrier provided for the portion.

An influence on a transport mover by means of one or more functional movers can be made by a direct relative movement between the transport mover and the functional mover or functional movers.

Provision is thus made in accordance with an embodiment of the invention that the transport mover and at least one functional mover can additionally be movable relative to one another by means of the control device during their common movement, with a device being provided by means of which this relative movement can be converted into an action on the transport mover, in particular on its carrier.

If, for example, a transport mover and a subsequent functional mover move at a speed which is always the same and thus at the same distance from one another along a track, no action on the transport mover or on its carrier then takes place by the functional mover. The carrier of the transport mover is not rotated in so doing, for example. To rotate the carrier, the functional mover is accelerated or decelerated relative to the transport mover. The spacing between the transport mover and the functional mover hereby changes and this spacing change can be converted into a rotational movement of the carrier, for example by means of a coupling rod between the functional mover and the carrier of the transport mover.

In general terms, an aspect of the invention is therefore characterized in that a directly induced relative movement and thus a spacing change between two movers moved consecutively in a lane is converted into an actuator movement by which an additional function of generally any desired form can be carried out at one or both movers.

It can be advantageous in dependence on the respective application and on the respective circumstances if the functional mover or movers are not moved in the same tracks as the transport movers, but rather if one or more separate tracks, also called auxiliary tracks in the following, are provided for the functional movers. The functional movers then, for example, run along next to the transport movers, which does not, however, change anything about the above-mentioned general basic principle according to which a spacing change is induced by a direct acceleration or delay of a functional mover and this is converted into an actuator movement, for example for rotating the carrier of the transport mover.

Such an auxiliary track concept can be advantageous, for example, when it is not desired that functional movers are located between transport movers, i.e. if only transport movers should be present directly after one another in a track and the additional effort for a possible required expulsion of functional movers located between consecutively following transport movers should not be performed.

An embodiment of the invention accordingly provides that, in at least one line section of the track system, a track is provided for the transport movers and at least one auxiliary track, in which at least one functional mover is movable, is provided which is associated with the track and which in particular extends in parallel with the track.

Provision can be made that at least one respective auxiliary track runs at both sides of the track and at least two functional movers, of which the one is movable in the one auxiliary track and the other is movable in the other auxiliary track, can be associated with at least one transport mover.

In accordance with the invention, the additional functions which can be carried out by functional movers are not restricted to a cooperation with transport movers. The functional movers can rather also take over other work.

Provision is thus made in accordance with an embodiment of the invention that least one functional mover is configured as a cleaning mover for cleaning the track system. One or more cleaning movers can be moved in the track system together with the transport movers at specific times or permanently.

Provision is made in accordance with a further embodiment of the invention that at least one functional mover is configured as a controlling mover for controlling the track system, in particular with respect to existing or potential problems such as contamination or wear.

The identification capability and localization capability of the individual movers by means of the control device makes it possible for it to distinguish between the individual movers. If there are therefore additional movers among the transport movers carrying the portions which do not carry out any transport function, but rather satisfy additional work, this then does not impede the actual transport operation.

In accordance with a further embodiment of the invention, at least one functional mover is configured as a lift mover with which a track section is associated which extends at least substantially vertical and in which the lift mover is movable. Such lift movers can, for example, be used to change transport movers between different horizontal planes of the track system. For this purpose, the functional movers can be able to be coupled to one or more lift movers in a suitable manner at a transfer point. It is alternatively possible to configure a transfer point such that one or more lift movers do not take over a respective transport mover as a whole, but rather only its carriers. The lift movers can e.g. in this manner form a vertical buffer for portions.

Provision can be made in accordance with a further embodiment of the invention that at least one functional mover is configured as a rotational mover or flip-over mover with which an open or closed, curved, in particular circular, track is associated in which the rotational mover or flip-over mover is movable. Such a mover will also simply be called a rotational mover or flip-over mover in the following.

Such a rotational mover principle can in particular be used for flipping over portions. For example, two rotational movers which are arranged diametrically opposite one another in a circular track can take over the carrier of an incoming transport mover and can subsequently be moved by 180° in the circular track. The portion can be arranged during the rotating procedure between its original carrier coming from the incoming transport mover and a counter-carrier provided between the two rotational movers such that the portion comes to lie after the 180° rotation, that is after the flipping procedure, on the counter-carrier which is transferred subsequent to the flipping procedure to a waiting transport mover by which the portion flipped in this manner is transported onward. Such a rotational station or flip-over station can be equipped with a suitable vertical movability to hold the portion between the carrier and the counter-carrier and to adapt the respective support plane to the level of the incoming transport mover or of the transport mover waiting to take over the carrier or the counter-carrier.

The individual mover principle in accordance with the invention has proven to be of particular advantage here since a flipping of portions by means of conventional conveyor belt technology is admittedly generally possible, but requires an extremely high effort.

In accordance with a further embodiment of the invention, at least one functional mover can be configured as a maintenance and/or inspection mover which is provided with at least one detection device for recognizing problems at the track system. Such problems can in particular be contamination on or damage to the track system. The detection device is preferably configured for communicating with the control device.

The principle in accordance with the invention of individually moving movers in a track system generally makes it possible to select the orientation of the movers in space generally as desired, i.e. the movers do not have to move in a respective track standing upright in the sense that the holder disposed between the rotor cooperating with the track system the carrier carrying a portion upwardly exits the track. An operation with movers moved while standing upright is in particular present when the track in which the movers are moved has a U shape and is upwardly open. Such a track type can in particular be used when the movers are to be moved in an at least substantially horizontal plane.

Provision is accordingly made in accordance with an embodiment that at least one track section of the track system which in particular extends horizontally or inclined with respect to the horizontal comprises a track having a U shape which is upwardly or downwardly open.

A downwardly open track makes possible an upside down orientation of the movers moved in the track, which—as already mentioned above—can be used, for example, for cleaning the carriers of the transport movers in that the upside down transport movers are moved through a cleaning bath with their carriers.

It can in particular be of advantage when mover movements having a vertical component are to take place for tracks to be used which are not upwardly open or downwardly open, but which rather have a C shape and are open to the side.

Provision is accordingly made in an embodiment that at least one track section of the track system which in particular extends vertically or inclined with respect to the horizontal comprises a C track with a shape which is open to the side.

In a further development, a track section of the track system which in particular extends vertically or inclined with respect to the horizontal comprises two tracks which extend in parallel and whose open sides face one another. Such a dual track or parallel track can, for example, be used as a vertical buffer or as a lift for transport movers or their carriers in that, for example, two lift movers configured for taking over a transport mover or a carrier cooperate by a coordinated movement in this dual track section or parallel bath section.

The manner in which, with a respective transport mover, its carrier is held at the rotor cooperating with the respective track system can be made dependent on the respective track type in accordance with the invention. The holder can extend in a straight line or be angled between the rotor and the carrier.

Provision is thus made in accordance with an embodiment that at least one transport mover, which is in particular configured for a U-shaped track, comprises a holder which extends between the rotor and the carrier at least perpendicular to a support plane for the portion defined by the carrier.

In an alternative embodiment, at least one transport mover, which is in particular configured for a C-shaped track, can comprise a holder angled at least once.

The size and/or the positioning of the carrier relative to the rotor can be selected in dependence on the respective application and on the respective track type.

In accordance with an embodiment, in at least one transport mover, the carrier has a larger dimension than the rotor at least transversely to the direction of transport.

In a further embodiment, in at least one transport mover, which is in particular configured for a U-shaped track, the carrier is arranged transversely to the direction of transport at least substantially centrally with respect to the rotor.

In accordance with a further embodiment, in at least one transport mover which is in particular configured for a C-shaped track, the carrier is arranged transversely to the direction of transport off-center with respect to the rotor, in particular at least by half and preferably substantially completely to the side next to the rotor or the track.

Depending on the respective application and on the respective circumstances, it can be of advantage if not only one and the same track type is present in the track system, but if rather different track types are used. Specific lines can thus, for example, comprise U-shaped tracks or track sections, whereas other lines can be provided with tracks or track sections of the C-type or can have a combination of track types.

To ensure a reliable and in particular gentle transport of portions over a change of track type, provision can be made in accordance with a variant that the portions or the carriers are transferred at a transfer point from a mover which is configured for one track type to another mover which is configured for a different track type. Such a portion transfer is, however, associated with a certain effort.

Provision is accordingly made in accordance with another variant of the invention that movers are used which are compatible with different track types and which are in particular provided with specifically configured rotors for this purpose.

Provision is accordingly made in accordance with an embodiment that at least one transport mover, in particular its rotor, is compatible with different track types, in particular both with a U-shaped track and with a C-shaped track, and/or with track sections oriented differently in space and in particular extending pair-wise perpendicular to one another.

To illustrate this concept, a parallelepiped rotor can be imagined whose six side surfaces each have at least one guide means of any desired form, for example a slit or a groove into which a guide rail of the track system engages. In this respect, two respective mutually oppositely disposed side surfaces belong together in that these two side surfaces together provide a guide of the rotor at a respective track type. Each of the three pairs of respective mutually oppositely disposed side surfaces is then provided for one track type or for one track orientation. The left side surface and the right side surface of the rotor are thus, for example, used when the rotor is moved along a horizontal track of the U type. The upper and lower side surfaces of the rotor can cooperate with a track section of the C type which likewise runs horizontally or also vertically. The front and rear side surfaces of the rotor can e.g. be used when the rotor is to cooperate with a vertically extending track section.

In a further development, each side surface of the rotor can have a respective two guide means oriented perpendicular to one another, for example respectively a horizontally oriented slit and a vertically oriented slit, such that each side surface can cooperate both with a horizontally extending guide rail of a track section and with a vertically extending guide rail of a track section. Such a rotor, and thus the respective mover, can change in a simple manner between track sections overall which differ from one another in any desired form both with respect to their type and with respect to their orientation in space.

An aspect of the invention consequently generally comprises at least one transport mover having a hybrid rotor which comprises at least two rotor sections or rotor regions of which the one is compatible with one track type and/or with one track orientation and the other is compatible with another track type and/or with another track orientation.

It is possible to change between differently configured track sections with a mover equipped with such a hybrid rotor.

Provision is thus made in accordance with an embodiment of the invention that at least one transport mover can change between consecutive track sections of different types and/or of different orientations in space during operation.

It is in principle possible that such a change can take place while utilizing the movement energy of the transport mover. Consecutive track sections of different types and/or of different orientations in space can thus, for example, be arranged at a specific spacing from one another, with this gap being able to be overcome without a problem by the rotor which continues to move due to its inertia. External aids which can continue to move the movers over a specific distance, in particular over a relatively short distance, are also possible in accordance with the invention.

Provision is alternatively made in accordance with an embodiment that the track system has at least one transition region at which consecutive track sections of different types and/or of different orientations in space overlap one another at least in part, are present in parallel, engage with one another or merge into one another, in particular with their guides for the transport movers preferably provided with hybrid rotors.

The above-explained possible aspects of the invention do not apply only to transport movers, but can also generally be provided for all movers present in a respective system. Functional movers can thus, for example, also have a respective hybrid rotor which is compatible with different tracks.

Provision is made in accordance with a further embodiment that at least one transport mover and a functional mover movable in the track system can be releasably coupled to one another, in particular via their rotors.

Provision can in particular be made in this respect that at least one functional mover is movable in a track type with which the rotors of the transport movers are not compatible.

Although provision can generally be made that functional movers are also configured, in addition to a function provided by them, to transport one or more portions, provision is made in an embodiment of the invention that the functional movers do not have a carrier suitable for portions.

An aspect of the invention is based on the recognition that it is of advantage in the technical field in question here, that is for the transportation of food portions which comprise one or more slices directly produced beforehand by slicing food products, for the carrier not necessarily to have to be arranged in a fixed orientation relative to the rotor and/or for the carrier to be able to be removed at least temporarily from the rotor. A variety of handling possibilities are hereby opened up such as can advantageously be used in the transportation of food portions.

Provision is thus made in accordance with an embodiment of the invention that the orientation of the carrier relative to the rotor can be changed in at least one transport mover.

Provision can be made that the carrier is rotatable relative to the rotor in at least one transport mover. The axis of rotation can in particular extend in a perpendicular manner about a support surface of the carrier provided for the portion. It is hereby possible to rotate a portion located on the carrier. Portions of a plurality of transport movers can be aligned with respect to one another, for example. It is furthermore possible to coordinate the orientation of portions with respect to a downstream packaging machine or to another device of any design to which the portions are e.g. to be transferred. Packs can, for example, require a specific orientation of the portions which is not yet given on reception of the portions on the carriers of the transport movers. It is thus possible, for example, to rotate the portions by 90° in each case to change a longitudinal alignment into a transverse alignment of the portions. It is furthermore possibly by a rotation of the carrier to correct possible misalignments of portions. Such a rotation of portions is at best achievable with a considerable effort using conventional conveyor belt systems.

The rotation of the carrier relative to the transport mover and thus the possibility of rotating portions is particularly advantageous when the transport takes place in a multi-lane operation since, for example for a format set formation, a mutually aligned orientation of portions together forming a format set is in particular of advantage with respect to a transfer of the format set to downstream units such as a packaging machine.

It can be desirable for specific applications or functions to guide at least one track of the track system such that the rotor moved in the track changes its orientation in space, for example inclines to the side, to the front or to the rear. So that such track extents do not impair a secure transport of the portions, provision can be made in accordance with an embodiment that, in at least one transport mover, the carrier has a support surface for the portion and is attached to the transport mover such that the support surface is always oriented horizontally independently of the orientation of the rotor. A pendulum principle can, for example, be used in that e.g. the carrier and a weight are attached to the holder at different sides of an axis of rotation, with the arrangement being selected such that the weight always provides a vertical alignment of the holder independently of the orientation of the rotor in space such that the support surface of the carrier attached to the holder is always oriented horizontally.

A further aspect of the invention is based on the recognition that it can be advantageous for the carrier or a support surface of the carrier not to permanently form an unchanging contiguous surface. On slicing food products and on the subsequent transporting away of the portions produced in so doing, it occurs in practice that, with a multi-lane operation, the lane spacing during the slicing, that is in the slicing apparatus, is smaller than is required by a downstream device such as in particular a packaging machine. In other words, the transport system has to be able in multi-lane operation to convert a smaller lane spacing into a larger lane spacing, or vice versa, i.e. it is desirable for the transport system to be able to change the lane spacing at least in one region.

This can take place, for example, by a corresponding extent of respective tracks which form a lane and which in particular extend in parallel. Such a concept is, however, a disadvantage when flexibility is required and the transport system should be able to form different inlet and/or outlet lane spacings.

Provision can accordingly be made in an embodiment of the invention that, in at least one transport mover, the carrier comprises a plurality of carrier segments which are movable relative to one another. A respective carrier can thus, for example, serve two lanes in a region having a comparatively small lane spacing and can receive two portions disposed next to one another. During the movement of the transport mover along this track thus provided for two lanes, two segments of the carrier forming the carrier each carrying a portion can be moved apart transversely to the direction of transport so that the spacing between the two portions and thus the lane spacing increases in size.

Such a function, that is the provision of a plurality of carrier segments movable relative to one another at a transport mover, cannot only be used for an increase in the lane spacing, but also for other functions.

Provision can generally be made with such a function that the carrier segments are movable between a base position in which the carrier segments together form an in particular contiguous support surface for at least one portion and at least one functional position in which one support surface or a plurality of mutually separate support surfaces is/are provided by the carrier segments which is/are increased in size with respect to the base position and/or is/are differently oriented with respect to the rotor.

In accordance with a further embodiment of the invention, the carrier is releasably attached to the rotor or to the holder in at least one transport mover.

Such a concept makes it possible to remove the carriers, for example for cleaning purposes. It is furthermore possible to transfer a carrier from one transport mover to another transport mover. Portions can thus, for example, change between different track types or different part systems of the track system.

If the carriers are, for example, removed for cleaning purposes, the transport movers can be restored at another region by reattaching the carrier to the rotor or holder. The removal and attachment can in particular take place automatically at correspondingly configured stations or functional regions of the track system.

Provision is made in accordance with an embodiment of the invention that at least one transport mover is configured to transfer its carrier to a functional mover movable in the track system. Such a functional mover can be identical to or of identical construction with a transport mover in that it becomes a transport mover after taking over a carrier.

Provision is accordingly made in an embodiment that at least one functional mover movable in the track system is configured to take over a carrier from a transport mover.

Provision can furthermore be made that at least one transfer point is provided for handing over and/or taking over transport movers or their carriers at a vertically extending track section. Vertically extending track sections can be configured, for example, as vertical buffers or can serve to change carriers between different horizontal planes of the track system.

A transfer of carriers between individual movers can, however, also take place for other purposes. It is thus possible, for example, to carry out a flipping over of portions in that a carrier having a portion lying on it is taken over by a rotational mover or flip-over mover, the portion is transferred to a carrier on flipping and this carrier now carrying the portion is transferred to a mover waiting at the outlet side.

At least one transfer point can accordingly be provided in accordance with the invention for the handing over and/or taking over of transport movers or their carriers at a functional region of the track system configured for flipping over the portions.

Provision can generally be made in accordance with the invention that at east one transport mover comprises one or more additional functions. If this additional function requires energy, this energy can, for example, be provided by the transport mover itself or via the track system.

Provision is accordingly made in accordance with an embodiment of the invention that at least one transport mover has an additional function with an energy requirement, in particular for handling portions and/or for communicating with the track system and/or with the control device, wherein the transport mover comprises its own energy supply, in particular a battery, a rechargeable battery and/or a mechanical energy store, and/or can be supplied with energy via the track system, in particular by electromagnetic induction.

An energy supply of a transport mover from the outside cannot only take place directly via the track system, but also via one or more additional movers.

A general aspect of the invention additionally provides that at least two movers can cooperate in the track system which are of generally any desired configuration and which satisfy any desired functions. The cooperation can take place in a purely mechanical manner. Alternatively or additionally, a cooperation by e.g. electrical, magnetic or electromagnetic interaction is also possible. This aspect of the invention is therefore characterized in that the movers in the track system are individually movable, on the one hand, but in that the possibility is present, on the other hand, that at least two movers cooperate at least at times to provide one or more additional functions which each go beyond a pure transport of portions.

Food portions which each comprise one or more slices cut off from a food product represent transport goods which are extremely demanding in some respects. Slices of sausage or cheese are, for example, not rigid like mechanical transport goods, but rather flexible. Food slices can furthermore be fatty, moist and/or sticky. Portions of food slices are not only present in stacked or overlapping arrangements, but can rather also represent more complex three-dimensional structures. This applies, for example, to so-called "shaved meat" arrangements. Portions of slices folded once or multiple times also have a three-dimensional structure. The corresponding portions are more or less sensitive depending on the size of the portion, the number of slices and the consistency or properties of the slices.

A transport of the portions which is as gentle as possible is therefore generally a material demand on a transport system in the technical field of the transport of food portions in question here. It must also be taken into account that food portions cannot adopt any desired orientations in space. Even if some portions can be flipped, it is not possible, for example, simply to dump portions. Due to the consistency of food slices, portions formed from them can also not simply be pushed on their contact surfaces.

A transfer of portions, in particular the handing over of portions to the carrier of a transport mover or the removal of portions located on the carrier, can consequently have a particular importance.

Conventional conveyor belt systems are generally well-suited for the transport of food portions. The transitions between consecutive conveyor belt sections can, for example, be designed such that a portion transfer takes place sufficiently gently.

Conveyor belts can also advantageously be used when food portions have to be transferred between different height levels, for example to form total portions from part portions or to place portions into packs.

An embodiment of the invention provides that, in at least one transport mover, the carrier comprises a conveyor device for a portion or is configured as a conveyor device. The conveyor device can comprise at least one conveyor belt. The conveyor belt can, for example, be a continuous conveyor belt or a tipping belt.

A special feature of this aspect comprises a moving away from and a maintenance of a conventional conveying concept, in particular using conveyor belts, being able to be simultaneously implemented with transport movers which are individually movable in a track system and of which at least one itself includes a conveying function for portions.

Transport movers provided with conveyor devices are able to pick and place food portions in a particularly advantageous manner. A plurality of transport movers can cooperate, for example, to form total portions from part portions. This is in particular of advantage for those applications which are gaining more and more importance in practice and with which multi-sort packs can be prepared.

It is advantageous on a transfer of food portions between conveyor belts if no relative movement takes place between the belts and the food portions. If the discharging conveyor belt is a continuous conveyor belt, provision is preferably made that the receiving belt is moved at the corresponding speed. The receiving belt can, however, also be at rest during the transfer. In such a case, the discharging belt can be a tipping belt which is moved away beneath the portion to be discharged, i.e. no movement of the portion to be discharged takes place in the conveying direction with such a tipping belt. The ground is rather only "pulled out from under the feet" of the portion.

Which type of conveyor belt is to be preferred depends on the respective application.

It is not absolutely necessary for an ideal, and in particular gentle, transfer of portions that the carrier itself is configured as an active conveyor device, for example as a conveyor belt. It is also possible to configure the carrier such that it can cooperate with conveyor devices which are also of any specific design and which transfer portions to the carrier or remove portions from the carrier.

Provision is accordingly generally made in accordance with an embodiment of the invention that, in at least one transport mover, the carrier is configured to cooperate with a handling device for the portions. This handling device can be a robot, for example. Alternatively or additionally, a handling device can be provided which is configured as a conveyor belt. This conveyor belt is, for example, a finger-edge belt or a knife-edge belt.

Provision can be made that the carrier has a structure allowing an engaging beneath a lying portion. The carrier can, for example, be of grid shape or of rake shape. The carrier can furthermore comprise rods, webs or projections. The carrier can thus, for example, be provided with a regular structure of projections, which may in particular be nub-like, which provides a network of passages extending at right angles to one another between the projections or nubs. A handling device, for example having a fork or a plurality of relatively narrow continuous conveyor belts arranged in the manner of a fork, can engage into the passages from two different directions rotated by 90° with respect to one another.

In an embodiment of the invention, the carrier can be configured to be moved relative to the holder by means of the handling device or to be removed from the holder, at least temporarily, in particular as a whole or in parts.

A carrier can thus, for example, be divided in the transport direction, i.e. can comprise a left hand carrier segment and a right hand carrier segment which are each configured such that they can, for example, be gripped by a robot and removed from the holder. As long as the robot does not move the two carrier segments away from one another, the portion remains on the carrier. The robot can thus transfer a portion lying on the two carrier segments to a discharge point where the two carrier segments are then moved apart by means of the robot, whereupon the portion falls into a packaging, for example. The robot can subsequently again transfer the two carrier segments to the holder or to another mover in order in this manner to again form a complete transport mover. The transport mover restored in this manner can then take up a new portion. In this manner, a carrier can temporarily become a part of a robot or of another handling device.

Provision is made in accordance with a further embodiment that at least one transport mover is provided with a display device, in particular an optical display device, by means of which information of generally any desired kind can be displayed which in particular relates to the portion or to the mover, e.g. information which relates to the weight of a portion in particular determined by means of a scale integrated into the transport mover or at a weighing region of the track system.

Provision can in this respect be made, for example, that the information represents the number of slices which have to be added to or removed from the portion so that the portion has a predefined desired value at least within a predefined or predefinable tolerance.

The display of different product properties and/or portion properties is thus generally possible in accordance with the invention.

As explained at another point, the determination of the weight of a portion and the provision of information relating to a portion or to a mover, of which the weight is only an example, has particular importance in this respect since it can be effected particularly simply using the transport system which is individual in accordance with the invention. If conveyor belts are used which are not very short, which is only exceptionally possible and thus at best at some few points for economic reasons in a conveyor belt system, conveyor belt systems are characterized in that each conveyor belt of the belt system conveys a plurality of portions. An individualization of these portions of whatever kind is thus naturally precluded. A huge effort is therefore made in conventional belt systems to achieve an individualization desired in practice. There are, for example, complex projection systems with which weight information is projected onto each individual portion since a conveyor belt conveying many portions can obviously not provide such an individual treatment of the portions.

This example from the prior art illustrates the advantages of the concept in accordance with the invention which in particular provides an abundance of additional functions for the transport of food portions of one or more product slices cut off directly beforehand beyond a mere transport of the portions, said additional functions also and in particular being able to satisfy the desired individuality principle since the transport of the portions is already based on the individualization concept.

A special feature of the concept in accordance with the invention is that it provides a variety of possibilities of implementing additional functions beyond the mere transport of portions. Such functions can be founded in properties or capabilities of the transport movers or other movers. Alternatively or additionally, the track system can be correspondingly designed to provide an additional function. This can be done by a specific arrangement of the individual tracks or track sections. Alternatively or additionally, it is possible to equip specific track sections with specific functions which are independent of the course of the corresponding track section in the track system.

A buffer function can be named as an example for a function which can be implemented by a corresponding arrangement or by a corresponding course of the track system. A function implemented by a specific embodiment of a track section can, for example, be the weight determination of portions, i.e. independently of the course or of the arrangement of the track system, a track section can be configured as a scale for determining the weight of portions.

Against the background of this general concept, provision can be made in accordance with an embodiment of the invention that the track system comprises at least one buffer designed for taking up a plurality of transport movers and/or carriers.

The buffer can comprise at least one track section of the track system. Alternatively or additionally, the buffer can be formed by an additional device. This additional device does not need to comprise a track section of the track system, but is rather configured to take over portions or carriers carrying portions from the transport movers and to place them on them again.

In an embodiment, the buffer comprises at least one buffer line which branches off from a normal line and opens back into the normal line. The buffer line and the normal line can lie in a common plane extending at least substantially horizontally or vertically. Depending on the circumstances, the track system can utilize an available width or depth. The track system can thus comprise a transport plane, for example, in which substantially normal lines extend in which the actual transport function is implemented. In addition, the track system can comprise one or more buffer planes which are disposed above the transport plane and/or beneath the transport plane and in which one or more buffer lines run. Special devices, e.g. vertically movable track sections which will be explained at another point, can be provided for a transfer between the individual planes.

In accordance with an embodiment, the buffer can be configured as a vertical buffer. The buffer can comprise at least one transport means which in particular extends at least approximately vertically and which is configured to take over an incoming transport mover or the carrier of an incoming transport mover. The buffer can comprise two transport means which extend in parallel with one another, in particular at least approximately vertically, and which are configured to together take over an incoming transport mover or the carrier of an incoming transport mover. The or each transport means can comprise a track section in which at least one functional mover is movable. Alternatively, the or each transport means can comprise a conveyor belt.

Such a transport means can be configured in the manner of a paternoster.

A further aspect of the invention comprises obtaining information on the individual portions and/or on the individual movers, processing it and/or using it for one or more applications. This will be looked at in more detail at another point.

With respect to a buffer function, such a concept can comprise the control device being configured to take account of the dwell times of portions in the lane system in the operation of the buffer. It can hereby be ensured that the dwell times of the portions in the buffer are minimized.

This function only represents an example for an information processing which is possible in a particularly simple and advantageous manner due to the individualization principle in accordance with the invention.

On the transport of food portions of one or more slices cut off from a food product, it is necessary in many applications to carry out change of the number of lanes. This can be necessary to adapt the number of lanes in which the slicing of the food products e.g. takes place in a high-speed slicer to the formats which a downstream packaging machine can process.

Provision can accordingly be made in accordance with an embodiment of the invention that a branching of the track system at which transport movers incoming over one or more track sections arriving at the inlet side can each continue to run in one or more track sections departing at the outlet side change from an n-lane operation to an m-lane operation, wherein n arriving and m departing track sections are present and n, m≥1 and n≠m or n=m applies.

Provision can furthermore be made in accordance with the invention that the track system comprises at least one functional region in which, in addition to at least one normal line, at least one overtaking line, waiting line or parking line is provided which branches off from the normal line at one point and opens into the normal line again at another point. Such a line can generally serve as a buffer line. In many cases, a buffer line is, however, configured such that a comparatively large number of transport movers can be received there. An overtaking/waiting or parking line can in contrast be characterized in that this line is configured and/or operated such that only a comparatively few transport movers and/or other movers are simultaneously present therein.

Provision can generally be made in accordance with the invention that the transport movers are not only movable in one transport direction along at least one track of the track system, but also in the opposite direction. This property generally present in the initially mentioned LSM drive principle can be used directly, for example, to form a dead end in the track system. Such an embodiment can also be helpful for the sorting of portions and for the assembly of format sets, for example.

Provision can accordingly be made in accordance with the invention that the track system comprises at least one functional region in which at least one dead end line branches off at least one normal line. Movers located in the dead end line can e.g. be moved out of the dead end line again at that point at which they ran into the dead end line.

The number of movers actually moved in the track system can be controlled or corrected in this manner, for example, in dependence on the cutting speed of one or more slicing apparatus and/or on the quantity of portions formed overall or per time unit.

If the portions to be transported not only comprise a single food slice, but are rather formed from a plurality of slices, which represents the most common application in practice, the formation of the portions from a plurality of food slices consequently has a special importance. A portioning and a completion are generally spoken of in this respect in connection with the slicing of food products. The portioning is to be understood, on the one hand, as the forming of the portions from the falling slices coming directly from a slicing apparatus, so-to-say "freshly" cut off from a product. On the other hand, the term "portioning" also comprises the forming of total portions from part portions previously respectively formed form individual slices, "Completing" is in particular to be understood as a process in which a portion which has not yet been completed and which already comprises one or more food slices which were cut off from a product is completed with slices of another product in particular downstream in the same lane of the respective slicing apparatus. The completing of portions in particular takes place when a product has been completely sliced in one lane and the last-formed portion could not be completely prepared with slices of this product so that the slices of the product downstream in the lane are required for the completion of this portion. In other words, a completed comprises food slices of different products, in particular sliced after one another in the same lane.

The portioning and completing mostly takes place in practice directly in the region of the cutting blade. This is generally known to the skilled person. Currently so-called portioning belts are used for the portioning and completing which are in particular movable in a vertical direction to implement the same falling height and the same falling track at least approximately for each cut-off slice. A portioning belt comprises a continuous belt for each lane of a multi-lane slicing apparatus. These belts can be moved slowly to form, for example, overlapping portions or portions having slices arranged mutually offset for each lane, which is also called a "staggered stack". Some portioning belts can also be transversely moved to allow, for example, a transverse overlapping of portions. Viewed in the direction of transport, portioning belts are frequently configured as comparatively short to be able to discharge completed portions as quickly as possible to following conveyor belt systems and to be ready to form the next position.

Portioning belts can also be rotatable or can be provided with rotating units of any specific design to form portions in which the individual slices are to be placed down after one another along a line which is in particular closed and, for example, circular. Such portioning units are also called round layers.

The portioning units are furthermore in practice frequently able to be moved not only in the direction of transport, but also against the direction of transport. Such a "backward movement" can be carried out, for example, for discarding a first cut arising on the slicing of product starts, that is for leading away non-usable product parts such as in particular product slices which are too small.

An aspect of the invention provides mapping the function of such portioning units or completion units at least partly using the transport movers.

Provision can accordingly be made in accordance with an embodiment that the control device is configured to carry out a portioning and/or portion completion operation using at least one transport mover in at least one region of the track system associated with a slicing apparatus.

Provision is in particular made that, in portioning and/or portion completion operation, the respective transport mover or the carrier of the transport mover or a placement region of the carrier is movable in and/or against the direction of transport coordinated with the operation of the slicing apparatus.

As already generally mentioned at another point, the carrier can comprise a conveyor device for this purpose or can be configured as a conveyor device. The conveyor device can in particular comprise a conveyor belt, in particular a continuous belt or a tipping belt.

Provision can be made that, in portioning and/or portion completing operation, the respective carrier of the transport mover is adjustable in a direction having a vertical component and/or in a horizontal direction by adjusting the track section and/or by adjusting the carrier relative to the rotor. The respective transport mover can consequently be solely involved in the implementation of the portioning and/or portion completion operation, with the track system, alternatively or additionally, also being able to be configured accordingly. For example, adjustable track sections can be provided to implement portioning and/or portion completing operation.

The specific arrangement and embodiment of the track system can be made in dependence on the respective circumstances, in particular on the available construction space.

As mentioned at another point, a general aspect of the invention provides allowing two or more movers to cooperate. An additional function hereby realized can generally serve any desired purpose.

A cooperation of movers can, in accordance with an embodiment, comprise a transport train being able to be assembled at at least one functional region of the track system from at least two transport movers respectively carrying a part portion. A mechanical coupling of any design of the transport movers forming such a train is possible, but not compulsory. Depending on the specific design of the transport system, the control device can provide that the transport movers are also moved like a train together along a respective track without any mechanical coupling between one another.

In accordance with a further embodiment of the invention, a plurality of functional regions can be provided which can be run to after one another and at which a part portion or a transport mover carrying a part portion can be added to a respective transport mover or to transport a train formed by a plurality of transport movers.

A total portion can be formed from a respective plurality of part portions in this manner. This is in particular of advantage for forming multi-sort packs.

The moving to stations to add foods, e.g. to dispensing devices for sauces, tartar sauces, or similar, and to stations for adding articles such as cutlery to packages is also possible.

As mentioned at another point, it can in particular be of importance in the transporting of food portions to be packaged by means of a packaging machine that the portions have a specific predefined relative arrangement and/or a predefined orientation among one another. This can be achieved with conventional conveyor belt systems. However, a considerable effort is required for this purpose. The individual transport system in accordance with the invention is in contrast exceptionally suitable to satisfy the demands required by practice on the transport of food portions to be packaged.

Provision is thus made in accordance with an aspect of the invention that the track system comprises at least one functional region at which a plurality of transport movers can be grouped which are in particular incoming on multiple lanes.

Provision can be made that the transport movers can be arranged in a predefined format relative to one another in the functional region, with the format comprising at least one row, at least one column or at least one n×m array (where n, m>1).

Provision can furthermore be made that a group of transport movers can be moved in at least one section of the track system in a respective format having an at least substantially unchanged relative arrangement.

Provision can furthermore be made that at least two transport movers which run behind one another in one lane or next to one another in adjacent lanes can be aligned relative to one another with their portions in accordance with a predefined or predefinable condition in at least one functional region of the track system.

As mentioned at another point, it can be necessary in practice to change the spacing between adjacent lanes in a multi-lane operation.

Provision can accordingly be made in accordance with the invention that the track system comprises at least one functional region with multi-lane operation in which the lane spacing between track sections running in parallel with one another can be changed.

The lane spacing can be changeable by adjusting track sections or by means of a branching at which transport movers incoming over a plurality of track sections arriving at the inlet side can continue to run in each case in a plurality of track sections departing at the outlet side.

It is sometimes or frequently necessary in practice in the processing of food portions to flip over a portion, i.e. to turn it over such that the upper side and the lower side swap positions. Such a procedure, also called a flipping over of portions in the following, can be necessary when a less appealing side of the portion should not be visible in the packaging. It can consequently be necessary, in dependence on the configuration of a subsequent packaging, to flip over a portion if it is not possible to already provide the desired orientation of the portion on the slicing of the product and on the formation of the portion.

Provision can accordingly be made in accordance with an aspect of the invention that the track system comprises at least one functional region which is configured to take over at least one arriving transport mover or the carrier of an arriving transport mover and to rotate it or flip it over together with the portion, in particular by 180°, about an axis extending transversely to or in parallel with the direction of transport.

The functional region can be configured to rotate or flip over a plurality of taken over transport movers or carriers simultaneously.

In a possible embodiment, the functional region can comprise at least one open or closed curved track, in particular a circular track, as well as at least one, in particular two, cooperating rotational or flip-over movers which are movable in the curved track.

A circular or elliptical track can, for example, be disposed in a plane extending transversely to the direction of transport.

The functional region acting as a flip-over station can comprise a first means and a second means between which the portion to be flipped over is held during the flip-over procedure. The two means can be movable toward one another and away from one another to pick, hold and place a portion. The means can each be formed by at least one mover. The means can alternatively each be formed by a carrier. One of the carriers can be that carrier which comes from an arriving transport mover and which thus carries the portion to be flipped over. The other carrier can wait at the flip-over station and can be transferred after the flip-over process with the portion then carried by it to a mover waiting at the outlet side in order thus to form a transport mover together with it. The original carrier can remain at the flip-over station and form the waiting carrier for the next portion to be flipped over.

Provision can be made in accordance with a further aspect of the invention that at least one transport mover and/or one track section is/are configured to determine the weight of a portion which lies on the transport mover or on a transport mover located in the track section.

Provision can be made in this respect that at least one transport mover is provided with an integrated scale by means of which the weight of the portion can be determined.

Provision can alternatively or additionally be made that a weighing device is integrated in at least one track section of the track system which is in particular decoupled from the directly adjacent track sections.

The hygiene and thus the cleaning of devices are of particular importance in the handling of food products.

The invention can accordingly provide measures which relate to an avoidance or reduction of contamination and/or to a cleaning, and indeed with respect to the transport movers, in particular to their carriers, and/or with respect to the track system. A particularly advantageous aspect of the invention relates to a concept in which the transport movers themselves and/or the track system itself is/are used to improve the hygiene.

Provision can be made in accordance with an embodiment of the invention that at least one cleaning device for the transport movers is associated with at least one line of the track system, in particular with a functional line provided in addition to a normal line, preferably a return line.

The cleaning apparatus can be configured for a continuous operation with transport movers moved along a track during the cleaning and/or for a stationary operation with transport movers standing on the track during the cleaning.

The cleaning device can comprise a cleaning bath for the transport movers or for their carriers. Provision can in particular be made that the track is guided relative to the cleaning bath such that the transport movers moved along the track dip at least partly into the cleaning track, in particular with their respective carriers.

The cleaning device can generally be configured to apply a cleaning means, for example a fluid, electromagnetic radiation and/or a plasma at least regionally to the transport movers. The cleaning device can, for example, comprise a chamber in which the transport movers or their carriers are acted on by UV radiation.

Alternatively or additionally, the cleaning device can be configured to subject the transport movers or their carriers to a hygiene treatment. The hygiene treatment can include an application of a cleaning means. It is also possible to heat the transports at least regionally to a temperature which is sufficient to make organisms harmless. A heating in particular takes place to a temperature of more than 60° C., in particular more than 70° C.

Provision can furthermore be made in accordance with the invention that at least one conditioning device for the transport movers, by means of which the transport movers can be subjected to a conditioning treatment at least regionally, is associated with at least one line of the track system, in particular with a functional line provided in addition to a normal line, preferably a return line.

The conditioning treatment can be a hygiene treatment. The conditioning of the transport movers can, however, also serve other purposes, for example a preparation, completion or also orientation of carriers or carrier segments, for example to establish or restore a starting position or starting orientation.

The invention furthermore provides measures which at least largely prevent the track system from being contaminated by the transported food portions.

In an embodiment, at least one track section of the track system can thus comprise a track cover which extends along the track section beneath the carriers of the transport movers. Provision can in particular be made that the track cover covers the track section substantially completely and is provided with an interruption for guiding along the holders of the transport movers.

In accordance with a further embodiment of the invention, at least one track section can be provided with at least one passive hygiene device.

Such a passive hygiene device can, for example, be one or more openings or apertures in the track section. Alternatively or additionally, the track section can be provided with inclined surfaces. Gaps can furthermore be provided between consecutive track sections. A passive hygiene device can also be realized by inclined track sections.

Such measures can serve to facilitate a flowing off of fluid which is applied, for example, by means of high-pressure cleaners in cleaning phases.

In accordance with a further embodiment, at least one automatic cleaning device for carriers temporarily separated from the transport movers can be associated with the track system. In this respect, the carriers can be respectively automatically separable from the transport mover and dischargeable to the cleaning device at a discharge region of the track system and can be transferable to a transport mover again after passing through a cleaning process in the cleaning device at a transfer region of the track system.

Provision is made in accordance with a further aspect of the invention that the control device is configured to monitor the track system for the presence of problems. Problems can, for example, be caused by contamination and/or by wear.

The monitoring can take place with the help of sensors. The sensors can be associated with the track system and/or with the transport movers. Alternatively or additionally, the monitoring can take place by evaluating the operation of the track system and/or the parameters relating to transport movers.

Provision can be made in accordance with a further aspect of the invention that a plurality of lanes are associated with at least one track at least sectionally. If, for example, n products are simultaneously sliced by means of a slicer and if thus the transport system subsequent to the slicer is to be configured for n-lane operation at least in the region of the slicer, then in accordance with this embodiment, at least one track can cover two or more lanes at least temporarily and can in particular provide a transport of at least two portions arranged next to one another.

This can be achieved in accordance with an embodiment in that the movers movable in this track or in this track section are configured such that they can carry two or more portions disposed next to one another. Such a multi-lane principle for a track can be used, for example, to carry out a lane spacing increase which is required or of advantage with respect to following regions of the track system or with respect to downstream devices such as a packaging machine. Movers movable in the multi-lane region of the track can, for example, be provided with carrier segments which can be moved apart transversely to the direction of transport. In this manner, the spacing of two portions disposed next to one another on the carrier can be changed and thus the lane spacing can be set.

A further aspect of the invention provides that the track system comprises a plurality of partial track systems, wherein the transport movers are preferably prevented from changing between the partial track systems. Provision can in particular be made that the partial track systems differ from one another with respect to at least one constructive, structural property of their transport movers and/or with respect to at least one operating parameter relating to the movement of the transport movers.

The partial track systems can thus e.g. be designed for movers of different sizes or for rotors of different sizes. The partial track systems can also allow different transport speeds. A relatively slower partial track system can thus be provided substantially for distribution/shunting/formatting and/or separating functions, while a relatively faster partial track system substantially serves to overcome a relatively large transport line in a time which is as short as possible.

If it is not possible from a construction or build aspect or in a technical control manner that the movers can change between the two track systems, one or more transfer points can be provided at the interface between the two partial track systems, at which transfer points respective portions can be transferred from movers of the one partial track system to movers of the other partial track system.

Provision can be made in accordance with a further aspect, for example with the aim of keeping the total width of the track system comparatively small, that the track system comprises at least two regions disposed in different planes, preferably planes extending at least substantially horizontally, between which the transport movers can change by means of a vertically movable track section.

Such a change between the individual planes can take place in a relatively simple manner by means of track sections, also called "mini-lifts" here, into which a respective one or more movers can travel in and can travel out again after a downward or upward movement into another plane. That track in which such a vertically movable track section is actually not located can consequently be interrupted at this point. It is, however, alternatively also possible to provide a plurality of track sections which are arranged vertically above one another and which can always be traveled together relative to the incoming and outgoing track sections, and indeed such that the respective tracks are only interrupted during the vertical movement. If, for example, two planes are arranged next to one another at a region of the track system, it can be ensured by a group of three vertically travelable track sections arranged above one another independently of the direction of travel that the tracks extending in the different planes are not interrupted in any position of the group of three.

A further aspect of the invention is based on the recognition that it can be advantageous, for example for carrying out functions which are necessary at all transport movers, not to do this in every track in multi-lane operation, but rather only to provide a specific region for carrying out this function or functions at which the tracks running over multi-lanes are temporarily led together. Such a region of leading together can simultaneously serve as an incoming region for transport movers originating from different outlet regions, for example transport movers loaded by different slicers, and/or can serve as an outgoing region for specific lines, for example for separating portions not satisfying specific criteria.

Provision can accordingly be made in accordance with the invention that the track system comprises a functional region at which a plurality of tracks are led together temporarily, in particular onto exactly one track, and which is configured to carry out an additional function for the transport movers and/or the portions. This additional function can, for example, be a classification/control/monitoring/weighing/aligning and/or servicing function.

The tracks leading to this functional region can come from at least two spatially separate loading regions. At least one track provided as a rejection line or expulsion line can emanate from this functional region.

As already mentioned, the track system can have at least one transition region at which consecutive track sections of different types and/or of different orientations in space can overlap one another at least in part and can merge into one another.

Provision can in particular, but not exclusively, be made for such a transition region in accordance with a further aspect of the invention that the track system comprises at least one transition track section or hybrid track section which is configured regionally as a track section of one type and regionally as a track section of another type, wherein in particular the transition track section or hybrid track section is provided for transport movers provided with hybrid rotors. Such a transition track section or hybrid track section can, for example, have a guide rail of a U track type, on the one side, and a guide rail of a C track type, on the other side. A mover provided with a corresponding configured hybrid rotor can, for example, run in coming from a track of the U type into such a transition track section or hybrid track section and can subsequently continue to run in a track section of the C type. Such a transition track section or hybrid track section can consequently provide a gentle or flowing or flying transition between different track types.

A general aspect of the invention which in particular serves to increase the functionality of the total system provides that, in at least one transport mover, the carrier is provided with means which are configured to cooperate with a handling device which is configured for moving the carrier, in particular to form a portion on the carrier and/or to align a portion.

A further general aspect of the invention is based on the recognition that in particular on the configuration of the drive principle in the manner of a linear motor—and indeed with a stator generating magnetic fields as a lane for movers with permanent magnet rotors—these magnetic fields can additionally be used to provide the movers with energy by electromagnetic induction.

Provision can consequently generally be made in accordance with an aspect of the invention that at least one transport mover or functional mover is configured for taking up energy from the track system. As mentioned, this can in particular take place by electromagnetic induction. Other possibilities are, however, also alternatively conceivable to utilize the movement of the movers in the track to provide energy for the movers and in particular to store this energy in the movers.

For this purpose, for example, a transport mover can be provided with a kind of trailer which itself does not represent a mover in the actual sense and only serves a so-called "energy harvesting in order e.g. to collect energy by electromagnetic induction and to transfer it to the transport mover puling it.

Alternatively or additionally, it is also possible in accordance with the invention to integrate such an energy supply into the movers themselves.

As mentioned at another point, the track system can comprise at least one functional region for rotating a transport mover or a transport mover carrier. Such a functional region can in particular serve to flip over portions.

Such a functional region, in particular configured as a flip-over station, can comprise one or more track sections which serve to temporarily take up transport movers to be rotated.

As mentioned at another point, the track system can be provided with a cleaning device for the transport movers.

Provision can be made in accordance with the invention in this respect that the cleaning device is configured to apply a cleaning means, in particular a fluid, electromagnetic radiation and/or plasma to the transport movers at least regionally. Alternatively or additionally, the cleaning device can be configured to subject the transport movers to a hygiene treatment. Such a hygiene treatment can include a heating of at least individual regions of the transport mover. The organisms impairing hygiene can hereby be killed.

A further general aspect of the invention is based on the recognition that the principle in accordance with the invention of the individualizing of the transport of the portions by means of individually movable transport movers for the portions in a track system simultaneously allows an advantageous information acquisition and/or an information processing for the individual portions and/or transport movers.

Whereas a plurality of portions are naturally always simultaneously associated with each conveyor belt as the smallest controllable unit in conventional conveyor belt systems and whereas the conveyor belt moreover constantly receives portions and discharges them again, that is no "separate" portions are associated with conveyor belts, so-to-say, in contrast, in the individual transport system in accordance with the invention, the portions respectively remain for a comparatively long time on their "own" transport movers. This circumstance can be used to give the transport system in accordance with the invention a function relating to the acquisition and/or processing of individual information.

Provision is accordingly made in accordance with an aspect of the invention that at least one piece of information can be determined and can in particular be taken into account by the control device for at least one transport mover, said piece of information relating to the portion or to the transport mover, in particular to its carrier or rotor.

This information can relate to the weight of the portion, to the position of the portion on the carrier, to a quality feature of the portion and/or to the dwell time of the portion in the track system.

This information can generally relate to any desired property of a portion. It is also possible that the information e.g. relates to an error rate of a mover which can provide information on a degree of wear or contamination of the mover. A mover can be directly separated out in this manner if predefined or predefinable conditions have been satisfied in this respect.

The information can relate to the wear state, to the cleaning state, to the type and/or to the service life of the transport mover, in particular to its carrier or rotor.

A respective cleaning history can in particular be created for the movers.

Provision can be made in accordance with an embodiment of the invention that at least one transport mover is provided with at least one data store and is configured to store the data at least temporarily. These data in particular relate to the previously mentioned information.

Provision can furthermore be made that at least one transport mover, in particular for a data transfer, is configured for a communication with the warning system, in particular independently of the control device. In this connection, the independence of this communication from the control device in particular means a possible embodiment according to which the information is not e.g. directly transmitted from the transport movers to the control device or the transmission of data is initiated by the control device. A sensor system can thus, for example, be integrated into the track system at at least specific points and is able to read out data stores integrated in the movers while the movers move in the track. The information or data can then be transmitted to the control device via the track system.

The size and shape or the format of the carriers of the transport movers can generally be selected as desired. The respective support surface for the portions provided by the carriers preferably has a size and a format which lies approximately between the paper formats DIN A5 and DIN A4. The carriers can, however, also be smaller or larger.

The carriers can each be configured for receiving exactly one portion or a plurality of portions simultaneously.

The carriers can each be made in multiple parts. The individual parts can be movable relative to one another. The spacing between individual carrier parts can be changeable at a single transport mover. It is hereby generally possible to lead together part portions to form a total portion on a single transport mover.

The individual parts of the carrier can be nested in one another. The movability of the carrier parts can be achieved by a pure linear movement. It is alternatively possible to rotate or pivot the parts of the carrier.

The carrier can be flexible or bendable.

As mentioned at another point, the carrier can be movable relative to the rotor. The carrier can be displaceable. Alternatively or additionally, the carrier can be rotatable or pivotable. At least a part of the carrier can be tiltable in order, for example, to be able to dump non-usable portions or a product section in this manner, for example.

The carrier can be vertically adjustable. A falling height compensation in the reception of slices can hereby take place.

The movability of the carrier relative to the rotor can be used to effect a position correction and/or an orientation correction of the portion.

A transfer from track to track or from lane to lane can furthermore take place in accordance with the invention, e.g. by a lateral projection of a carrier to move into the region of influence of a neighboring track or neighboring lane.

The carrier can be configured as a rake. A picking and/or placing of portions can hereby be achieved in that a further rake or one or more conveyor belts engage into the carrier.

The carrier can be of wave shape so that it is possible to engage into the wave troughs with the aid of a rake or with the aid of conveyor belts to pick or place portions.

The movers or their carriers can be provided with a design. A visual marking can hereby be achieved to implement a recognition or association, for example. Different mover types can be designed differently.

As mentioned at another point, provision is made in accordance with an aspect of the invention that a plurality of movers can cooperate. Provision can alternatively or additionally be made that the movers or their carriers cooperate with the track system. This can be used to influence a mover or its carrier. Conversely, a mover or its carrier can be used to influence the track system or to carry out a function over the track system.

A mover or a carrier can comprise a holding or clamping apparatus which can be actuated either by means of its own energy or from the outside in that, for example, the mover runs into a track section and is acted on, for example, by means of a lever or a plunger. The mover or the carrier can thus, for example, comprise a discarding or expulsion apparatus for a portion or for a portion receiver, e.g. in the form of a tray or of a packaging part, lying on the carrier. This apparatus can be actuated by means of self energy or from the outside via the track system in order e.g. to automatically trigger the corresponding function at a predefined point of the track system.

A mover or carrier can comprise at least one mechanical or electric trigger element which is activated when a track section is reached which is provided with a corresponding trigger element. The trigger elements, which are provided, for example, in the form of projections, lugs or nubs, can be changeable in order, for example, to be adapted to a respective portion to be prepared.

The movement energy of the movers moving in the track system can be utilized to trigger actuation procedures at the track system. A transfer device, a slider or a spring can, for example, thus be acted on to effect a movement procedure or a triggering procedure.

It is furthermore possible in accordance with the invention to have a mover run through a predefined movement profile to utilize the inertia of the portion. For example, a portion can be discharged by a carrier or transposed on the carrier by a braking procedure or by an acceleration procedure, for example a reversal of direction or a cornering.

To map a portioning and/or completion function with the transport system in accordance with the invention, the transport movers can be used in the placement region of the slices coming from a slicing apparatus. It is necessary for this purpose to provide the track system for the transport movers in the placement region.

Provision can alternatively be made only to handle the carriers of the transport movers in the placement region and, after the formation of a portion on the carrier, to transfer the latter to a transport mover by means of a corresponding handling device. The handling can take place, for example, by means of a robot.

As mentioned at another point, individual track sections can be movable to implement different functions. Such functions can be necessary for a portioning/completing and/or format formation operation. Provision can be made for the implementation of a function that not only a track section is movable, but rather that the mover is additionally moved in the track section and/or the carrier is moved relative to the rotor of the mover.

A track section can be rotatable. A track section can be movable in a vertical direction, for example for a falling height compensation in a stack or overlap formation. For a circular or oval placement, a track section can be rotated and the mover or the carrier can be moved along the track section.

The track section can comprise at least two partial track system, with provision being made that the movers do not change between the partial track systems during operation. This can be implemented by mechanical and/or electromagnetic incompatibility between the partial track systems. Alternatively or additionally, it can be the control device which provides the movers respectively remaining in their partial track systems.

The partial track systems can be mechanically and/or electrotechnically separated from one another. The partial track systems can in particular be operated independently of one amother.

One or more transfer regions can be provided between the partial track systems which are configured to transfer carriers of movers of the one partial track system to movers of the other partial track system.

An advantage of such a division into a plurality of partial track systems can comprise the partial track systems being able to be provided with different properties. The partial track systems can thus, for example, be configured for rotors of different sizes. Alternatively or additionally, the rotors can differ from one another with respect to their electrical and/or magnetic properties. Provision can be made, for example, that one partial track system allows higher transport speeds than another partial track system.

For example, the movers of a first partial track system can comprise comparatively small carriers, wherein the carriers become larger and larger from partial track system to partial track system. This can be useful, for example, when a respective one or more part portions are provided in the region of the individual partial track systems and the part portions should finally together form a third large total portion or lines with a plurality of portions. Each mover does not then have to be provided with a carrier which is sufficiently large for the total portion and does not have to run through the total track system. The carrier can so-to-say grow with the portion from partial track system to partial track system.

It is furthermore possible that the rotors become more and more powerful and in particular larger from partial track system to partial track system. This can, for example, be provided when the number of portions per mover should increase from partial track system to partial track system. The partial track system which is the last viewed in the direction of transport can, for example, transport a complete line or column or a complete format set per mover which is gradually formed in the preceding partial track systems.

In accordance with a further aspect of the invention, the movers can each be provided with a device by means of which the portions are also held on the carrier when a support surface of the carriers is not aligned horizontally. Such a holding device can in particular be configured also to hold the portions at the mover when the movers are moved upside down. Provision can then be made that the holding device is provided with a trigger function which makes it possible to release, in particular to drop, the portion at a respective desired point and/or at a respective desired time.

Such a function can be used to introduce portions directly from a carrier into a packaging.

If in this respect the transport movers are first moved into an upside down position and if the portions are then released by the holding device with upside down transport movers, such a transfer, e.g. to a packaging, simultaneously includes a flipping of the portions.

Provision can be made in the method in accordance with the invention for moving portions that the portions are each formed on a carrier of a transport mover, in particular by dropping slices onto the carrier or by receiving part portions on the carrier.

Provision can furthermore be made in the method that portions are received from a carrier of a transport mover by means of a conveying device provided at the carrier or formed by the carrier.

Provision can furthermore be made in the method in accordance with the invention that the portions are each discharged directly from a carrier of a transport mover into a packaging, in particular by means of a conveyor device of the transport mover or by dropping from the transport mover.

A general aspect of the method in accordance with the invention comprises the cooperation between movers, i.e. a plurality of movers can cooperate in the track system. Provision can accordingly be made in the method that at least two movers cooperate which are not permanently mechanically connected to one another, in particular a transport mover and a functional mover or two transport movers, to provide an additional function. In this respect, the individual movability of the movers in the track system can consequently be used for an advantageous cooperation. A permanent mechanical coupling of two movers mentioned at another point is not required for this purpose. The movers can be provided with suitable means which do not require any permanent mechanical coupling between the movers, but can nevertheless be used by a suitably mutually coordinated relative movement of the movers in the track system for carrying out an additional function.

Provision can be made in this respect that the movers cooperate at times, in particular by means of their carriers, and are operated independently of one another at times. In this respect, the movers are consequently usable both as movers, in particular transport movers, completely independent of one another and can, however, also be moved temporarily cooperatively in the track system to provide an additional function of any type whatsoever by cooperation.

Provision is made in accordance with a further general aspect of the method in accordance with the invention that the movers cooperate with the track to be able to provide one or more additional functions beyond the transport movers. Provision can accordingly be made in the method in accordance with the invention that a relative movement between at least one track section and at least one mover moved in the track section can be converted into an additional function, in particular mechanically, electrically and/or magnetically.

Provision can be made in the system in accordance with the invention for the processing of food products that a receiving of slices or portions can be carried out over multiple lanes by means of the transport movers. Alternatively or additionally, provision can be made in the processing system in accordance with the invention that a transfer of portions to a packing machine can be carried out over multiple lanes and in particular format set-wise.

Provision can furthermore be made in the system in accordance with the invention that information, in particular relating to the portions, can be taken into account for the operation of the slicing apparatus which can be acquired in the operation of the transport system, in particular at the movers, in particular for fixing the thickness of the slices and/or the number of slices in the portions. The portions can thus, for example, each be monitored in the transport system as to whether—optionally within predefined or predefinable tolerances—a specific portion weight or a specific number of slices has been observed. Depending on the monitoring result, the operation of the slicing apparatus can be changed as necessary such that the slice thickness or the number of slicers per portion is correspondingly changed. Such a "feedback" for the slicing apparatus can be particularly advantageously implemented using the individual transport system in accordance with the invention.

Further possible embodiments of the apparatus in accordance with the invention will be given in the following:

Provision can be made that at least one carrier, and in particular every carrier, is configured to remain at the transport mover during operation or for an only temporary separation from the transport mover and a subsequent reuse at the transport mover or at another transport mover.

Provision can be made that at least one functional line is configured as a separation or expulsion line for transport movers which satisfy or do not satisfy a predefined or predefinable condition, in particular relating to wear and/or contamination, independently of their portions can be led out of a normal line, in particular automatically.

Provision can be made that the track system comprises at least one track section which comprises a one-dimensional track having a first point and a second point, with the track between the first point and the second point describing a trajectory or a line in space which does not extend only in a straight line and which does not lie in a single plane.

Provision can be made that the track system has at least one branch at which transport movers incoming via one or more track sections arriving at the inlet side can each run on in one or more track sections departing at the outlet side.

Provision can be made that each possible route for the transport movers only comprises straight-line sections at the branch.

Provision can be made that at least one track section, in particular at least one intermediate track section, at the branch for selecting a respective route for the transport movers is movable relative to the other track sections, is in particular rotatable about an axis which extends perpendicular to a plane in which the track sections of the branch are disposed.

Provision can be made that the track system comprises at least one track section which is adjustable as a whole, in particular with an at least temporary interruption of the respective track.

Provision can be made that a plurality of track sections, which in particular run in parallel with one another, are adjustable independently of one another or together.

Provision can be made that the adjustment movement of the track section comprises a linear translation movement or is only a linear translation movement.

Provision can be made that the track section is adjustable while maintaining its orientation in space.

Provision can be made that the adjustment movement of the track section comprises a pivot movement or is only a pivot movement, in particular about an at least substantially horizontal pivot axis extending transversely to the direction of transport.

Provision can be made that at least one movable track section is coupled to an adjustable track section and can be taken along by the adjustable track section.

Provision can be made that in at least one line section of the track system a track is provided for the transport movers and at least one auxiliary track is provided which is associated with the track, which in particular extends in parallel with the track and in which at least one functional mover is movable.

Provision can be made that at least one functional mover is configured as a lift mover with which an at least substantially vertically extending track section is associated in which the lift mover is movable.

Provision can be made that at least one transport mover and a functional mover movable in the track system can be releasably coupled to one another, in particular via their rotors.

Provision can be made that the or each transport means comprises a track section in which at least one functional mover is movable.

Provision can be made that the control device is configured to take account of the dwell times of portions in the track system in operation of the buffer.

Provision can be made that a branching of the track system at which transport movers incoming over one or more track sections arriving at the inlet side can each continue to run in one or more track sections departing at the outlet side is configured to change from an n-lane operation to an m-lane operation, wherein n arriving and m departing track sections are present and n, m≥1 and n≠m or n=m applies.

Provision can be made that the track system comprises at least one functional region at which a plurality of transport movers can be grouped which are in particular incoming over multiple lanes.

Provision can be made that at least two transport movers which run behind one another in one lane or next to one another in adjacent lanes can be aligned relative to one another with their portions in accordance with a predefined or predefinable condition in at least one functional region of the track system.

Provision can be made that the track system comprises at least one functional region with multi-lane operation in which the lane spacing between track sections running in parallel with one another can be changed.

Provision can be made that the lane spacing is changeable by adjustment of track sections or by means of a branch at which transport movers which are incoming over a plurality of track sections arriving at the inlet side can continue to run in a respective plurality of track sections departing at the outlet side.

Provision can be made that the functional region comprises at least one track section for the temporary reception of at least one transport mover to be rotated or to be flipped.

Provision can be made that the functional region comprises at least one open or closed curved track, in particular circular track, as well as at least one, in particular two, cooperating rotational movers or flip-over movers which are movable in the curved track.

Provision can be made that the cleaning device comprises a cleaning bath relative to which the track is guided such that the transport movers moved along the track dip at least partly into the cleaning track, in particular with their respective carriers.

Provision can be made that the cleaning device is configured to apply a cleaning means, in particular a fluid, electromagnetic radiation and/or a plasma to the transport movers at least regionally and/or to subject them to a hygiene treatment, in particular to heat them to a temperature sufficient for killing off organisms.

Provision can be made that at least one conditioning device for the transport movers, by means of which the transport movers can be subjected to a conditioning treatment at least regionally, is associated with at least one line of the track system, in particular with a functional line provided in addition to a normal line, preferably a return line.

Provision can be made that at least one piece of information can be determined for a transport mover, and can in particular be taken into account by the control device, which relates to the portion or to the transport mover, in particular to its carrier or rotor.

Provision can be made that at least one transport mover is provided with at least one data store and is configured to store data at least temporarily.

Provision can be made that at least one transport mover, in particular for a data transfer, is configured for a communication with the track system, in particular independently of the control device.

Further possible embodiments of the method in accordance with the invention will be given in the following:

Provision can be made that portions are received from a carrier of a transport mover by means of a conveying device provided at the carrier or formed by the carrier.

Provision can be made that at least two movers which are not permanently mechanically connected to one another, in particular a transport mover and a functional mover or two transport movers, cooperate to provide an additional function.

Further possible embodiments of the system in accordance with the invention will be given in the following:

Provision can be made that at least one track section of the transport system is arranged relative to the slicing apparatus such that cut-off slices can respectively fall onto the carrier of a transport mover located in the track section.

Provision can be made that a packaging machine is arranged downstream of the transport system and the portions can be transferred to it directly or by means of a handling device, in particular by means of a robot.

Provision can be made that a reception of slices or portions can be carried out by means of the transport movers over multiple lanes and/or that a transfer of portions to a packaging machine can be carried out over multiple lanes and in particular format set-wise.

Provision can be made that information, in particular relating to the portions, can be taken into account for the operation of the slicing apparatus which can be acquired in the operation of the transport system, in particular at the transport movers, in particular for fixing the thickness of the slices and/or the number of slices in the portions.

All the aspects and individual features of the invention mentioned above and in the following and shown in the drawing can be combined with one another to the extent this does not produce contradictions. Aspects and individual features which are mentioned with respect to a mover can generally be provided for all movers or for any desired number of movers. Aspects or individual features mentioned with respect to a specific mover type can generally be provided for all mover types to the extent this does not produce contradictions. Protection is also respectively independently claimed for all aspects of the present disclosure.

Figure 6:
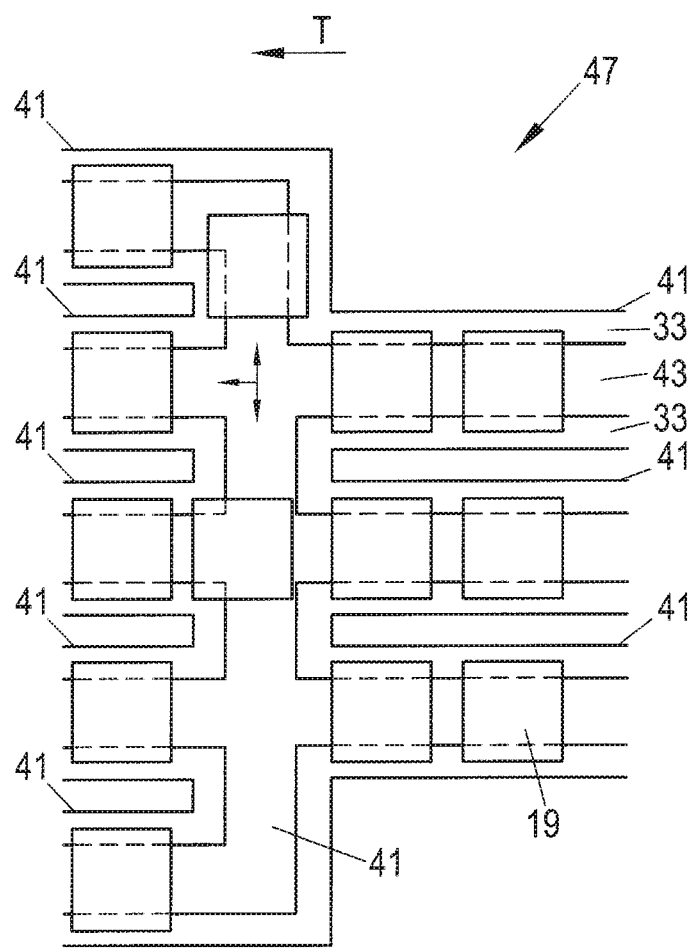
Figure 7:
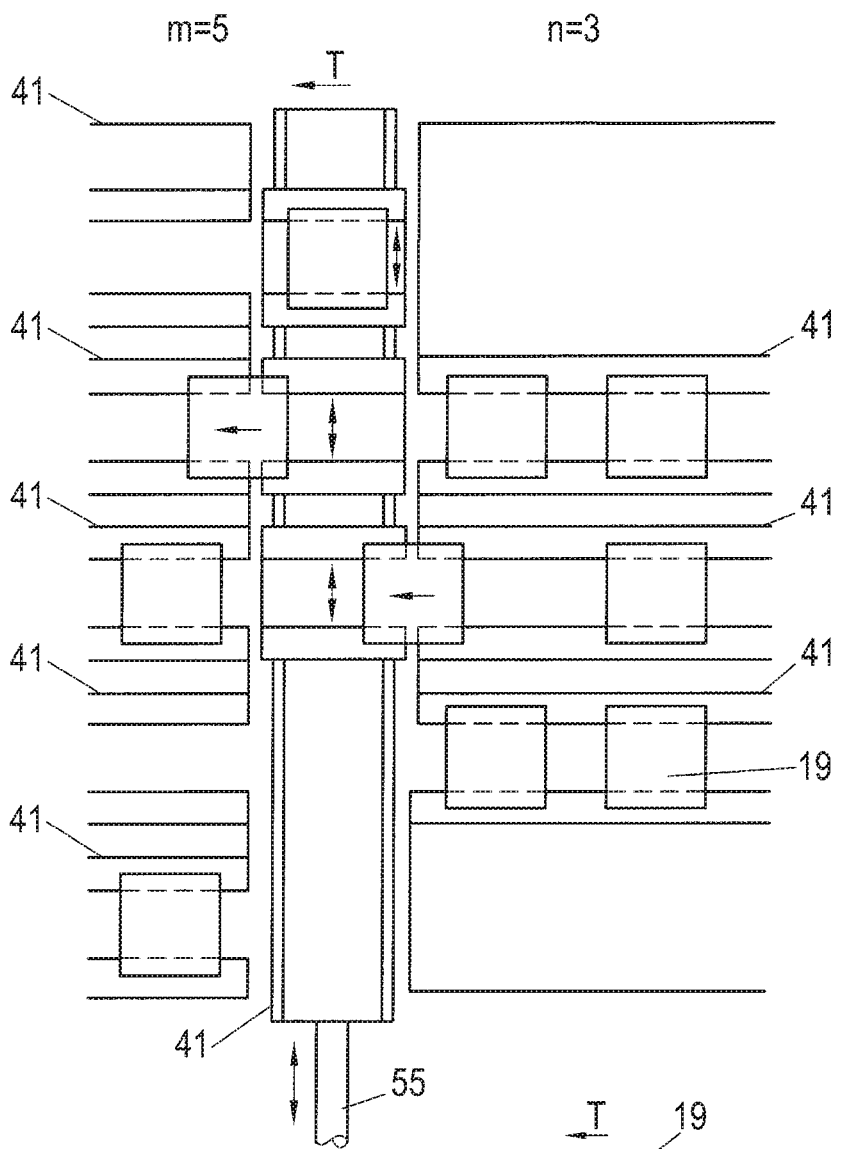
Figure 8:
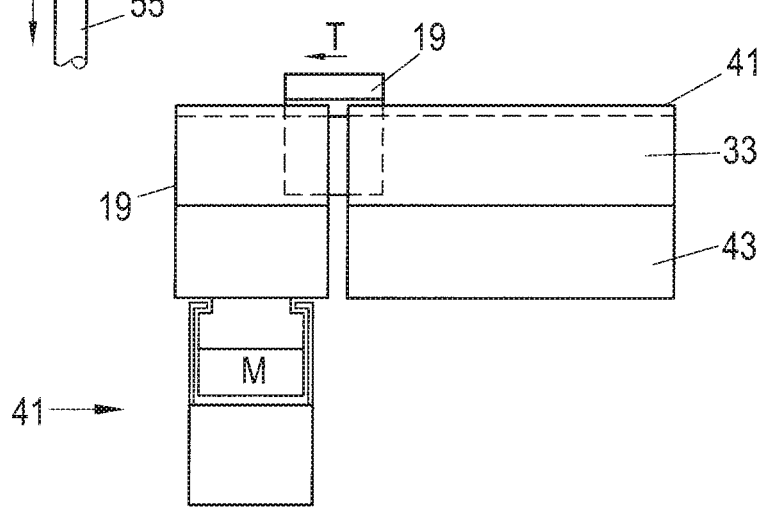
Figure 9:
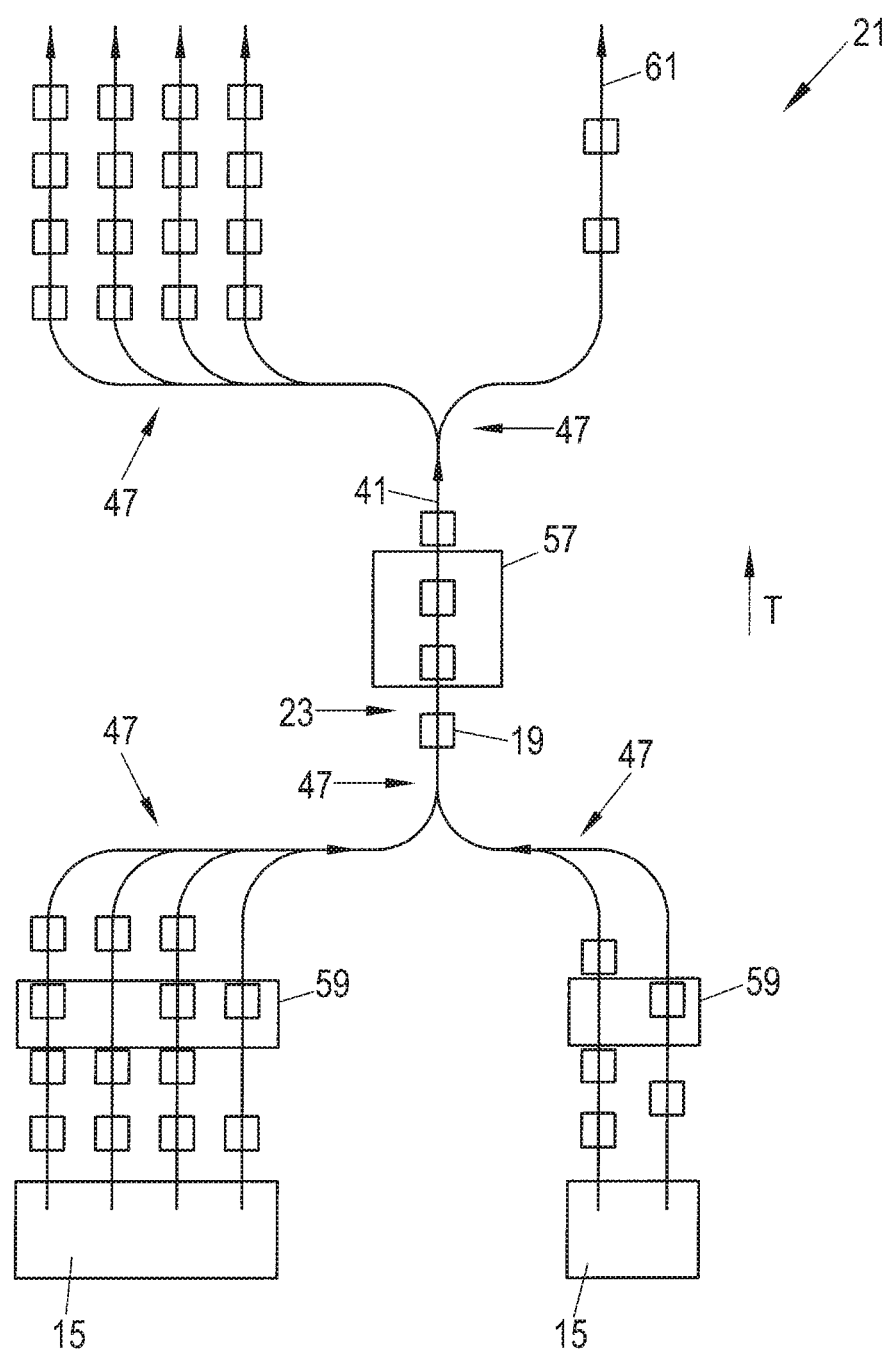
Figure 10:
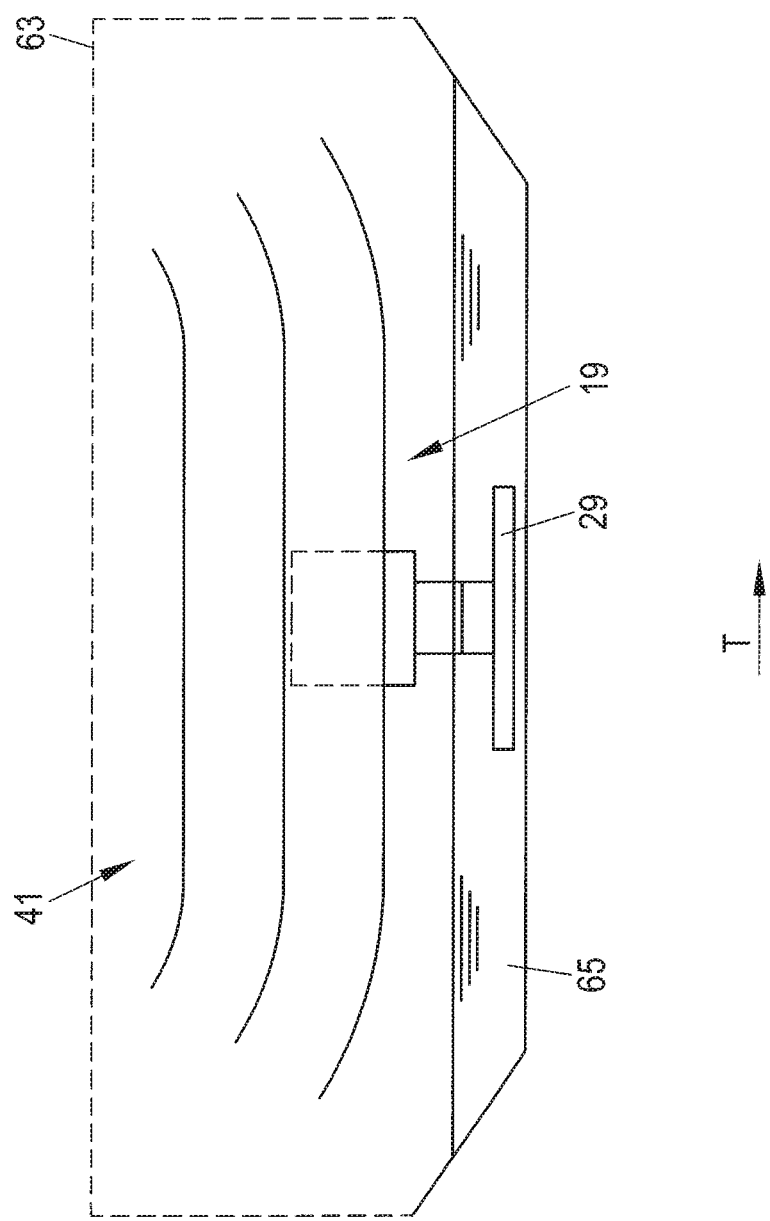
Figure 11:
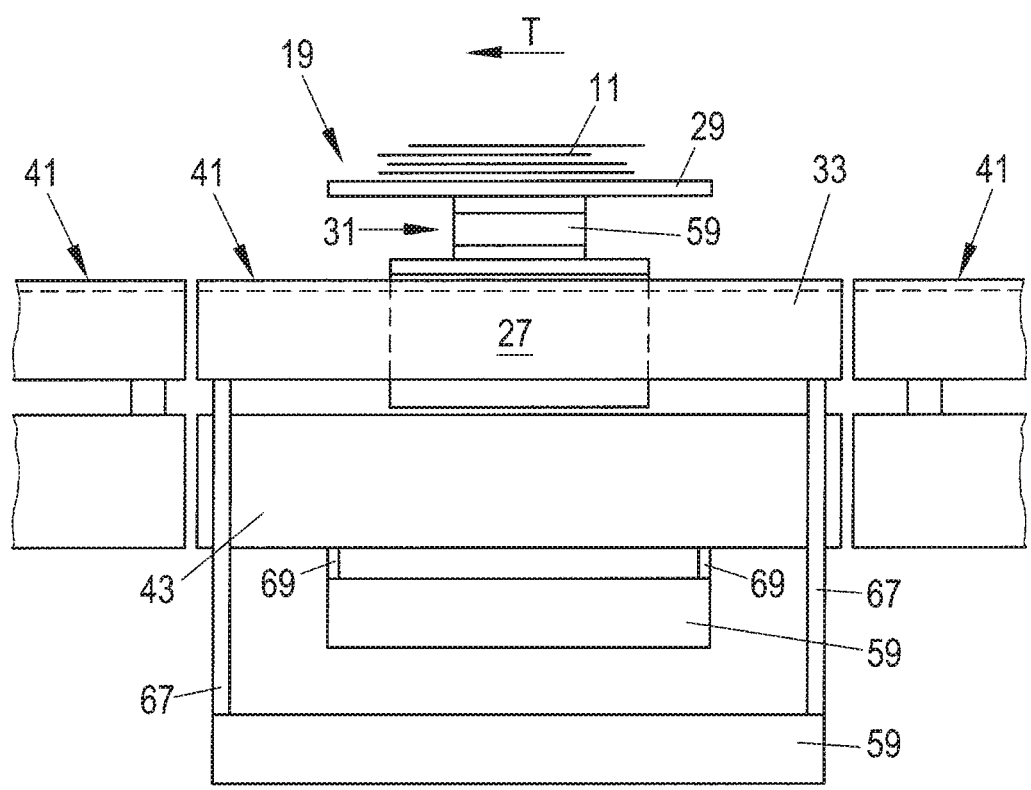
Figure 12:
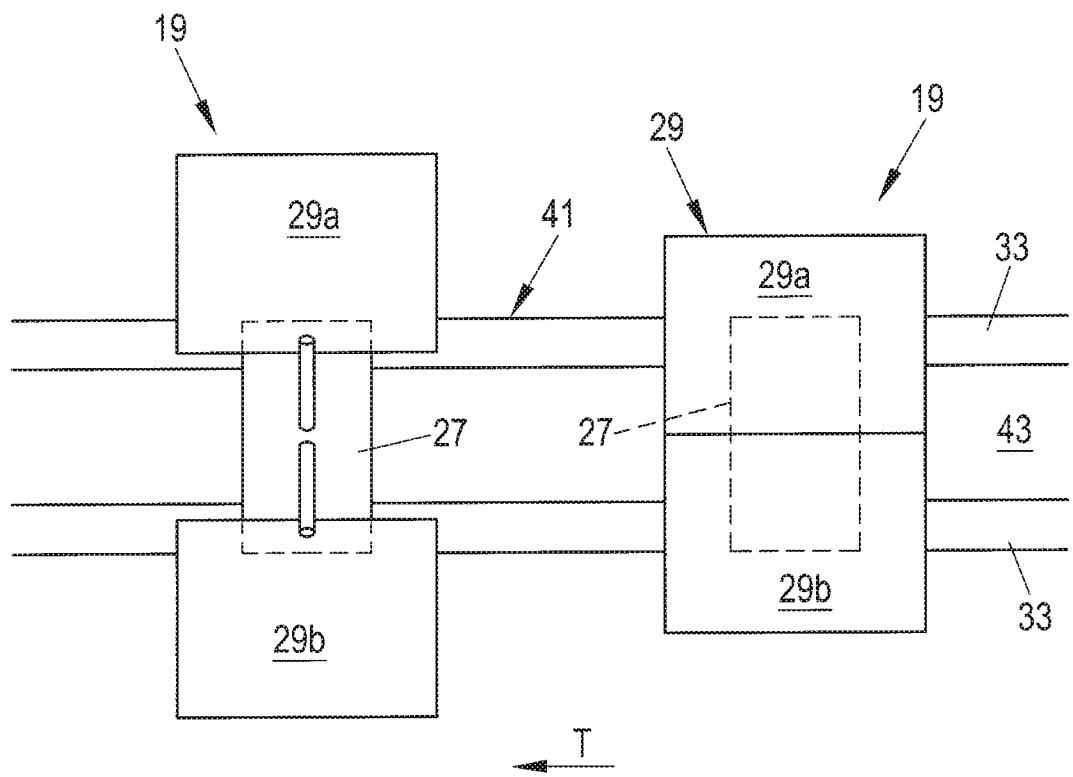
Figure 13:
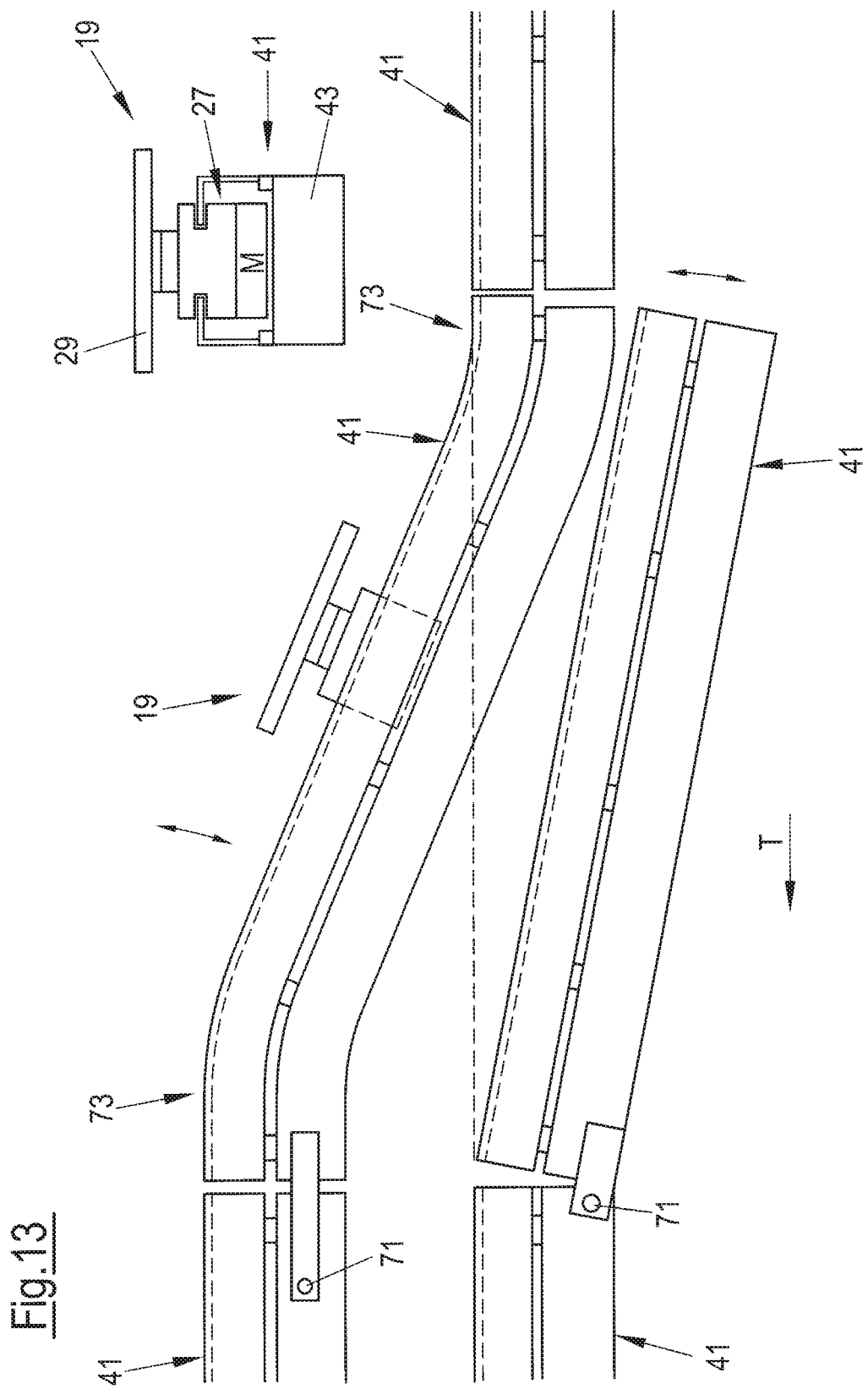
Figure 14:
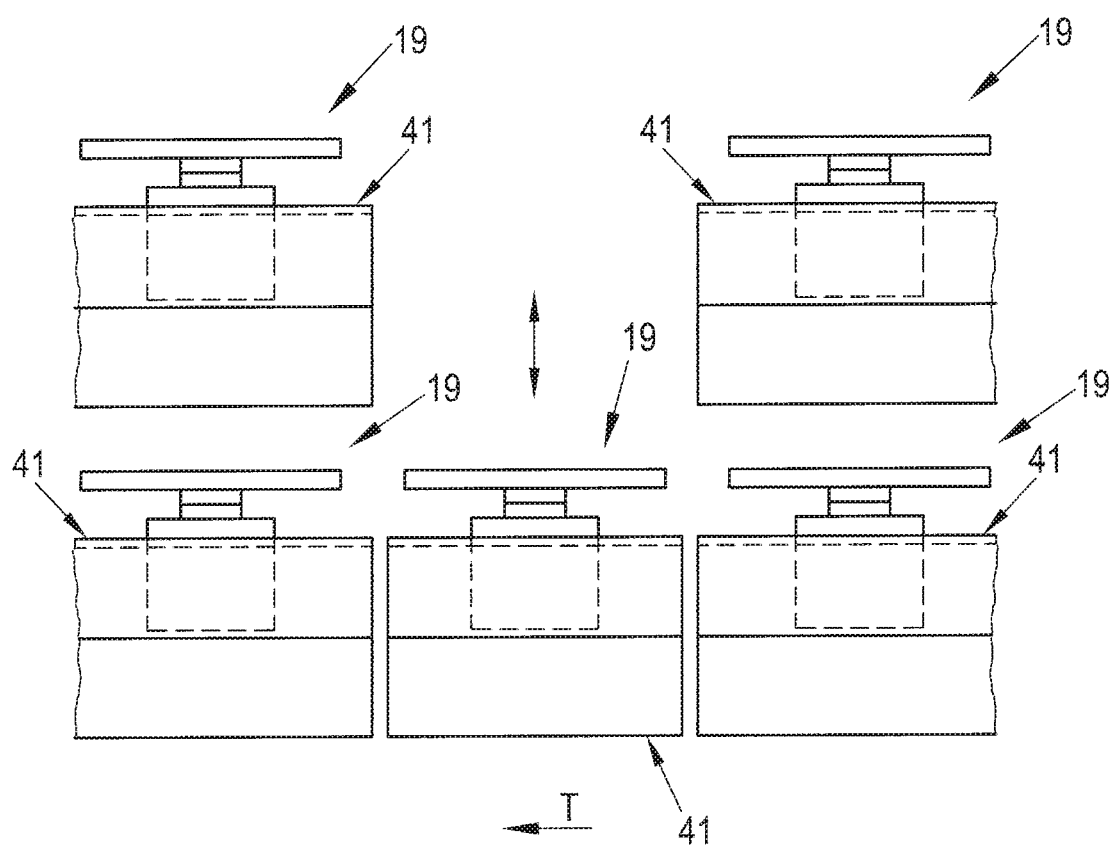
Figure 15:
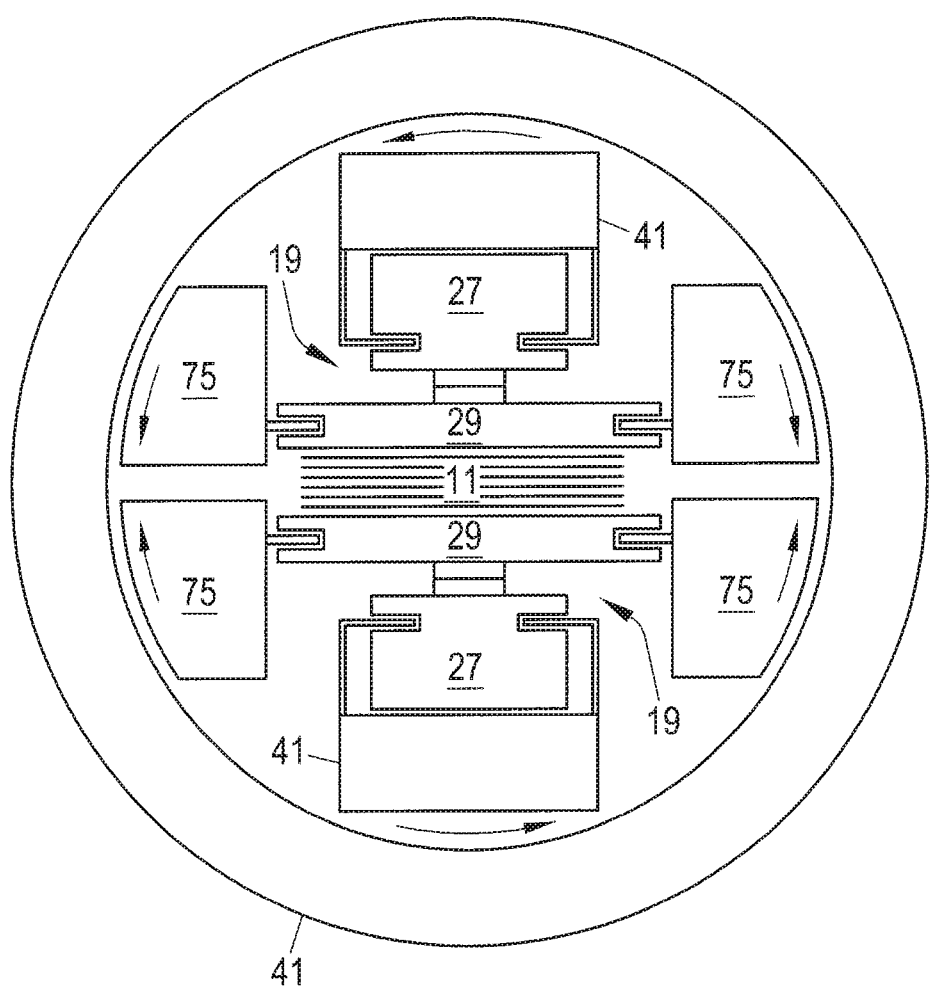
Figure 17:
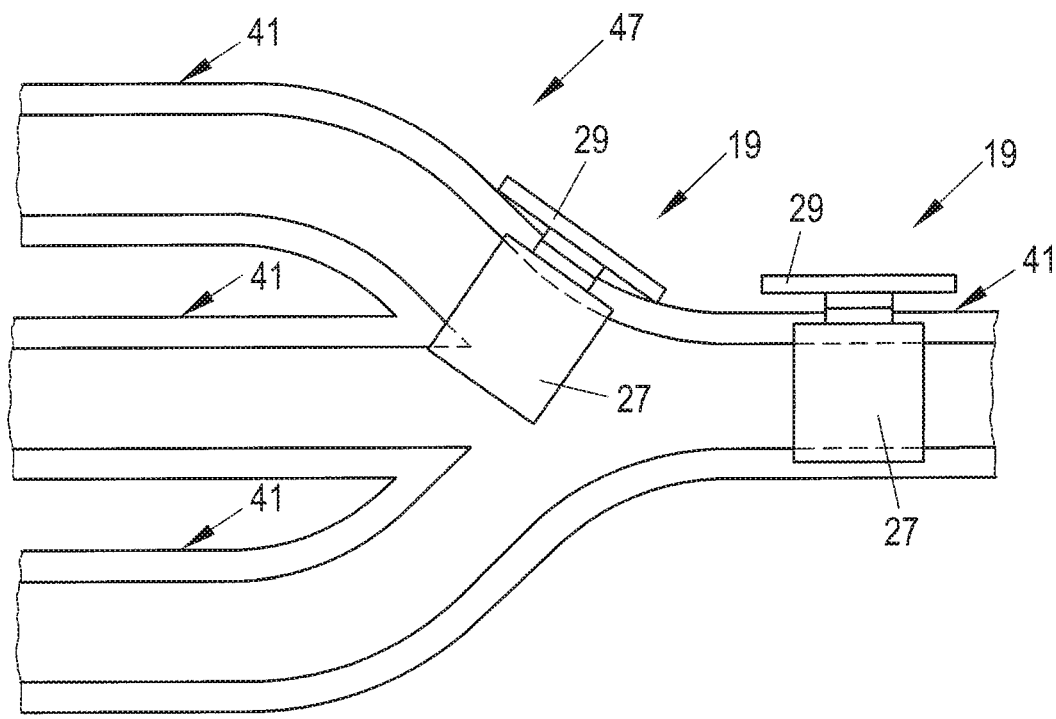
Figure 18:
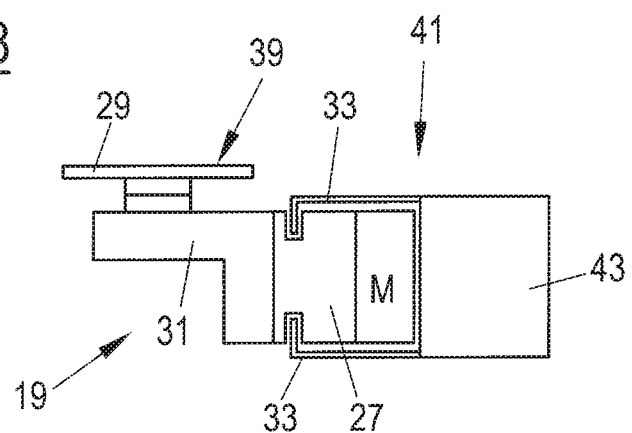
Figure 23:
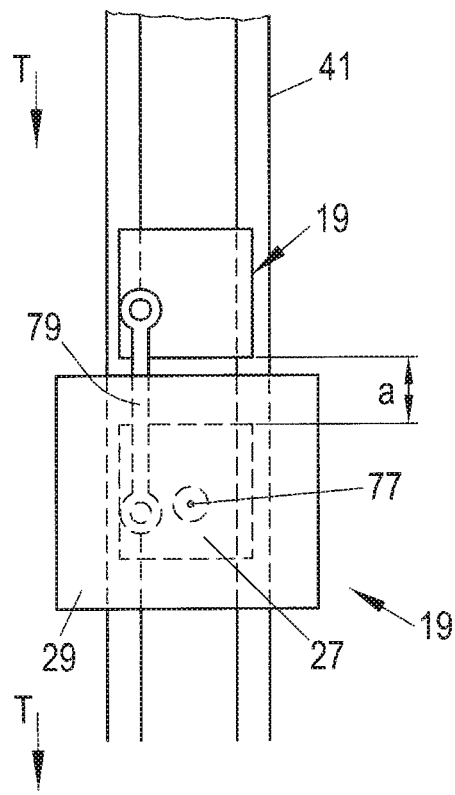
Figure 24:
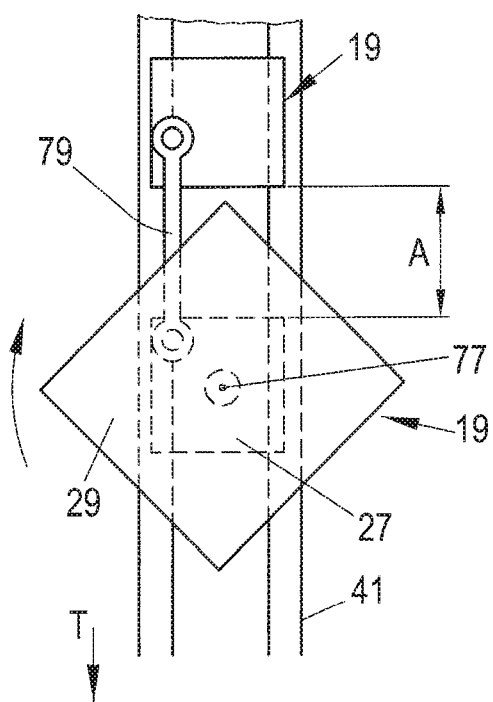
Figure 25:
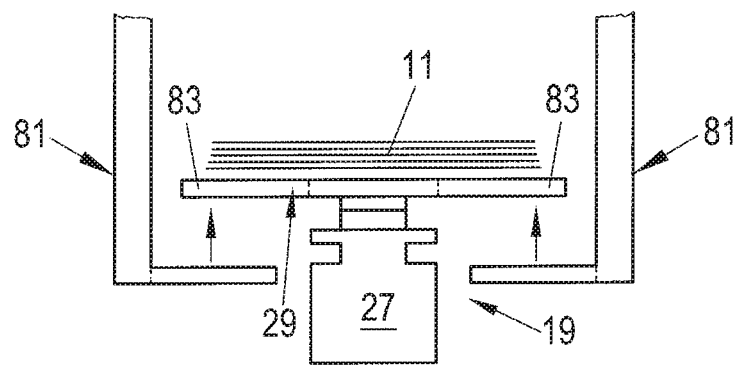
Figure 26:
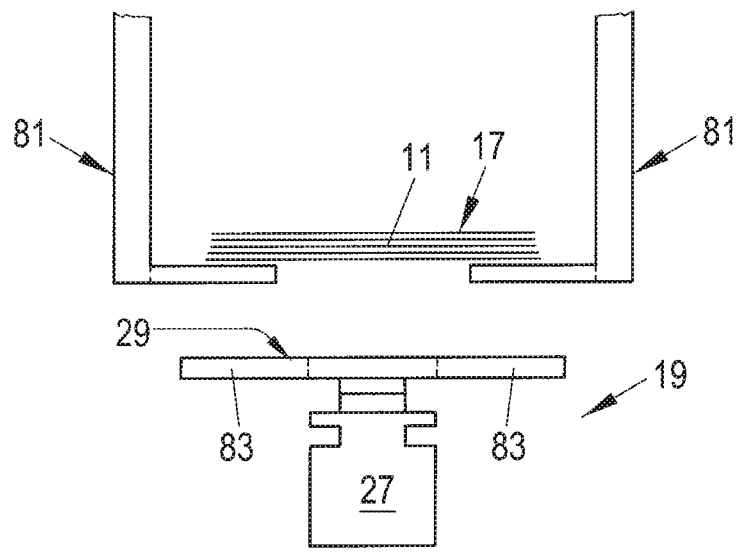
Figure 27:
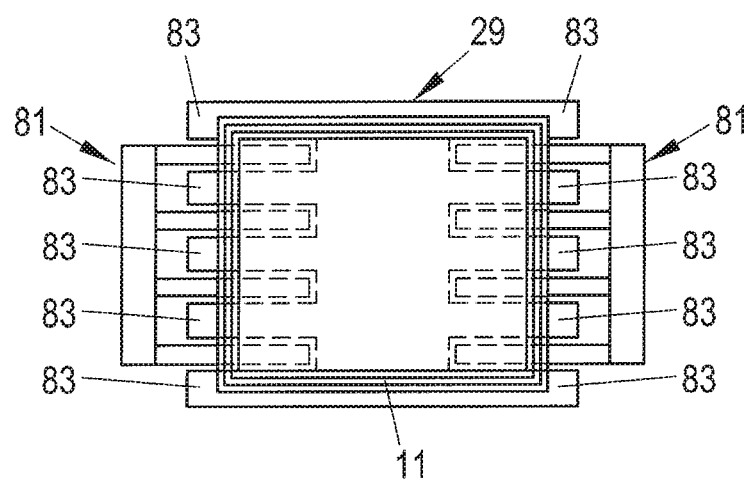
Figure 28:
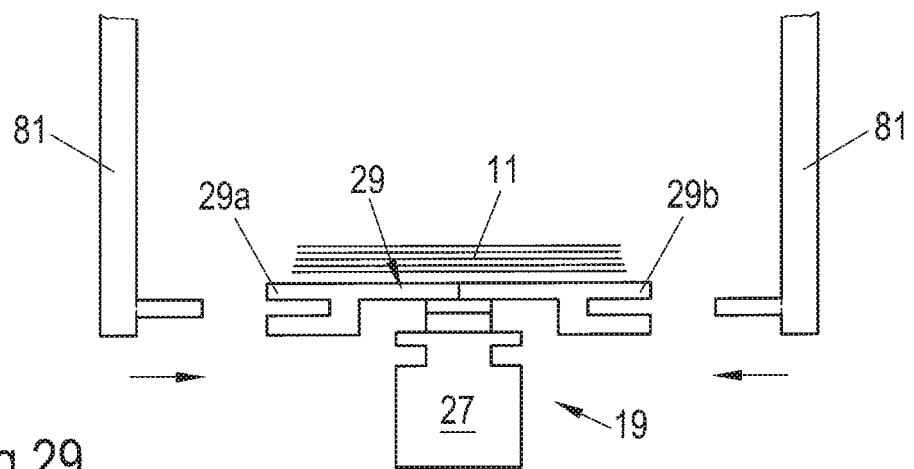
Figure 29:
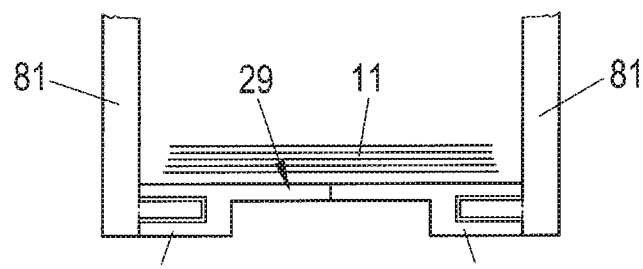
Figure 30:
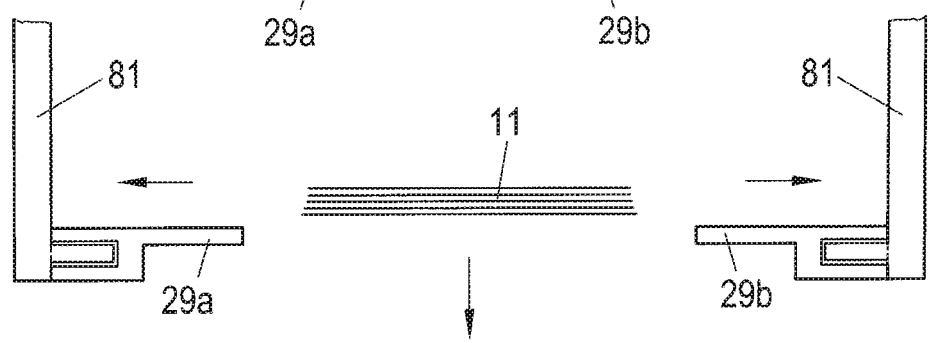
Figure 31:
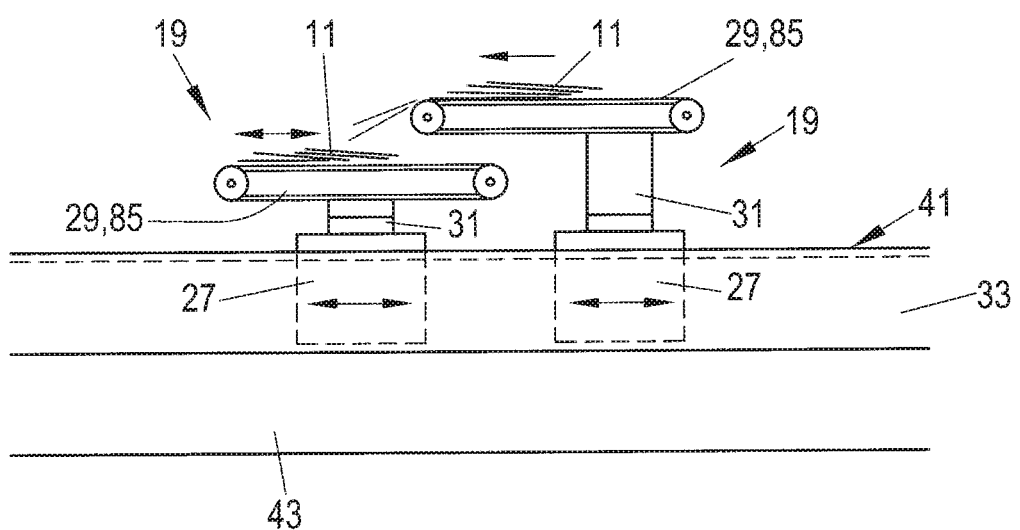
Figure 32:
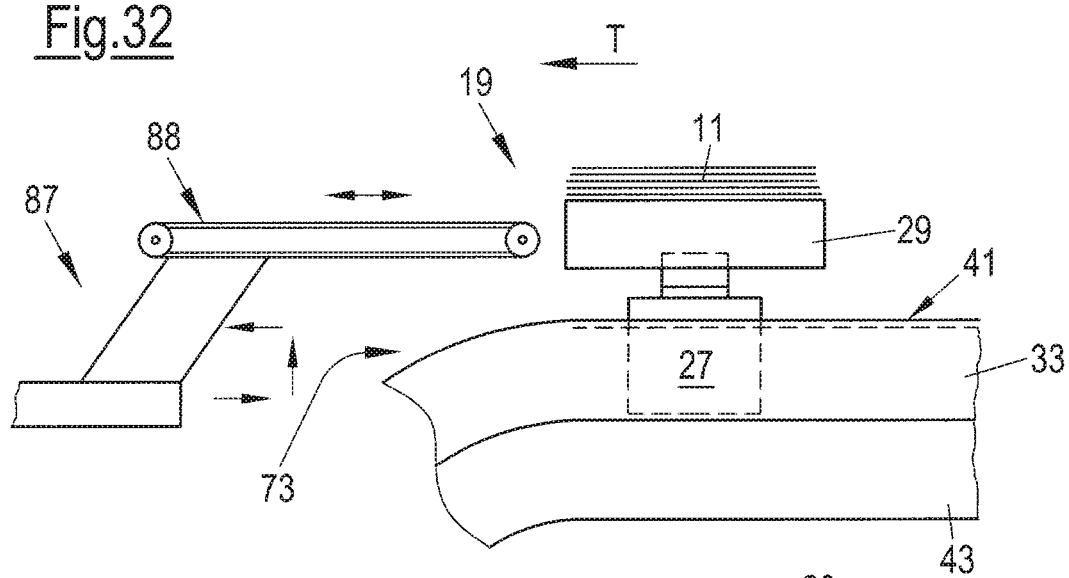
Figure 33:
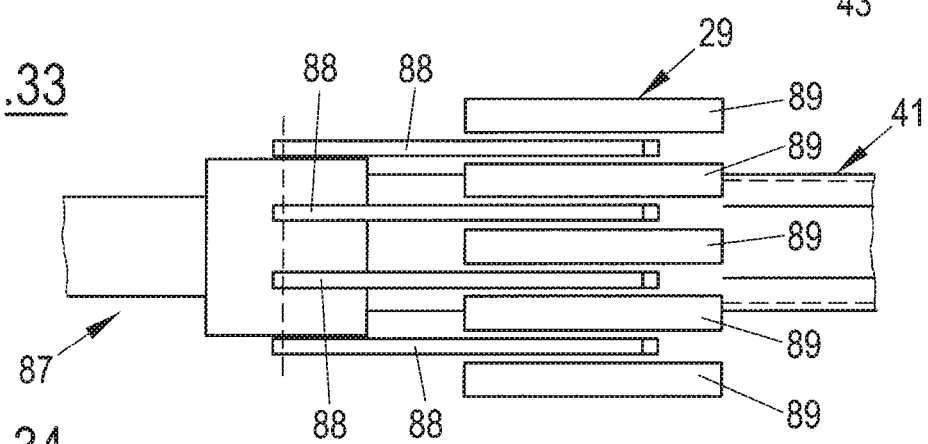
Figure 34:
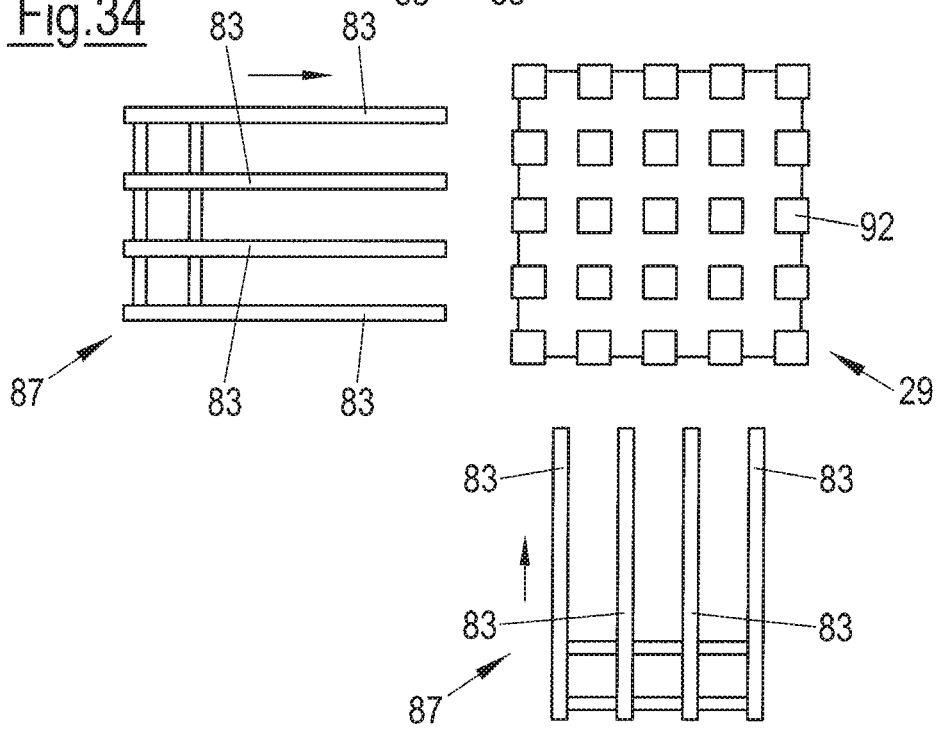
Figure 35:
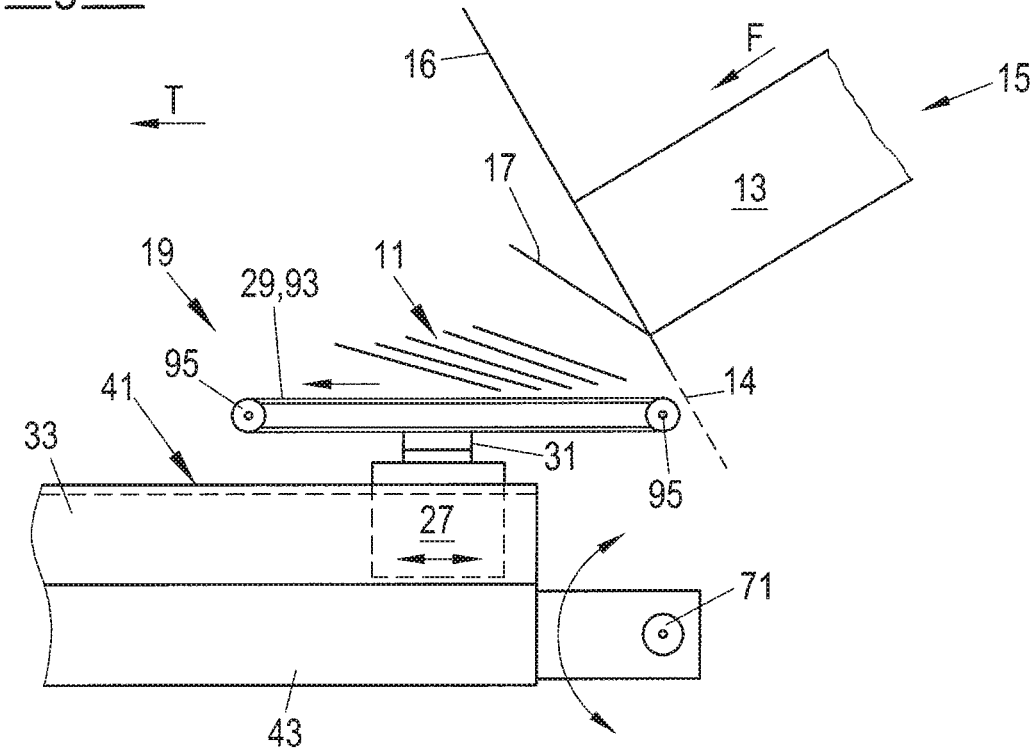
Figure 36:
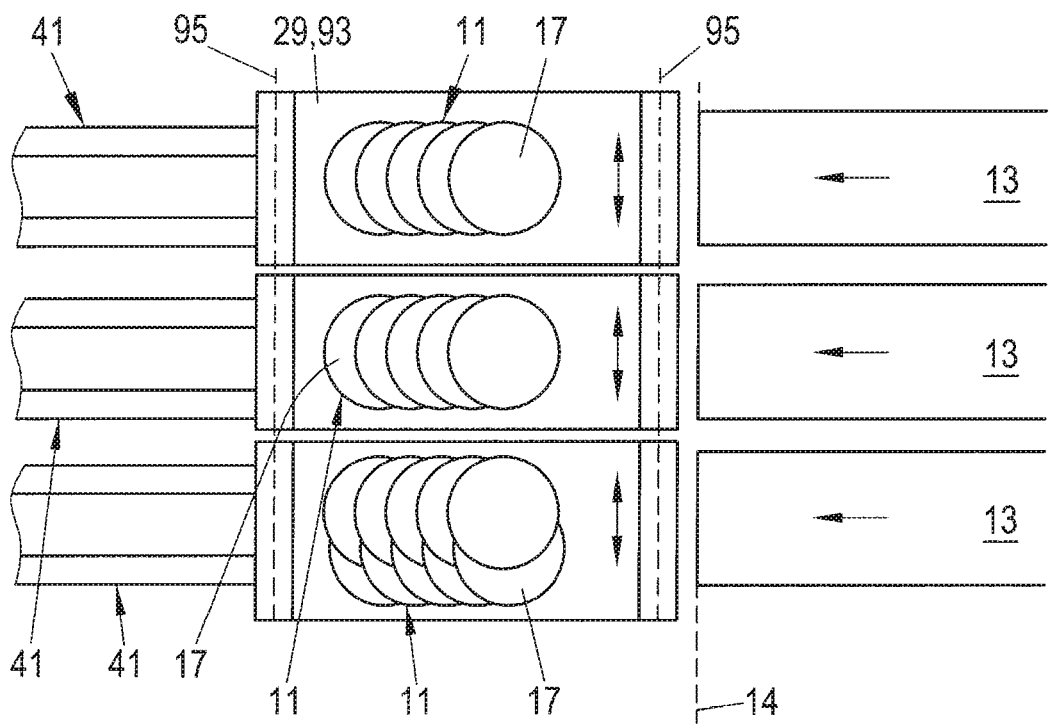
Figure 37:
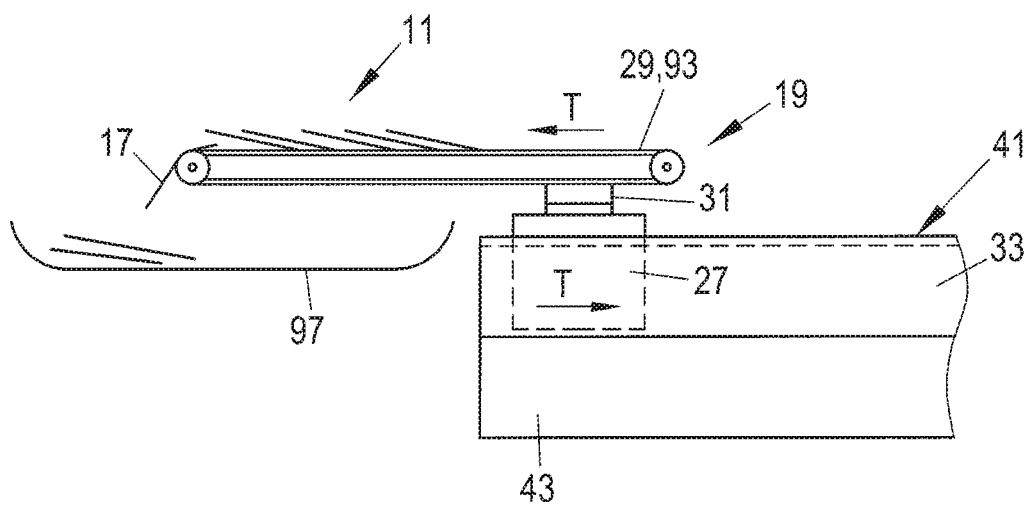

The invention will be described in the following by way of example with reference to the drawing. There are shown:

FIG. 1 a mover in accordance with an embodiment of the invention arranged in a track section;

FIGS. 2 to 5 respectively, a schematic plan view of a possible embodiment of a total system in accordance with the invention;

FIG. 6 a plan view of a functional region of a track system in accordance with the invention configured as a branch;

FIG. 7 a plan view of a further functional region of a track system in accordance with the invention with transversely movable movers;

FIG. 8 a side view of a part of the functional region of FIG. 7;

FIG. 9 a schematic plan view of a part of a track system in accordance with the invention with a temporary leading together of a plurality of tracks;

FIG. 10 a schematic side view of a part of a return line and/or cleaning line in accordance with the invention for movers oriented upside down;

FIG. 11 a schematic side view of a track section in accordance with the invention to illustrate a plurality of possibilities for weighing portions;

FIG. 12 a schematic plan view of movers in accordance with the invention with carrier segments movable relative to one another;

FIG. 13 a schematic side view of a functional region of a track system in accordance with the invention with pivotable track sections;

FIG. 14 a schematic side view of a functional region in accordance with the invention for a vertical movement of movers FIG. 15 a schematic view in the direction of transport of a flip-over station in accordance with the invention for flipping portions;

FIG. 16 a schematic side view of a functional region in accordance with the invention for a vertical buffering of portions;

FIG. 17 a schematic side view of a branch in accordance with the invention with track sections of a C type;

FIG. 18 a schematic view in the direction of transport of a mover in accordance with the invention arranged in a track of the C type;

FIG. 19 a schematic plan view of a functional region of the track system in accordance with the invention for a transition of movers between two different track types;

FIGS. 20 to 22 respectively, a mover with a hybrid rotor in different sections of the functional region of FIG. 19;

FIGS. 23 and 24 respectively in a schematic plan view, the cooperation in accordance with the invention of an auxiliary mover and of a transport mover during the movement along a track;

FIGS. 25 to 27 the removal of a portion from a mover by means of a robot in accordance with the invention;

FIGS. 28 to 30 a further variant in accordance with the invention of a removal of a portion from a mover;

FIG. 31 in a schematic side view, the transfer of a portion between two movers arranged in a track in accordance with the invention;

FIGS. 32 and 33 a cooperation in accordance with the invention of a mover and of a device not belonging to the track system for the taking over of portions;

FIG. 34 in a schematic plan view, alternative possibilities for the taking over of portions from a mover in accordance with the invention;

FIG. 35 in a schematic side view, the formation in accordance with the invention of a portion from cut-off product slices directly on a mover;

FIG. 36 a schematic plan view of the portioning region in accordance with FIG. 35;

FIG. 37 in a schematic side view, a possibility in accordance with the invention for the transfer of portions form a mover directly into a packaging; and FIG. 38 in a schematic side view, a further possibility in accordance with the invention for the transfer of portions directly from a mover into a packaging.

The embodiments of the invention described in the following are based on a drive principle for movers in a track system by linear synchronous motors (LSM drive) such has was explained by way of example in the introductory part with reference to the transport system of the company of MagneMotion, Inc. As many movers as desired in a track system which is as complex as desired can be moved individually, i.e. independently of one another, in the track system by means of a control device and can be localized and identified by means of the control device. The movers can furthermore be moved and positioned with extremely high precision in the track system. The movement speeds and accelerations and decelerations for the movers can likewise be selected and carried out as desired and individually.

FIG. 1 shows a cross-section, that is a section perpendicular to the direction of transport, through a track with a mover arranged therein. A track section 41 of the track system comprises a base serving as a stator 43 of the LSM drive which also serves as a mechanical base for attaching the track section 51, for example, to a substructure or to racks or holders of any desired form.

A track section of the so-called U type is shown in FIG. 1, i.e. the track section is upwardly open and the movers 19 are located above the stator 43.

Guide rails 33 which are designed as angled metal sheets and which run in slits 35 which are formed at the left and right side surfaces of a rotor 27 of the mover 19 serve as a guide for the mover 19 here. The guides of the track system for the movers 19 can, however, also be differently configured.

The guidance of the track system provides a defined relative position of the rotor 27 with respect to the stator 43. It is in particular hereby achieved that a permanent magnet arrangement M of the rotor 27 observes an exactly defined spacing from the stator 43.

In accordance with the LSM drive, the rotor 27 provided with the permanent magnet arrangement M is movable by a corresponding control of the stator 43 by means of a control device not shown here in the direction of transport along the stator 43 and thus in the track comprising the stator 43. The rotor 27 is guided by the guide rails 33 during this movement.

A carrier 29 is arranged at the rotor 27 and provides a support surface 39, which is planar, for example, to transport food portions.

The carrier 29 can be fixedly connected to the rotor 27. In an alternative embodiment, the carrier 29 is releasably attached to the rotor 27.

A holder 31 of generally any desired design is provided between the carrier 29 and the rotor 27. On a releasable attachment of the carrier 29 to the rotor 27, the holder 31 can be configured as a component of a coupling or can form a coupling section which cooperates with a corresponding coupling section 37 of the carrier 29. The cooperation between the rotor 27 and the holder 31 or between the holder 31 and the carrier 29 can generally take place in any desired manner. A purely mechanical connection can be provided. It is also possible that the carrier 29 is magnetically held at the holder 31 or the holder 31 is magnetically held at the rotor 27. The holder 31 can also be configured to allow relative movements of the carrier 29 relative to the rotor 27, for example a rotation about a vertical axis to be able to rotate or align portions in this manner.

The carrier 29 can also be directly connected to the rotor 27. The holder 31 between the carrier 29 and the rotor 27 is then formed by the cooperating regions or coupling sections of the carrier 29 and the rotor 27.

As indicated in FIG. 1, a releasable attachment of the carrier 29 to the holder 31 allows a use of the rotor 27 with different carriers of different sizes, for example. FIG. 1 thus shows purely by way of example a carrier 29 which is provided with a coupling section 37' and whose support surface 39' is larger than that of the carrier 29 attached to the rotor 27 in FIG. 1.

A total system in accordance with the invention, i.e. a system in accordance with the invention in which the movement apparatus in accordance with the invention or the transport system in accordance with the invention, including the track system, only represents a component—albeit a major component—is shown in different possible embodiments in FIGS. 2 to 5, with the representation respectively taking place in a schematic and simplified manner to illustrate the possibilities in accordance with the invention.

The systems respectively comprise a slicer 15 which is configured for a multi-lane operation and with which a plurality of food products such as loaves of sausage or cheese can be cut into slices simultaneously at high speeds by means of a circular blade or scythe-like blade revolving in planetary motion and/or in a rotating manner. The cutting speed lies between several one hundred slices and some thousand slices per minute depending on the specific embodiment of the slicer 15.

Portions which comprise a plurality of cut-off slices are as a rule formed from the cut-off slices.

The systems shown each comprise a packaging machine 91 which is not explained in any more detail here and at which the portions formed form the cut-off slices can be packaged. It is frequently required for this purpose to combine the formed portions on their route from the slicer 15 to the packaging machine 91 in predefined formats 49 or format sets, i.e. in matrix-like arrangements in which one or more portions are arranged after one another in a respective plurality of lanes disposed next to one another. Within a respective format 49, the portions as a rule have to have a specific relative alignment relative to one another and have to be arranged with predefined spacings from one another both in the transverse direction and in the direction of transport T so that the portions can be discharged format set-wise to the respective downstream packaging machine 91.

Such a format set-wise packaging is, however, not absolutely necessary. It is, for example, also possible to pick portions from the transport system and to place them in packs with the aid of robots.

It is nevertheless in practice an object of a transport system for food portions arranged between a slicer 15 and a packaging machine 91 to influence these portions in a variety of ways. In this respect, it is not only a question of a possibly required format set formation, but, for example, also of the weighing of portions and of the separation of portions not suitable for the packaging.

A respective plurality of movers 19 each only indicated schematically here move in the track system 21 and at least some and in particular most of them are configured as transport movers for transporting food portions such as were explained above in connection with FIG. 1.

The operation of the total system is respectively monitored and controlled by a control device 25 which in particular controls the individual movements of the movers 19 in the individual tracks 23 of the track system 21.

Instead of a packaging machine 91, only a part of such a machine or one or more packs or parts thereof can also be provided into which the portions transported in by means of the movers 19 are placed down.

In the embodiment of FIGS. 2 and 3, the transport system in accordance with the invention is configured for four-lane operation. Four tracks 23 which extend in parallel and which each comprise a plurality of track sections 41 such as have been explained in connection with FIG. 1 extend between the slicer 15 and the packaging machine 91.

The transport system in accordance with the invention inter alia provides that upstream of the packaging machine 91 the movers 19 carrying the portions to be packaged are present in a format 49 which comprises a row of four portions arranged next to one another in accordance with the number of lanes of this total system.

Subsequent to the packaging machine, the four tracks 23 are led together to form a single track which forms a return line 45 in which the now empty transport movers 19 are guided back to the slicer 15 in a return direction R directed opposite to the direction of transport T. The return line 45 branches into a four-lane region again in the region of the slicer 15.

These transitions in the track system 21 are taken over by special functional regions which are also called branches 47 here.

In the embodiment of FIG. 2, the branches 47 comprise curved track sections, that is curve sections, in which the movers 19 are each moved along a curved track.

It can be seen from FIG. 3 that the track system in accordance with the invention can also be implemented without such curve sections. Changes of direction or branches 47 here respectively comprise one or more track sections at which the movers 19 each complete a change of direction of 90°, i.e. are moved at a right angle.

While FIGS. 2 and 3 thus show, in addition to the normal lines between the slicer 15 and the packaging machine 91 substantially serving for the transport of the portions, a special functional line or a special functional region in the track system 21 which serves for the return of the movers 19, FIG. 4 shows, in addition to two normal transport lines, two buffer lines 51 which, like the return lines in accordance with FIGS. 2 and 3, lie in a common horizontal plane with the transport lines. FIG. 4 thus shows an application example of the invention with a so-called horizontal buffer. The movers can move into and out of this buffer via branches 47 which can each comprise a plurality of individual switch sections 53.

As is generally known from conventional conveyor belt systems between slicers and packaging machines, such buffers can serve to provide a compensation between a comparatively high working speed of a slicer 15, on the one hand, and a processing speed of a packaging machine 91 which is slow relative thereto.

The transport principle in accordance with the invention by means of a track system moreover allows a high functional density to be achieved. It must be mentioned in a purely exemplary manner in this respect with regard to FIG. 4 that at least one of the buffer lines 51 can also be used as a return line if an additional line is provided between at least one of the buffer lines 51 and the slicer 15.

Due to the individual movement principle in accordance with the invention, a specific embodiment of the movers or of the lanes is at least not of importance with respect to some functions, but it is rather the utilization of a respective track implemented by means of the control device which is important. It can thus serve as a buffer line, for example, for a mover 19 in a track, whereas a mover directly downstream is returned to the slicer by means of the same track. It is thus not the specific design of the track or of the mover which decides on the function, but rather the control device and thus the user.

Since the track system in accordance with the invention can be designed in a simple manner in the manner of a modular kit, existing lines can consequently be reconfigured simply or new lines can be designed simply and fast. The track system in accordance with the invention is consequently substantially more flexible and has more variety than conventional conveyor belt systems.

In the system in accordance with FIG. 4, the transport of portions between the slicer 15 and the packaging machine 91 takes place over two lanes. The switch sections 53 of the branches 47 allow movers 19 to be able to move out of both lanes into the buffer lines 51 and from the buffer lines 51 into both lanes.

The third line from the left in FIG. 4 can, for example, also serve from taking over movers 19 located in the two left hand lines.

Individual lines or line sections can generally individually have different functions for the individual movers 19 in accordance with the invention, i.e. one line can simultaneously be a buffer line for a mover, can serve as an overtaking line for another mover and can be used by yet another mover as a normal transport line.

FIG. 5 shows that it is possible in a simple manner with the transport system in accordance with the invention to change the number of lanes on the track between the slicer 15 and the packaging machine 91. In the example shown here, a transition from an n-lane operation where n=3 to an m-lane operation where m=5 is achieved, and indeed with the aid of switch sections 53 which are arranged after one another and which together form a branch 47 which requires a specific length of the track system 21 in the direction of transport T.

FIG. 5 furthermore illustrates the formation of formats 49 which each comprise two lines and five rows, i.e. each format 49 is a 2×5 array of a total of ten portions whose relative arrangement is achieved by the arrangement of the ten movers in the five tracks upstream of the packaging machine 91.

The embodiment of FIG. 6 shows another possibility for changing the number of lanes. A branch 47 is shown in FIG. 6 which requires a smaller length of the track system in the direction of transport T in comparison with the embodiment in accordance with FIG. 5 and in which the movers 19 either move in a straight line or carry out one or more changes of direction of 90°, such as is indicated by the arrows at one of the intersection points in FIG. 6.

At this branch 47, n=3 incoming track sections 41 merge into m=5 outgoing track sections 41 which each extend in parallel with one another and in parallel with the track sections 41 incoming in parallel, with this transition taking place over a track section 41 extending perpendicular to the direction of transport T. The mentioned LSM drive principle is in particular easily in a position to transfer the rotors of the movers 19 from one track section to an adjoining track section extending transversely thereto. This branch 47 does not require any moving parts.

FIG. 7 simultaneously shows two alternative possibilities to change from an operation with n=3 lanes to an operation with m=5 lanes. In both variants, three track sections 41 incoming in parallel consequently in turn do not directly merge into five track sections 41 outgoing in parallel.

In the transition region, in accordance with a first variant, a track section 41 can be arranged which extends transversely and into which—unlike the embodiment of FIG. 6—the incoming movers 19 are not moved directly, but rather on functional movers 19 which are only moved transversely to the direction of transport T within the transverse track section 41. In other words, the transport movers 19 are so-to-say moved in accordance with a piggy-back principle transversely to the direction of transport and are assigned to the respective desired outgoing lane by a corresponding transverse movement of the "carrier" or "shuttle" movers 19.

This variant is shown in the schematic sectional view of FIG. 8. The carrier mover 19 configured to receive transport movers 19 incoming in the direction of transport T is movable in the same way as the transport movers 19, that is in particular in accordance with the LSM drive principle, by means of the control device in the track section 41 extending transversely to the direction of transport T.

Alternatively, movable carriers can also be dispensed with for the transverse movement of the incoming transport movers 19. Instead of the track sections 41, a passive reception device can be provided into which the incoming transport movers 19 can move and which can be attached to a central holder 55 and which can be moved transversely to the direction of transport T by moving this holder 55 in order in this manner to assign the received transport movers 19 to the respectively desired outgoing lane.

FIG. 9 shows a further special functional region of a track system 21 in accordance with the invention by which one or more functions can be provided which can be implemented particularly simply and advantageously in the use in accordance with the invention of the individual transport system for the transportation and handling of food portions.

Provision is made in this functional region that a plurality of tracks are temporarily led together, and indeed in particular to exactly one track 23 which comprises a track section 41 and at which an additional function can be carried out which will be explained in more detail in the following. The additional function does not need to be carried out at each of the individual tracks due to this leading together. It is in particular sufficient if a functional station 57 specifically configured for this purpose is only provided at the "eye of the needle" so-to-say formed by this leading together.

It is additionally shown purely by way of example in FIG. 9 that this leading together of tracks cannot only be made using a single output region, but that it is also possible to lead together tracks of different outlet regions, in particular spatially separate outlet regions, for the carrying out of an additional function. In the example shown, a slicer 15 working over four lanes and a further slicer 15 working over two lanes are provided. The total of six tracks which come from these two slicers 15 are led together via branches 47 to the track 23 in which the functional station 57 is provided.

It is likewise shown purely by way of example in FIG. 9 that, subsequent to such a leading together of tracks, the outgoing tracks do not have to be supplied to a single downstream working region, for example to a packaging machine, but that is rather possible to provide a differentiated further transport of the portions subsequent to the functional station 57. This differentiation is in particular coordinated with the additional function carried out at the leading together of tracks, i.e. the downstream working region to which the portion is led can be determined for each portion at the functional station 57.

In the example of FIG. 9, the portions can either be moved on into a four-lane transport region of the track system for a further transport to a packaging machine not shown here after running through the functional station 57 or can be supplied to a rejection line 61. Against this background, the functional station 57 can e.g. be a weighing station at which the weight of the incoming portions is respectively determined. Portions whose weight deviates from a desired weight outside predefined tolerances can be moved into the rejection line 61 by means of the control device not shown here and can, for example, be discarded in a suitable manner from the transport mover at an unloading point or can be removed in a different manner.

In this embodiment, the weighing of the portions consequently does not have to take place in every single one of the tracks outgoing from the slicers 15.

As, however, FIG. 9 also shows, it is nevertheless possible to associate a scale 59 with each individual slicer 15 or with each individual track coming from one of the slicers 15 and consequently to determine the respective portion weight relatively briefly after the respective slicer 15 and optionally to report it to the control device or to store it at the transport mover 19 itself. The functional section 57 can then take over a different task. The functional station 57 can thus, for example, be configured to determine the position or one or more other properties of a portion on the respective carrier of the transport mover 19. A transport mover 19 having an incorrectly aligned portion can then be marked in a suitable manner, in particular data-wise, by the functional station 57 or by the control device so that it is possible to identify such a marked transport mover 19 again at any time in order to correct the position of the portion on the carrier at the respective transport mover at a functional region not shown here in FIG. 9.

Such a concept for acquiring additional information with respect to one or more properties of the portion or of the mover 19 at a point in the track system especially configured for this purpose and the use of the individual information hereby acquired at another point in the track system can also be carried out generally and independently of the provision or of the specific embodiment of a leading together of tracks differently than explained purely by way of example above.

A leading together of tracks such as is shown by way of example in FIG. 9 does not only have to comprise exactly one track, but a plurality of incoming tracks can also be led together to more than one track. The functional station 57 can then be configured to carry out the specific task assigned to it simultaneously at a plurality of tracks.

FIG. 10 illustrates an aspect of the invention according to which a line of the track system, for example a return line, can be used for cleaning movers 19 or their carriers 29 without having to take the movers 19 from the respective track or without having to remove the carriers 29 from the movers 19 for this purpose.

For this purpose, the respective line is guided such that the movers 19 have an upside down arrangement or the carrier 29 to be cleaned in this example represents the lowest lying section of the mover 19. For this purpose, for example, a track of the U type, such as has been explained e.g. in connection with FIG. 1, can be guided in an upside down arrangement, in particular vertically beneath a transport track with an upwardly open U type track, wherein this upside down line is guided in a cleaning region temporarily in a lower lying track section 41 as FIG. 10 indicates.

A cleaning bath 65 can be provided beneath the track section 41 in this cleaning region; it is located in a chamber 63 to be traversed by the movers 19 and the movers 19 with their carriers 29 moved along this cleaning line section can automatically dip into said cleaning bath and can rise up out of it again automatically after the cleaning has taken place.

Instead of such a cleaning bath 65, a chamber 63 can be provided in which the movers 19 are acted on at least regionally by UV radiation or by a plasma. It is likewise possible to subject the movers 19 at least regionally to a heat treatment in such a chamber 63, for example by heating, to kill off organisms impairing hygiene.

Such a cleaning device can be arranged at a track which is oriented and configured generally as desired, i.e. an upside down arrangement is not absolutely necessary for a cleaning device integrated into a line and to be run through by the movers 19.

FIG. 11 illustrates three different possibilities to determine the weight of a food portion 11 disposed on the carrier 29 of a mover 19.

A scale can thus, for example, be integrated into the holder 31 between the came 29 and the rotor 27. This variant thus requires a corresponding functionality of the movers 19 themselves.

A transmission which may be provided, for example, of the weight information to the control device can take place directly by a communication directly between the mover 19 and the control device. Alternatively or additionally, a transmission of the weight information can take place over one of the track sections 41. It is also possible to store the weight information in the mover 19 and to process it at another point or to transmit it to another instance, in particular to the control device. Alternatively, the weight information can be read out of the mover 19 by a track section 41 especially configured for this purpose and can be processed by it or can be transmitted to the control device. This information handling is not restricted to the portion weight in accordance with the invention, but can rather also be performed for any other information relating to a desired portion or to a mover 19.

Another possibility for determining the weight information comprises utilizing a possible circumstance according to which the mover 19 with its rotor 27 is not only guided relative to the stator 43 of the track section 41 by the guide rails 33, as explained by way of example with reference to FIG. 1, but is rather also carried by them, i.e. the weight of the total movement 19 is completely taken up by the two guide rails 33.

This circumstance can be utilized in a weighing track section 41 especially configured for this purpose to determine the weight of a mover 19 and thus to determine the weight of a portion 11 transported thereby independently of the stator 43 of this track section 41.

Provision is in particular made with such a weighing track section 41, for example, that the guide rails 33 are not supported at the stator 43, but are rather so-to-say guided to a scale 59 arranged beneath the stator 43, for example, while bypassing the stator 43. In other words, the guide rails 33, and thus the mover 19, are not supported at the stator 43, but rather at the scale 59 by means of suitable connection elements 67. Since the weight of all the components involved in this is known, the desired portion weight can be determined in this manner.

In accordance with a further alternative, the total weighing track section 41 can be supported at a scale 59, i.e. the stator 43 together with the guide rails 33 and the mover 19 supported at them lies on the scale 59 via connection elements 69, for example.

FIG. 12 shows an example for a mover 19 with a special function which is based on a carrier 29 divided into two carrier segments 29a, 29b here.

The two segments 29a, 29b can be moved apart and toward one another relative to the rotor 27 of the mover 19 transversely to the direction of transport T as required, with the spacing between the segments 29a, 29b measured in the transverse direction being able either to adopt only one possible value in the state moved apart shown in FIG. 12 or being able to be selected as desired and in particular as continuous.

Such a mover 19 can be used to change the lane spacing of two portions located on the carrier 29. In this manner, a two-lane operation with a variable lane spacing can be implemented at least temporarily with a single track. Such a track section 41 can, for example, be used in the region of a slicer to pick up slices coming from two adjacent lanes of a multi-lane slicer and respectively forming a portion as two portions disposed next to one another on the carrier 29 and to transport them away from the slicer. On this transport track, the lane spacing can be increased by traveling the two carrier segments 29a, 29b apart in order in this manner to achieve an adaptation of the lane spacing to a downstream device of any kind whatsoever. This device can be a device which does not belong to the track system such as a packaging machine or a device of the track system.

If the respective transport system has a "climbing capability" for the movers 19 moved in the track system, i.e. if the movers 19 can overcome rising and falling slopes without impairing their movability, which is effected, i.e. defined, by means of the control device and is in particular exactly positioned, which is generally the case with the initially explained LSM drive principle, special track sections 41 can be used such as are illustrated in FIG. 13.

The small illustration at the top right in FIG. 13 shows that the track sections described here can be those of the U type, that is the rotors 27 of the movers 19 are disposed above the respective stator 43.

The special track sections 41 are such which can be pivoted about a pivot axis 71 extending perpendicular to the direction of transport T and are connected in an articulated manner for this purpose to downstream stationary track sections 41 in the example shown here.

In the example shown here, this adjustment function of track sections 41 of the track system in accordance with the invention serves to assign movers 19 incoming over a track section 41 in a single horizontal plane selectively to one of two adjoining transport planes disposed vertically above one another. In the situation shown in FIG. 13, the incoming track section 41 and an upper outgoing track section 41 are connected to one another via a pivotable track section 41 which has a respective curved section 73 at the inlet side and at the outlet side to form a transition for the movers 19.

The lower plane at the outlet side is arranged at the same level as the inlet plane so that a straight-line exit for the movers 19 without an upward or downward slope has to be established to allocate incoming movers 19 to the lower outlet plane, which is implemented over a lower pivotable track section 41 which is designed as continuous and straight and which is pivoted into a lower evasion position in the situation in accordance with FIG. 13 to make room for the upper adjustable track section 41.

FIG. 13 only represents an example for a plurality of conceivable configurations which can be implemented with generally any desired number of pivotable track sections 41. Track sections 41 can accordingly also be pivoted horizontally. In this case, the track sections 41 can also be of a laterally open C type which is explained in more detail at another point.

FIG. 14 shows another possibility of assigning movers 19 to different transport planes. In this embodiment, a comparatively short track section 41 is provided which is movable in the vertical direction (as indicated by the double arrow) perpendicular to the direction of transport T and which is also called a "lift" or—due to its relatively small length—a "mini-lift".

Generally any desired number of incoming tracks can "communicate" with generally any desired number of outgoing tracks by a transfer of movers 19 with one another using one or more such track sections 51 arranged vertically movably above one another together or independently of one another.

This special functional region of a track system in accordance with the invention also utilizes the circumstance that the transport system in accordance with the invention can generally be configured such that gaps provided between consecutive track sections 41 can be traveled over by the movers 19 without problem, i.e. without creating undefined states. This is the case with the initially explained LSM drive principle. Depending on the specific embodiment of the track system, such gaps, which can be traveled over without problem, can amount, for example, to a plurality of millimeters or can be in an order of magnitude of approximately 1 to 2 cm.

As mentioned at another point, it can be desirable for the handling of food portions on their route between the slicer and the packaging machine or also in other situations to flip over the portions, i.e. to turn them upside down, in order thus e.g. to ensure that a respective desired side of the portion is visible in a package.

The transport principle in accordance with the invention opens up a possibility, which is comparatively simple to be implemented and is space-saving, to carry out such a flipping over of portions. FIG. 15 shows a flip-over station which comprises a track section 41 which is designed as circular here and which defines a plane which extends perpendicular to the direction of transport. The arrangement of the flip-over station is selected such that the central axis lies above the level of the support surface 39 of the carrier 29 of an incoming motor 19 and in particular approximately at the center—viewed in the vertical direction—of a portion 11 to be flipped.

The flip-over station comprises two pairs of rotational or flip-over movers 72 which are mutually diametrically opposed and which are movable in the track section 41, in particular in each case like a pendulum alternately by a respective 180° in the one direction and in the other direction, with the flip-over movers 75 being controllable by means of the control device to a common operation coordinated with one another with the same sense of revolution. A straight track section 41 belonging to the flip-over station is associated with each pair of flip-over movers 75.

Movers 19 incoming into the flip-over station move into one of the two straight track sections 41 of the flip-over station and their carriers 29 especially formed for this purpose at the outer sides and each provided with a slit come into engagement with inwardly projecting projections of the flip-over movers 75. A portion 11 to be flipped is then respectively located between the carrier 29, by which it is carried on the running in, and the carrier 29 of a waiting mover 19 held in an analog manner by the other pair of flip-over movers 75 arranged with its rotor 27 in the other straight track section 41.

The two flip-over mover pairs 75 are subsequently rotated together in the same sense of rotation by 180° about the center axis. The originally upper upside down mover 19 now thereby takes over the role of the mover 19 carrying the portion 11 so that it can now move the movers 19 carrying the portion 11 onward in a track section adjoining the outlet side with the portion 11 flipped over by this process.

The spacing between the two support surfaces of the carriers 29 can in particular be changed during the flip-over process for holding the portion 11 in that the two flip-over movers 75 of the one pair are moved together with the carrier 29 held by them toward the two flip-over movers 75 of the other pair.

A possibly required vertical compensation to adapt the level for the mover 19 incoming into the flip-over station or outgoing out of the flip-over station can also be carried out by this generally given travelability of the flip-over movers 75 and thus by the vertical adjustability of the respective carriers 29 held by flip-over pair.

FIG. 16 shows a further specific functional region of a track system in accordance with the invention in which the transport principle in accordance with the invention can be used for a vertical movability of movers 19 to implement a so-called vertical buffer, for example.

In this embodiment, the vertical buffer serves to take over complete movers 19 and to move them in a vertical direction. The movers 19 and consequently the portions 11 disposed on their carriers 29 can thus be stored temporarily in buffer towers requiring a comparatively small construction space. The control device can know the dwell time of each individual portion 11 in the buffer due to the individual identifiability and localization capability of the movers 19 so that it is ensured that a respectively prescribed dwell time for the portions 11 is not exceeded.

In the lower region of FIG. 16 a transfer point is shown at which transport movers 19 having portions to be buffered run into the vertical buffer over an especially designed track section 41. The direction of transport of this incoming track section 41 thus extends perpendicular to the plane of the drawing of FIG. 16.

A special feature of this incoming track section 41, for example in comparison with the track section 41 shown in FIG. 1, comprises the guide rails 33 being configured and arranged differently to FIG. 1 such that an upward removal of the rotor 27 is made possible.

The vertical buffer comprises two track section 41 of the U type which extend in parallel in the vertical direction and whose open sides face one another. Functional movers 19 which respectively cooperate in pairs, which are disposed mutually oppositely at the same level and which are here also called lift movers are moved in the vertical direction by means of the control device in these vertical track sections 41.

Sections of the rotors 27 projecting inwardly each come into contact with the lower side of a carrier 29 over the guide rails 33 of the vertical track sections 41 by moving the lift movers 19 upwardly. The two cooperating lift movers 19 can thus raise the total respective mover 19 via a carrier 29 and can move it along the vertical buffer.

The possibility in accordance with the invention is not shown that the vertical buffer merges into a horizontal line into which the lift movers can each merge together with a transport mover 19 held by them to carry out a buffering or a provisional transport in a horizontally extending line. It is also possible, starting from such a horizontal line, to bring the transport movers 19 at another vertical line back to the original transport level or to another transport plane and to deploy them into corresponding track sections there.

In an alternative embodiment, the carriers 29 of the transport movers 19 can be designed as removable from the respective rotor 27 such that only the carriers 29 can each be moved together with a portion 11 lying thereon into the vertical buffer by means of the lift movers 19. The rotors 27 hereby respectively freed from their carrier 29 are then moved on in a suitable manner in order, for example, to accept carriers 29 again at another point.

A further special functional region of a track system in accordance with the invention is illustrated in FIG. 17. This functional region is a branch 47 which lies in a vertical plane.

This branch 47 comprises track sections 41 of the so-called C type which are thus laterally open so that (cf. FIG. 18) the rotors 27 of movers 19 moved in such C tracks do not lie above or beneath the stator 43, but rather extend along the left and right sides of the stator 43.

As FIG. 18 shows, a correspondingly angled holder 31 between the rotor 27 and the carrier 29 can, for example, provide that the support surface 39 of the carrier 29 extends in a horizontal plane on such a lateral guide of the movers 19 at the track sections 41.

As mentioned at another point, the transport system in accordance with the invention is generally able to allow the movers 19 to overcome rising and falling slopes. An oblique position of the support surface 39 of the carrier 29 adopted in this respect, as illustrated in FIG. 17 at the mover 19 at the left there, can be avoided in a possible embodiment of the rotors 19 when, for example, a pendulum mechanism is provided which provides that the support surface 39 of the carrier 29 always remains horizontally aligned independently of the orientation of the rotor 27. Such a measure is, however, not compulsory. In practice, the rising slopes to be overcome by the movers 19, e.g. at vertical branches, can be considerably smaller than is illustrated in FIG. 7 only for illustration purposes.

A vertical branch with track sections of the U type can generally also take place in accordance with the principle illustrated in FIG. 6. For this purpose, it is only necessary to imagine the horizontal branch of FIG. 6 only tilted by 90° in the vertical and provided with movers 19 in accordance with FIG. 18 such that the support surfaces 39 of the carriers 29 are oriented horizontally.

With vertical branches which consequently do not have to have any curved track sections such as in FIG. 17, but which rather only include right-angled changes of direction analog to the branch in FIG. 6, space available in the vertical direction can advantageously be used such that it is not necessary to move in the width with the transport system.

As mentioned at another point, the track system in accordance with the invention can comprise different track types which in particular differ as to how the rotor of each mover is arranged with respect to the stator of the track. With a track of the U type, the rotor is located above or beneath the stator. With a track of the C type, the rotor movers laterally next to the stator.

In a respective total system, the track system in accordance with the invention can comprise only tracks of a single type. It is alternatively possible to use different track types within the track system in order, for example, to use the advantages of the respective track type directly in each case for the respective application or applications or special functional regions. Provision can be made in such a hybrid track system that the movers cannot change between the part systems. Possibilities are then provided to transfer portions or carriers carrying portions between movers of the one system and movers of the other system.

It can alternatively be desirable so-to-say to design the border between the part systems as "permeable" such that movers can change between tracks of different types without limits and in particular without any impairment of a gentle transport of the portions and in particular without stopping the movers.

A possibility of how this can be implemented in a comparatively simple manner is illustrated schematically in FIGS. 19 to 22.

Three track sections 41 are shown in FIG. 19 which follow one another directly in the direction of transport T and which can be run through without interruption and with a gentle portion transport by special movers 19 which are shown in more detail in FIGS. 20 to 22.

A transition or hybrid track section 51, which will be described in more detail in the following, is located between a track section 41 of the U type shown at the bottom in FIG. 19 and a track section of the C type shown at the top in FIG. 19.

FIGS. 20 to 22 each show in a section perpendicular to the direction of transport T the respective track section 41 shown respectively at the left in FIG. 19 in a plan view. FIG. 20 thus shows the track section 41 of the C type, whereas in FIG. 22 the track section 41 of the U type is shown and FIG. 21 shows the transition or hybrid track section 41.

The movers 19 configured for such transitions are so-called hybrid transport movers 19 which are provided with special hybrid rotors 27. As indicated in FIGS. 20 to 22, such hybrid rotors 27 can be characterized in that they are provided with two spatially separate permanent magnet arrangements M of which a respective one can cooperate with a stator 43 of a track of the U type (cf. FIG. 22) and the other one can cooperate with a stator 43 of a track of the C type (cf. FIG. 20).

The hybrid rotor 27 is furthermore provided with slits 35 for guide rails 33 of the respective track sections 41 said slits being configured mutually opposite, i.e. in mutually oppositely disposed side surfaces.

The slits 35 are configured for the guidance at track sections of the U type (cf. FIG. 22) in accordance with the embodiment described above with reference to FIG. 1 in the left and right side surfaces of the hybrid rotor 27. In accordance with the embodiment in accordance with FIG. 18, the hybrid rotor 27 is additionally provided with a pair of guide slits 35 which are configured at the lower and upper side surfaces and which (cf. FIG. 20) cooperate with guide rails 33 of track sections of the C type.

The hybrid track section in accordance with FIG. 21 is inter alia characterized in that two stators 43 are provided which can be controlled independently of one another by means of the control device. This hybrid track section 41 is furthermore provided with only one single guide rail 33 of the U type (cf. the left in FIG. 21) and with only one single guide rail 33 of the C type (cf. the top in FIG. 21).

Such a hybrid track section 41 can be run through without problem by correspondingly configured hybrid movers 19 both in a mechanical aspect and drive control-wise when the two stators 43 are controlled accordingly. The hybrid track section 41 can take over a mover 19 incoming from the "pure" U type track section 41 (cf. FIG. 22) with its own U stator (cf. bottom in FIG. 21) and can transfer it first to its own C stator (cf. right in FIG. 21) and then transfer it to the adjoining "purely" C type track section 41 (cf. FIG. 20).

The provision of such hybrid track sections which combine properties of different track types in themselves in a certain manner is, however, not compulsory to effect transitions between track sections of different types in a track system. It is thus generally possible to arrange track sections of different types directly following one another. The respective guide rails 33 can be extended in the direction of the respective other track section at the transition points and can in particular overlap one another to ensure a problem-free guidance of the movers or their rotors beyond the transition points in a mechanical aspect and thus to ensure an unchanging constant transport of the portions.

It has been explained in the introduction part that a general aspect of the invention comprises having two or more movers cooperate. The cooperating movers can be moved in the same track and in particular directly after one another. In this respect, the movers can be permanently associated with one another and in particular mechanically coupled to one another. An auxiliary mover, which is permanently present, can thus, for example, be associated with each transport mover 19. Such an embodiment will be explained in more detail in the following in connection with FIGS. 23 and 24.

It is alternatively possible not to provide any permanent association of movers, but rather only to bring it about temporarily and only as required to implement an additional function of any kind whatsoever.

In both variants, however, the generally independent movability of the movers in the track system is utilized and thus the circumstance that the spacing between two mutually following movers can be set during operation, i.e. while the movers move along a track, as desired and with a very high precision by means of the control device and can in particular be varied. Such a spacing change can be converted into an influencing of at least one of the movers by suitable means which can be of a mechanical kind, but with this not being compulsory.

In the embodiment of FIGS. 23 and 24, a so-called auxiliary mover 19, which is moved in the direction of transport T behind the transport mover 19 in the respective track section 41, is associated with a transport mover 19 which is provided with a carrier 29 for a portion, not shown. In the embodiment shown here, the two movers 19 are connected to one another by a coupling rod 79 which is connected in an articulated manner to the carrier 29 of the transport mover 19 with a spacing from an axis of rotation 77 about which the carrier 29 is rotatable relative to the rotor 27, with the axis of rotation 77 and the axis of the articulated connection between the coupling rod 79 and the carrier 29 extending in parallel with one another and perpendicular to the direction of transport T and perpendicular to the support surface of the carrier 29.

As the comparison of FIG. 23 with FIG. 24 shows, a rotation of the carrier 29 relative to the rotor 27 can be brought about by means of the coupling rod by changing the spacing between the two movers 19. If the spacing between the two movers 19 is comparatively small (cf. spacing a in FIG. 23), this represents a starting situation with a non-rotated carrier 29. If, e.g. with movers 19 moving in the track section 41, the speed of the auxiliary mover 19 running behind the transport mover 19 reduces, the spacing between the two movers (cf. spacing A in FIG. 24) increases, whereby the carrier 29 is rotated in the direction indicated by the arrow in FIG. 24.

The angle of rotation can be set as desired by a corresponding relative positioning of the two movers 19 during the travel and can in particular be kept constant with high precision. Positional corrections of portions on the carrier 29 can hereby be carried out, for example. It is equally possible to change the alignment of portions between a longitudinal direction and a transverse direction, i.e. to rotate portions by 90°, such as can be necessary, for example, for the transfer or taking over of portions for adapting to devices provided for this purpose.

FIGS. 25 to 27 illustrate a possibility in accordance with the invention to allow a simple removal of portions 11 by external devices—here by a robot—i.e. by devices not belonging to the track system by a special configuration of the carriers 29 of the transport movers 19.

In the embodiment shown here, the carrier 29 is formed in the manner of a fork or rake at oppositely disposed side regions and is provided with spaced apart tines 83 between which correspondingly fork-like or rake-like grippers 81 of a robot, not shown in any more detail here, can meshingly engage from below in order in this manner to be able to take up a portion 11 lying on the carrier 29.

A carrier 29 of such a configuration can consequently remain at the mover 19 on a portion transfer.

FIG. 25 shows the situation before the removal of the portion 11. In the situation in accordance with FIG. 26, the grippers 81 have moved from below through the carrier 29 and have in so doing taken up the portion 11 which can thereupon be brought to a respective desired location by means of the robot.

The placement of portions 11 on such a carrier 29 by means of robot comprising such a gripper 81 is possible in reverse order.

FIG. 27 shows a plan view of the situation in FIG. 25, for example, in which it can in particular be recognized that the tines of the fork-like grippers 81 of the robot lie in the intermediate spaces between the times 83 of the carrier 29 in order in this manner to be able to grip beneath the portion 11 which comprises (cf. FIG. 26) a plurality of product slices 17 disposed above one another.

FIGS. 28 to 30 illustrate another possibility for removing portions 11 from movers 19. In this embodiment, the carrier 29 does not remain at the mover 19 In this embodiment, the grippers 81 of the robot, on the one hand, and separable segments 29a, 29b of the carrier 29, on the other hand, are rather coordinated with one another such that the grippers 81 can each be coupled to one of the carrier segments 29a, 29b, whereby so-to-say the carrier segments 29a, 29b become a component of the robot grippers 81.

The portion 11 can thus be removed from the mover 19 together with the carrier 29 formed by the two segments 29a, 29b by means of the robot. This situation is shown in FIG. 29 without the residual mover substantially formed by the rotor 27. Subsequently, in accordance with FIG. 30, the two grippers 81 can each be moved apart together with the coupled carrier segment 29a or 29b in order to drop the portion 11 into a packaging, not shown, for example.

It can be ensured by suitable manes, for example in the form of a latch, that when the grippers 81 are moved apart in accordance with FIG. 30, the carrier segments 29a, 29b remain at the respective gripper 81 and can thus be reliably moved away, in particular abruptly, to the side below the portion 11.

Alternatively to the substantially horizontal moving apart in accordance with FIG. 30, a pivot movement to the bottom, in particular taking place abruptly, can also be effected relative to the grippers 81, for example, for the carrier segments 29a, 29b. It is also possible to pivot the grippers 81 respectively together with the coupled carrier segment 29a or 29b to the outside and to the bottom to release and drop the portion 11.

The manner of the coupling between the grippers 81 and the carrier segments 29a, 29b is generally as desired and is only schematically indicated here in FIGS. 28 to 30.

FIG. 31 illustrates a cooperation of two movers 19 which can be used, for example, but not exclusively, for the formation of multi-sort packs which are becoming more and more important in practice. The embodiment of the movers 19 shown in FIG. 31 explained in more detail below allows portions 11 to be transferred gently from one mover 19 to another mover 19. When the portions 11 to be transferred are part portions, it is in particular hereby possible to transfer a part portion of a first sort to a mover on which a part portion of one or more different sorts is already disposed so that hereby a portion transfer from mover to mover and thus the formation of a total portion of a plurality of sorts is directly possible on a mover 19, and indeed generally at any desired point within the track system and thus independently of the installation site of the slicers at which the different product sorts are sliced.

It is thus not necessary, for example, to move by means of a portion carrier to different stations after one another in the form of slicers or of conveyor belts coming from slicers in order consecutively to pick up part portions of different sorts.

The formation of multi-sort portions can be implemented extremely variably and flexibly in this manner.

Provision is made for this purpose in accordance with the embodiment of FIG. 31 that the carriers 29 of the movers 19 are each formed by a continuous conveyor belt 85.

The movers 19 can each be provided with their own energy supply for the drive of the conveyor belts 85. This will not be looked at in more detail at this point since the possibilities for an energy supply of movers 19 are explained at another point.

It is, however, generally also possible to effect a conveyor belt operation for transferring portions 11 between movers 19 in each case without any separate energy sources of the movers 19. A drive of the conveyor belts 85 can take place, for example, by means of correspondingly moved auxiliary movers on the basis of the basic principle explained with reference to the embodiment of FIGS. 23 and 24. Alternatively or additionally, it is possible for the drive of the conveyor belts 85 to allow the movers 19 to cooperate with the track system, i.e. respectively to use the relative movement between the respective mover 19 and a track section 41. The movers 19 can also be moved relative to an external device which does not directly belong to the track system and which cooperates, for example on passing by, in a suitable manner with the respective conveyor belt 85, for example which holds a continuous belt running freely around deflection rollers in order to effect the desired movement relative to the rotor 72 of the continuous belt and thus of a portion 11 to be handed over or to be taken over by a corresponding movement of the rotor 27 in the track section 41.

The cooperation of conveyor belts for transferring food portions is generally known so that it will not be looked at in any more detail here. A special feature of the embodiment of FIG. 31 nevertheless comprises a moving away from the conveyor belt principle taking place, on the one hand, by the movers 19 movable individually in the track section 41, but again simultaneously providing the movers 19 in question here with a conveyor belt function.

It is possible, but not compulsory, to implement a vertical travelability of the conveyor belts 85 or of the holders 31 in order to implement the different height levels between the cooperating conveyor belt movers 19 illustrated in FIG. 31. It is alternatively possible to use movers 19 having different, in particular unchangeable, height levels for the conveyor belts 85 for different product sorts. During the operation of the total system, the control device can provide that different part portions, which have to be transferred between conveyor belt movers 19, are each formed on a conveyor belt mover 19 or are transported thereto for the purpose of the transfer which has a conveyor belt level suitable for such a transfer.

A cooperation of conveyor belt movers 19 such as shown in FIG. 31 does not have to take place between movers 19 located in the same track, but a transfer of portions or part portions is also possible in accordance with the invention from one track to an adjacent track, that is between movers 19 located in different tracks and in particular directly adjacent tracks. At least one of the movers 19 involved in such a cross-track transfer of a portion or part portion can be provided with a conveyor belt whose conveying direction extends transversely to the direction of transport. The conveyor belt can permanently have such a transverse alignment. Alternatively, the conveyor belt can be rotatable by at least 90° relative to the rotor of the mover in order to selectively be able to provide a conveying direction facing in the direction of transport or facing perpendicular thereto. A cross-track transfer can also involve more than two adjacent tracks or track sections. A mover located in a middle track can thus e.g. receive part portions from adjacent tracks at either side.

FIGS. 32 and 33 show a further possibility in accordance with the invention to take portions 11 from the carrier 29 of a transport mover 19 or to transfer portions 11 to a carrier 29.

An external transfer device 82 is provided for this purpose which does not directly belong to the track system and which comprises a plurality of drivable, narrow conveyor belts 88 which are arranged like the tines of a fork spaced part from one another in parallel and which are also called a "finger belt" or "finger belts".

A carrier 29 cooperating with such a "conveyor belt fork" is of grid shape or rake shape and comprises a plurality of parallel rods 89 arranged spaced apart from one another, with the intermediate spaces between the rods 89 being sufficiently large to allow a meshing moving through of the conveyor belts 88 of the transfer device 87.

As indicated by the arrows in FIG. 32, the transfer device 87 can, on the one hand, be moved in the direction of transport T and in the opposite direction and thus in parallel with the track section 41 in which a mover 19 is moved to transfer a portion 11. On the other hand, the transfer device 87 can vary the height of the transfer fork formed by the narrow conveyor belts 88.

A portion transfer can take place, for example, such that an incoming mover 19 stops in the position shown in FIG. 32, whereupon the transfer device 87 moves with sufficiently lowered conveyor belts 88 beneath the portion 11 between the rods 89 of the carrier 29. The conveyor belts 88 are subsequently moved sufficiently vertically upwardly to raise the portion 11 from the support surface of the carrier 29 formed by the rods 89. The conveyor belts 88 can subsequently be set into motion to convey the portions 11 further in the direction of the transfer device 87, that is to the left in FIG. 32. The transfer device 87 can then be retracted as a whole from the track section 41, whereupon the now empty mover 19 can be moved on in the track 41.

As indicated by the curved track section 73 in FIG. 32, the mover 19 can in this respect, so-to-say, "dip down" and can, for example, be moved back below the shown track section 41 against the direction of transport T in an upside down position and can e.g. be cleaned during this return.

It can in particular be recognized in the plan view of FIG. 33 how the narrow conveyor belts 88 of the transfer device 87 lie between the rods 89 of the carrier 29 of the mover 19 like the tines of a fork. The portion 11 is not shown in FIG. 33.

The use of conveyor belts is nevertheless not absolutely necessary for a transfer of portions 11. A passive device, for example in the form of a fork such as has been explained e.g. in connection with FIGS. 25 to 27 can likewise be used. An advantage of the use of conveyor belts 88 comprises their being able to transfer a portion 11 to a different conveyor belt, for example, or to be able to place it directly into a package, which is not easily possible or which is not possible in a manner gentle for the portion with a rigid, passive transfer fork.

FIG. 34 shows in a schematic plan view a further embodiment of a carrier 29 of a mover 19 suitable for a cooperation with fork transfer devices 87.

In this embodiment, the support surface of the carrier 29 is formed for a portion, not shown here, by a plurality of projections 91, which are for example of nub type, with here square base surfaces which define passage-like intermediate spaces extending in parallel with and perpendicular to one another both in the transverse direction and in the longitudinal direction. Such a carrier structure makes it possible that transfer devices 87 can engage from directions offset by 90° with respect to one another between the projections 91 to cooperate with the carrier 29 for a transfer of portions.

Movers 19 equipped with such a carrier 29 can thus be used more flexibly and with greater variety than other movers. The transfer possibilities are in particular so-to-say non-variant with respect to 90° rotations of the carrier 29 relative to the rotor 27 with such a carrier 29, i.e. such carriers 29 can in particular be used advantageously when it is not possible to predict the rotational position in which the carrier 29 runs into a transfer station in which transfer devices 87 are provided for receiving or discharging portions.

Instead of the passive transfer devices 87 which are shown in FIG. 34 and whose tines 83 can respectively engage between the projections 91 of the carrier 29, it is also possible to work in this embodiment of the carrier 29 with transfer devices 87 which are provided with narrow conveyor belts 88 in accordance with the embodiment of FIGS. 32 and 33.

As mentioned at another point, the individual transport system in accordance with the invention can completely replace conventional conveyor belt systems. This also applies to a replacement of the so-called portioning belts or portioning units which are arranged directly in the region of a slicer and with which portions are formed from the falling slices so-to-say "freshly" cut off from a product and formed portions are transferred to following conveyor units.

A possibility how such a portioning can take place by means of the transport system in accordance with the invention is illustrated schematically in FIGS. 35 and 36.

FIG. 35 shows a side view of a transport mover 19 arranged directly at a slicer 15 in the portioning region, whereas it can inter alia be seen from the plan view of FIG. 36 that in this embodiment the slicer 15 is formed with three lanes, i.e. can slice three products 13 simultaneously which are disposed in parallel next to one another, wherein the transport system in accordance with the invention is configured in this portioning region correspondingly with three lanes and comprises three transport movers 19 arranged next to one another.

In accordance with FIG. 35, the products 13 to be sliced are supplied in lying form on a product support, not shown, which extends in an inclined manner with respect to the horizontal by means of a product supply, not shown, in a direction of conveying F to a cutting plane 14 which is defined by a revolving cutting blade 16, for example a scythe-like blade, which rotates at high speed about an axis of rotation extending in parallel with the direction of conveying F.

Slices 17 cut off from the front product end fall onto a waiting transport mover 19 whose carrier 29 is formed by an endless conveyor belt 93. The belt 93 runs over deflection rollers which are rotatably supported about axes of rotation 95. As regards the possibilities for a drive of the conveyor belt 93, reference is made to the corresponding statements on FIG. 31, for example, to avoid repetition.

It is, however, not absolutely necessary for the portion formation that the conveyor belt 93 is driven. The formation of overlapping portions 11 (cf. in particular FIG. 36) in which the slices 17 forming the portion 11 only partly overlap one another can, for example, also take place by moving the mover 19 in the track section 41.

The transport system in accordance with the invention is also able to move the rotors 27 of the movers 19 with a very high positioning precision at low speeds by means of the control device, i.e. predefined portion patterns can be exactly produced by a corresponding movement of the movers 19. In other words, the carrier 29 formed by the conveyor belt 93 can be moved by means of the rotor 27 in the falling region of the cut-off slices 17 such that generally any desired portion pattern can be generated from the falling slices 17, optionally by a multiple moving to and fro of the rotor 27 in the direction of transport T and against the direction of transport T.

As indicated by the double arrows in FIG. 36, a movement of the carrier 29 transversely to the direction of transport T optionally required for the portion formation (cf. the lower, additionally transversely overlapping portion 11 in FIG. 36) can be achieved, for example, in that the track sections 41 are movable in the transverse direction. Alternatively or additionally, such a transverse movability can be integrated into the movers 19 themselves in that the latter are able to move the respective conveyor belt 93 forming the carrier 29 in a transverse direction relative to the respective rotor 27.

It is also possible to move the movers 19 in a track section extending perpendicular to the direction of transport T in order to achieve a transverse movement of the carriers 29 optionally required for the portioning.

Contrary to what is shown in FIGS. 35 and 36, it is also possible to provide the movers 19 with such drivable conveyor belts which allow a conveying movement transversely to the direction of transport T, with which that is the axes of rotation of the deflection rollers for the belts each extend in the direction of transport T. A transverse movement can consequently also be achieved by driving such transverse conveyor belts, whereas a movement in the direction of transport T and against the direction of transport T can be achieved—as explained above—by a movement to and fro of the rotors 27 in the respective track section 41.

In this manner, a product placement can be implemented with each mover 19 which is also called an x-y table and which is movable in two directions perpendicular to one another.

Additional placement possibilities can furthermore or alternatively be achieved when the carriers 29 of the movers 19 are rotated either by the movers 19 own drives or by means of external devices, e.g. in the form of auxiliary movers in the respective track sections 41. So-called round layers can, for example, be produced with the aid of the transport movers 19 in accordance with the invention.

The track section 41 is shown in a horizontal alignment in FIG. 35 in which the portions 11 are formed on the conveyor belts 93 and the respective mover 19 is in each case moved away from the slicer 15 in the direction of transport T after completion of a portion 11. It is sufficient in this respect if the portioning track sections 41 shown here and arranged directly at the slicer 15 are comparatively short and if the outgoing movers 19 are transferred to following track sections, not shown. As indicated in FIG. 35, the portioning track sections 41 can each be pivotable about an axis 71 extending horizontally transversely to the direction of transport T. The left end of each portioning track section 41 not shown in FIG. 35 can be brought by such a pivoting into alignment with a track section (not shown) which extends in a plane which is disposed beneath that plane in which the movers 19 are transported away in the horizontal position of the portioning track sections 41 shown in FIG. 35.

In the downwardly pivoted position, the portioning track sections 41 can respectively accept unloaded transport movers 19 coming from the left in FIG. 35 which are then ready to receive falling slices 17 to form a new portion 11 after pivoting back the portioning sections 41 into the horizontal position in accordance with FIG. 35.

Whereas FIGS. 35 and 36 relate to that region of a total system in accordance with the invention at which the transport system in accordance with the invention cooperates with a slicer 15 for forming portions 11 on the transport movers 19, the other end of a transport system in accordance with the invention is shown so-to-say in FIG. 37 at which the portions 11 depart the transport system in accordance with the invention and are placed into a packaging 97.

When, in accordance with the embodiment of FIG. 37, the movers 19 are provided with carriers 29 which are configured as a conveyor belt 93 and which can be driven, a gentle placement of portions 11 into a packaging 97 can take place overall by cooperation of the conveying movement of the conveying belt 93 and of the movement of the mover 19 in the track section 41.

The superposition of the movement generated by driving the conveyor belt 93 in a conveying direction F, on the one hand, with the opposite movement in the direction of transport T generated by moving the rotor 27 in the track section 41, on the other hand, has the consequence for the portion 11 disposed on the conveyor belt 93 that the portion 11 is stationary relative to the stationary packaging 97 when the two opposite movements in the conveying direction F, on the one hand, and in the direction of transport T, on the other hand, take place at the same speed. The portion 11 to be placed down then so-to-say has the "floor pulled from under its feet". The portion 11 is hereby placed down gently.

In this manner, the transport system in accordance with the invention is used to implement a so-called "tipping" such as is generally known in connection with conventional conveyor belt systems for the placement of food portions. This embodiment is consequently also an example of how functions of conventional conveyor belt systems can be produced with the individual transport system in accordance with the invention.

It is not absolutely necessary for the production of a tipping belt to design the movers 19 such that the conveyor belt 93 can be driven by means of a band drive of the mover. It is alternatively possible that an additional device is provided in the region of the placement point shown here in FIG. 37, with the additional device not being shown and being able to be a part of the track system or being able to be provided externally and being able to hold a non-driven, freely movable conveyor belt 93. In this manner, the required tipping movement of the conveyor belt 93 and thus a gentle placement of the portion 11 can be implemented by moving the rotor 27 in the track section 41 in the direction of transport T.

The holding and releasing of the conveyor belt 93 by means of the mentioned additional device can in each case be effected with the aid of the control device associated with the transport system.

FIG. 38 shows another possibility in accordance with the invention to place portions 11 directly from a mover 19 moved in a track section 41 into a package 97.

This embodiment makes use of gravity and comprises a track section 41 of the U type which extends in a vertical plane and by means of which the movers 19 are first moved in the direction of transport T in an upper horizontal plan and are moved on in the opposite direction of transport T in an upside down arrangement in a lower horizontal plane after running through a curved 180° section 73.

A packaging station with waiting packages 97 is located beneath the part of the track section 41 extending in the lower horizontal plane.

As soon as a mover 19 is above a packaging 97 in an upside down arrangement, holding arms 99 are activated and are pivoted into a release position to release a portion 11 to be discharged which can thus fall into the packaging 97. On this transfer, the portions 11 are simultaneously flipped over in that they lie upside down in the packaging 97 than originally on the carrier 29 of the mover 19.

As shown in the upper part of FIG. 38, the holding arms 99 located in a holding position before the release of the portion 11 provide that the portion 11 remains securely on the carrier 29, while the mover 19 is moved in an upside down position in accordance with the representation in the lower part of FIG. 38.

The pivoting of the holding arms 99 can take place by means of a drive integrated in the mover 91. Alternatively, an external trigger device can be provided which acts on the holding arms 99, for example mechanically, electrically or magnetically, when the mover 19 reaches the release position above the packaging 97.

Instead of the pivotable holding arms 99 shown in FIG. 38, other means for holding and releasing the portions 11 can be provided at the carrier 29 in alternative embodiments of the invention. It is thus possible, for example, to hold a portion 11 at the carrier 29 by means of a vacuum, for example by suction via suction openings formed in the carrier 29. A previously securely held portion 11 can be released and thus dropped by switching the vacuum source off for dispensing to a packaging 97.

It is possible in a further alternative embodiment to pull the packs 97 in each case over a portion 11 lying on the carrier 29, i.e. with a normally oriented mover 19 not upside down, to place the packaging 97 onto the portion 11 with its open side face down. The placement of the portion 11 thus already in the packaging 97 together with the packaging 97 can then take place, for example, again by moving the mover 19 into an upside down position. In order in this respect to hold the portion 11 in the packaging 97 securely at the mover 19 up to the release, holding means of any design can be provided integrated in the mover 19 or externally.

Adjustable holding arms such as are shown in FIG. 38 with the holding arms 99 only for a portion 11 can, for example, serve as integrated holding means for the packaging 97 with the portion 11.

A holding rail which, for example, extends above the track section 41 can be provided as an external holding means and defines, together with the track section 41, an intermediate space or a type of tunnel in which the mover 19 travels after the placing on of the packaging 97, which holds the packaging 97 together with the portion 11 during the "tunnel movement" and which releases the packaging 97 together with the portion 11 located therein after moving out the mover 19 then moved into the upside down arrangement such that the packaging 97 and the portion 11 fall down and can thus be released from the carrier 29.

REFERENCE NUMERAL LIST 11 portion
13 product
14 cutting plane
15 slicing apparatus, slicer
16 cutting blade
17 slice
19 transport mover
21 track system
23 track
25 control device
27 rotor
29, 29' carrier
29a carrier segment
29b carrier segment
31 holder
33 guide rail
35 slit
37, 37' coupling section
39, 39' support surface
41 track section
43 stator
45 return line
47 branch
49 format
51 buffer line
53 switch section
55 holder
57 functional station
61 scale
63 rejection line
65 cleaning belt
67 connection element
69 connection element
71 pivot axis
73 curved section
75 flip-over mover
77 axis of rotation
79 coupling rod
81 gripper
83 tines
87 transfer device
88 conveyor belt
89 rod
91 packaging machine
92 projection
93 conveyor belt
95 axis of rotation
97 packaging
99 holding arm
T direction of transport
R return direction
M permanent magnet arrangement
F conveying direction

The invention claimed is:

1. An apparatus for moving portions which each comprise at least one slice cut off from a food product, the apparatus comprising:
   a plurality of individually movable transport movers each for at least one portion;
   a track system for the plurality of individually movable transport movers in which the plurality of individually movable transport movers are movable in a direction of transport along at least one track;
   a control device for controlling the movements of the plurality of individually movable transport movers in the track system,
   a transfer device of the track system, the transfer device including a conveyor belt, the conveyor belt moving portions onto the plurality of individually movable transport movers, the transfer device comprising a plurality of conveyor belts oriented parallel to each other,
   wherein the plurality of individually movable transport movers each comprise at least one rotor cooperating with the track system and at least one carrier for at least one portion attached to the rotor by a holder, the at least one carrier comprising a plurality of rods spaced from each other and oriented parallel to each other, the plurality of rods defining a plurality of spaces, wherein each of the plurality of spaces are large enough to receive one of the plurality of conveyor belts; and
   a drive for each of the plurality of individually movable transport movers formed by the at least one rotor and by the track system which together form an electromagnetic drive for each one of the plurality of individually movable transport movers.

2. The apparatus in accordance with claim 1,
   wherein the at least one rotor is a component of a linear synchronous motor.

3. The apparatus in accordance with claim 1,
   wherein the track system is configured for a multi-lane operation.

4. The apparatus in accordance with claim 1,
   further comprising a loading region of the track system, with the loading region being configured to receive slices falling under the effect of gravity and/or slices coming directly from an apparatus for slicing food products by means of the plurality of individually movable transport movers.

5. The apparatus in accordance with claim 1,
   wherein the track system comprises at least one functional line for the plurality of individually movable transport movers in addition to at least one normal line.

6. The apparatus in accordance with claim 1,
   wherein at least one functional line is configured as a rejection line or expulsion line via which at least some of the plurality of individually movable transport movers whose portions satisfy or do not satisfy at least one predefined or predefinable criterion can be led out of a normal line.

7. The apparatus in accordance with claim 1,
   wherein the track system comprises a functional region at which a plurality of tracks are led together temporarily and which is configured to carry out an additional function for the plurality of individually movable transport movers and/or the portions.

8. The apparatus in accordance with claim 1,
   wherein a track section is configured to be adjusted transversely to the direction of transport in a plane extending at least approximately horizontally; and/or wherein a track section is configured to be at least approximately adjustable in the vertical direction.

9. The apparatus in accordance with claim 1,
   further comprising at least one functional mover movable in the track system, with the at least one functional mover comprising a rotor cooperating with the track system and at least one functional means which provides a function different from the transport function of the plurality of individually movable transport movers.

10. The apparatus in accordance with claim 1, wherein the carrier of at least one of the plurality of individually movable transport movers is rotatable relative to the at least one rotor.

11. The apparatus in accordance with claim 1, wherein the carrier of at least one of the plurality of individually movable transport movers comprises a plurality of carrier segments which are movable relative to one another.

12. The apparatus in accordance with claim 1, wherein the carrier of at least one of the plurality of individually movable transport movers is releasably attached to the at least one rotor or to the holder.

13. The apparatus in accordance with claim 1, wherein the carrier of at least one of the plurality of individually movable transport movers is provided with means which are configured to cooperate with a handling device configured for moving the carrier.

14. The apparatus in accordance with claim 1, further comprising at least one transfer point, with the at least one transport point being configured to hand over and/or take over at least some of the plurality of individually movable transport movers or their carriers at a vertically extending track section.

15. The apparatus in accordance with claim 1, wherein at least one of the plurality of individually movable transport movers or at least one functional mover is configured for taking up energy from the track system.

16. The apparatus in accordance with claim 1, wherein the carrier of at least one of the plurality of individually movable transport movers comprises a conveyor device for a portion or is configured as a conveyor device.

17. The apparatus in accordance with claim 1, wherein the carrier of at least one of the plurality of individually movable transport movers is configured to cooperate with a handling device for the portions.

18. The apparatus in accordance with claim 1, wherein the carrier is configured to be moved relative to the holder by means of the handling device or to be removed from the holder, at least temporarily.

19. The apparatus in accordance with claim 1, wherein at least one transport mover is provided with a display device for at least one piece of information relating to a property of the transport mover or of a portion.

20. The apparatus in accordance with claim 1, wherein the track system comprises at least one functional region in which, in addition to at least one normal line, at least one overtaking line, waiting line or parking line is provided which branches off from the normal line at one point and opens into the normal line again at another point.

21. The apparatus in accordance with claim 1, wherein the control device is configured to carry out a portioning operation and/or a portion completing operation in at least one region of the track system associated with a slicing apparatus and having at least one transport mover.

22. The apparatus in accordance with claim 1, wherein, in a portioning and/or portion completion mode of operation, the respective transport mover or the carrier of the respective transport mover or a placement region of the carrier is movable in and/or against the direction of transport coordinated with the operation of the slicing apparatus.

23. The apparatus in accordance with claim 1, wherein the plurality of individually movable transport movers can be arranged in a predefined format relative to one another in the functional region, with the format comprising at least one row, at least one column or at least one n×m array (where n, m>1).

24. The apparatus in accordance with claim 1, wherein at least one transport mover and/or one track section is configured to determine the weight of a portion which is located on said transport mover or on a transport mover located in the track section, with at least one transport mover being provided with an integrated scale by means of which the weight of the portion can be determined.

25. The apparatus in accordance with claim 1, wherein the control device is configured to monitor the track system for the presence of problems.

26. A system for processing food products, the system comprising:
at least one apparatus for slicing food products; and
a transport system comprising an apparatus for moving portions which each comprise at least one slice cut off from a food product,
a plurality of individually movable transport movers each for at least one portion;
a track system for the plurality of individually movable transport movers in which the plurality of individually movable transport movers are movable in a direction of transport along at least one track;
a control device for controlling the movements of the plurality of individually movable transport movers in the track system,
a transfer device of the track system, the transfer device including a conveyer belt, the conveyor belt moving portions onto the plurality of individually movable transport movers, the transfer device comprising a plurality of conveyor belts oriented parallel to each other,
wherein the plurality of individually movable transport movers each comprise at least one rotor cooperating with the track system and at least one carrier for at least one portion attached to the rotor, the at least one carrier comprising a plurality of rods spaced from each other and oriented parallel to each other, the plurality of rods defining a plurality of spaces, wherein each of the plurality of spaces are large enough to receive one of the plurality of conveyor belts; and
a drive for each of the plurality of individually movable transport movers formed by the at least one rotor and by the track system which together form an electromagnetic drive for each one of the plurality of individually movable transport movers.

* * * * *